US012009008B2

(12) United States Patent
Oliver et al.

(10) Patent No.: US 12,009,008 B2
(45) Date of Patent: Jun. 11, 2024

(54) HABILITATION AND/OR REHABILITATION METHODS AND SYSTEMS

(71) Applicant: Cochlear Limited, Macquarie University (AU)

(72) Inventors: Janette Oliver, Macquarie University (AU); Jim May, Macquarie University (AU); Christopher Bennett, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 625 days.

(21) Appl. No.: 17/261,646

(22) PCT Filed: Jul. 25, 2019

(86) PCT No.: PCT/IB2019/056360
§ 371 (c)(1),
(2) Date: Jan. 20, 2021

(87) PCT Pub. No.: WO2020/021487
PCT Pub. Date: Jan. 30, 2020

(65) Prior Publication Data
US 2021/0264937 A1    Aug. 26, 2021

Related U.S. Application Data

(60) Provisional application No. 62/703,373, filed on Jul. 25, 2018.

(51) Int. Cl.
*G10L 25/48* (2013.01)
*G10L 15/20* (2006.01)
(Continued)

(52) U.S. Cl.
CPC .............. *G10L 25/48* (2013.01); *G10L 15/20* (2013.01); *G10L 21/02* (2013.01); *H04R 25/554* (2013.01);
(Continued)

(58) Field of Classification Search
CPC ......... G10L 25/48; G10L 21/02; G10L 15/20; H04R 25/554; H04R 2225/39; H04R 2225/41
(Continued)

(56) References Cited

U.S. PATENT DOCUMENTS 7,027,606 B2   4/2006   D'Agri
8,010,366 B1   8/2011   Kearby et al.
(Continued)

FOREIGN PATENT DOCUMENTS

CN           107996028 A        5/2018
WO      WO-2008092183 A1 *    8/2008    ......... A61N 1/36032
(Continued)

OTHER PUBLICATIONS

Moberly et al., "The Enigma of Poor Performance by Adults with Cochlear Implants" (2016) 37 Otology and Neurology 1522—this reference broadly discusses the need for a personalised rehabilitation approach, but there is no disclosure of a technology system of the present invention.
(Continued)

*Primary Examiner* — Abul K Azad
(74) *Attorney, Agent, or Firm* — Pilloff Passino & Cosenza LLP; Martin J. Cosenza

(57) ABSTRACT

A method, including capturing an individual's voice with a machine, and logging data corresponding to events and/or actions of the individual's real world auditory environment, wherein the individual is speaking while using a hearing assistance device, and the hearing assistance device at least
(Continued)

one of corresponds to the machine or is a device used to execute the action of logging data.

27 Claims, 27 Drawing Sheets

(51) Int. Cl.
*G10L 21/02* (2013.01)
*H04R 25/00* (2006.01)
(52) U.S. Cl.
CPC ...... *H04R 2225/39* (2013.01); *H04R 2225/41* (2013.01)
(58) Field of Classification Search
USPC .................................................. 704/226, 233
See application file for complete search history.

(56) References Cited

U.S. PATENT DOCUMENTS

| | | | |
|---|---|---|---|
| 8,036,898 | B2 | 10/2011 | Sato et al. |
| 8,708,702 | B2 | 4/2014 | Paul |
| 8,963,987 | B2 | 2/2015 | Byun et al. |
| 9,173,043 | B2 | 10/2015 | Bulow et al. |
| 9,363,614 | B2 | 6/2016 | Jepsen et al. |
| 9,560,991 | B2 | 2/2017 | de Vries et al. |
| 9,814,879 | B2 | 11/2017 | Banna et al. |
| 2005/0107844 | A1* | 5/2005 | Van Den Honert ........................ A61N 1/36039 607/57 |
| 2006/0029912 | A1 | 2/2006 | Kearby et al. |
| 2008/0212789 | A1 | 9/2008 | Cronin et al. |
| 2011/0257994 | A1 | 10/2011 | Givens et al. |
| 2011/0313315 | A1 | 12/2011 | Attias et al. |
| 2014/0336448 | A1* | 11/2014 | Banna ................ A61N 1/36038 607/57 |
| 2016/0269849 | A1 | 9/2016 | Riggs et al. |
| 2016/0277856 | A1 | 9/2016 | Chen et al. |
| 2017/0127201 | A1 | 5/2017 | Roeck et al. |
| 2018/0012511 | A1* | 1/2018 | Reed ........................ G06F 3/167 |
| 2018/0125415 | A1* | 5/2018 | Reed .................... A61B 5/4803 |
| 2018/0140828 | A1* | 5/2018 | Lineaweaver ..... A61N 1/36036 |

FOREIGN PATENT DOCUMENTS

| | | |
|---|---|---|
| WO | 2009103823 A1 | 8/2009 |
| WO | 2012030450 A1 | 3/2012 |
| WO | 2017033130 A1 | 3/2017 |

OTHER PUBLICATIONS

International Search Report & Written Opinion for PCT/IB2019/056360, dated Nov. 8, 2019.

* cited by examiner

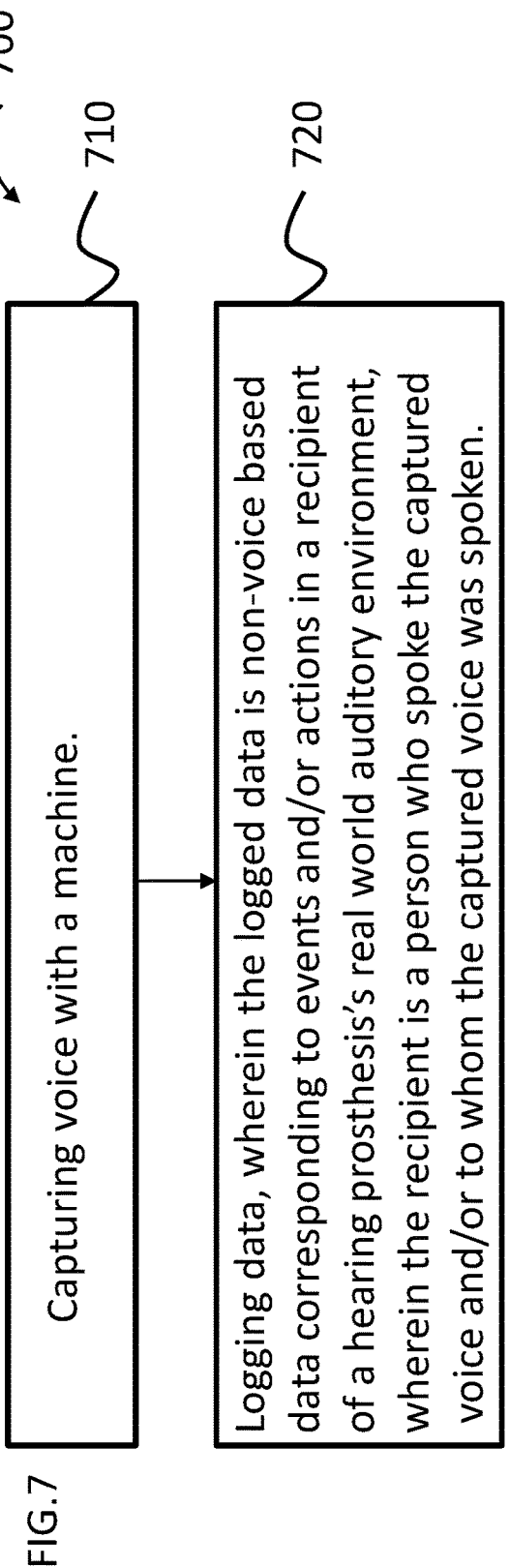

FIG.7

700
- 710: Capturing voice with a machine.
- 720: Logging data, wherein the logged data is non-voice based data corresponding to events and/or actions in a recipient of a hearing prosthesis's real world auditory environment, wherein the recipient is a person who spoke the captured voice and/or to whom the captured voice was spoken.

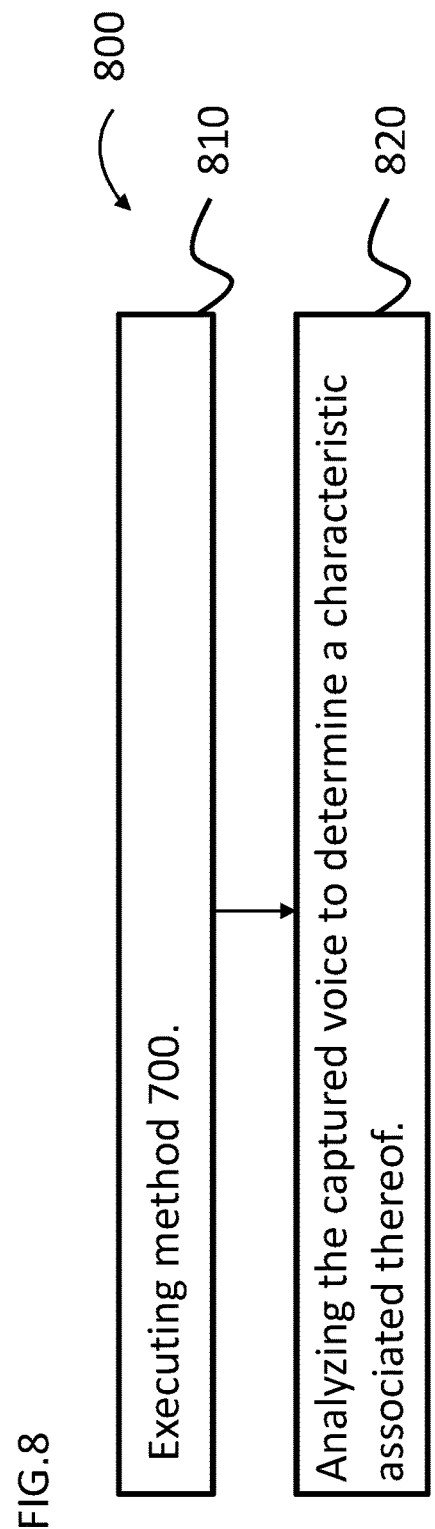

FIG.8

800
- 810: Executing method 700.
- 820: Analyzing the captured voice to determine a characteristic associated thereof.

FIG. 9

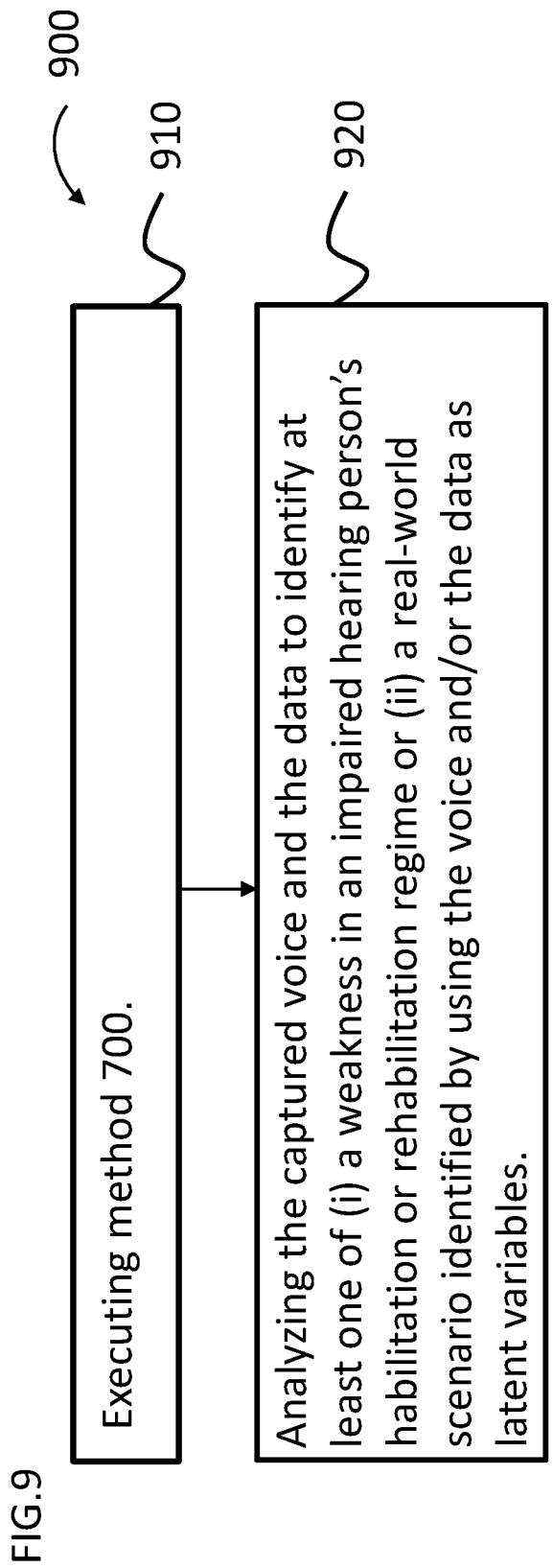

- 900
- 910 Executing method 700.
- 920 Analyzing the captured voice and the data to identify at least one of (i) a weakness in an impaired hearing person's habilitation or rehabilitation regime or (ii) a real-world scenario identified by using the voice and/or the data as latent variables.

FIG. 11

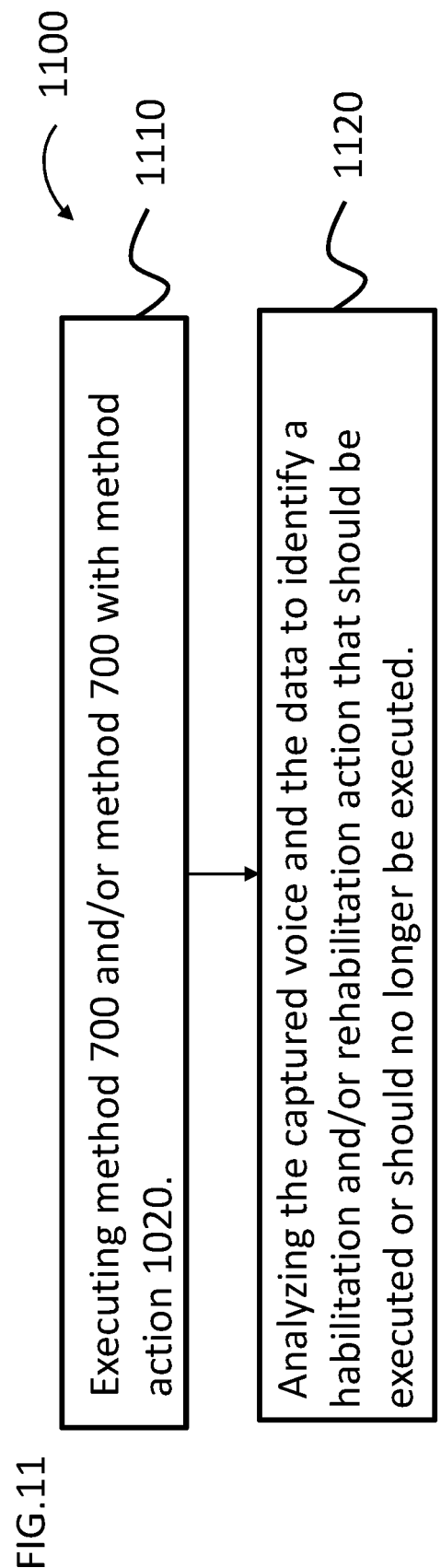

- 1100
- 1110 Executing method 700 and/or method 700 with method action 1020.
- 1120 Analyzing the captured voice and the data to identify a habilitation and/or rehabilitation action that should be executed or should no longer be executed.

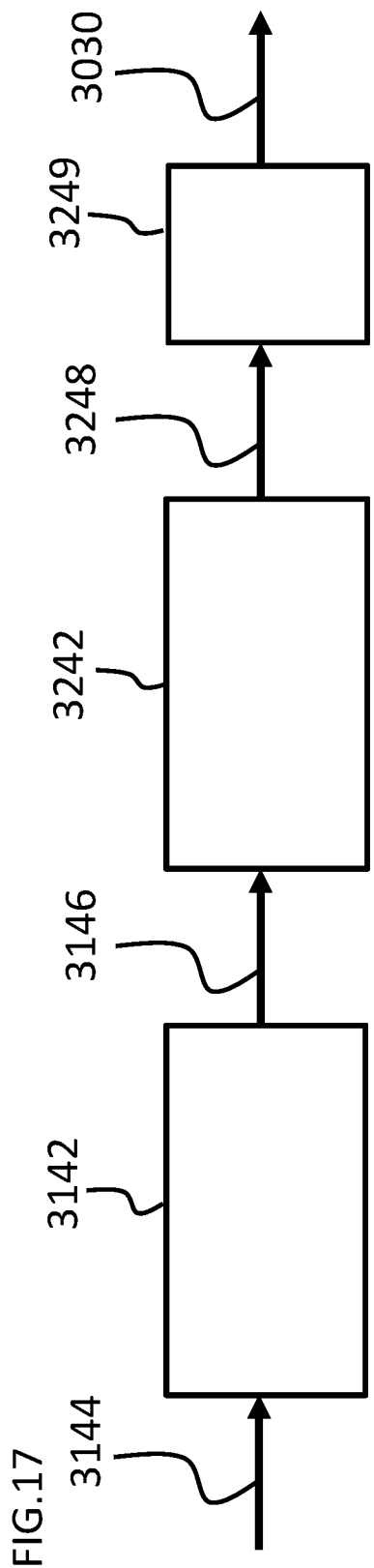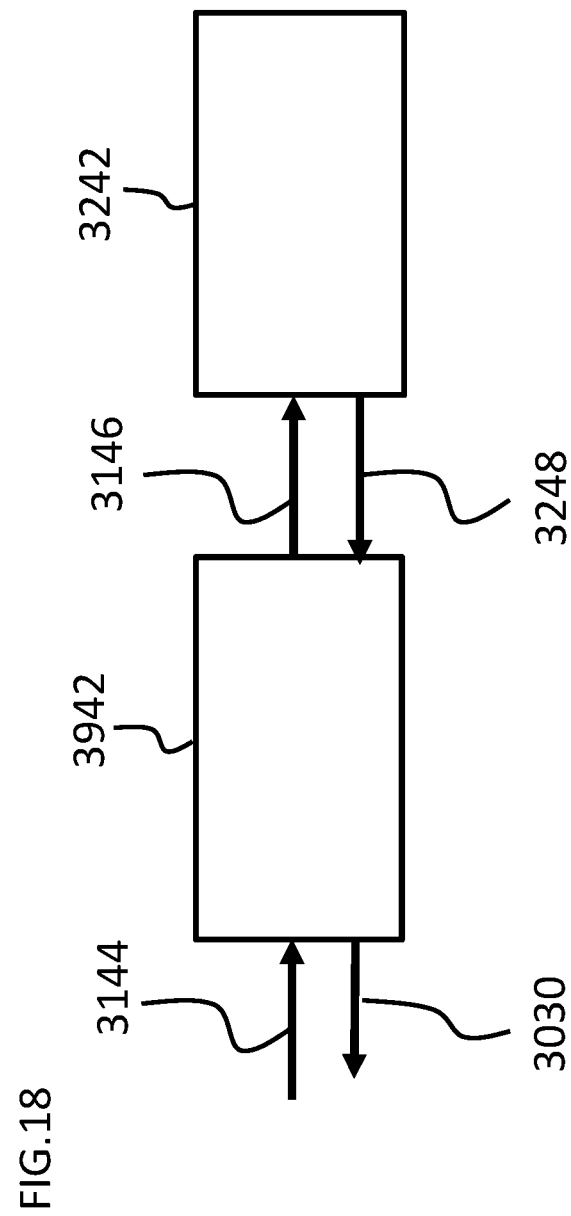

FIG. 23

RECEIVE AUDIO INPUT INTO A HEARING PROSTHESIS THAT IS OPERABLE TO STIMULATE A PHYSIOLOGICAL SYSTEM OF A RECIPIENT IN ACCORDANCE WITH THE RECEIVED AUDIO INPUT, WHERE AT TIMES WHILE RECEIVING THE AUDIO INPUT THE HEARING PROSTHESIS IS IN A STIMULATION-ON MODE IN WHICH IT IS SET TO STIMULATE THE PHYSIOLOGICAL SYSTEM OF THE RECIPIENT IN ACCORDANCE WITH THE RECEIVED AUDIO INPUT AND AT OTHER TIMES WHILE RECEIVING THE AUDIO INPUT THE HEARING PROSTHESIS IS IN A STIMULATION-OFF MODE IN WHICH IT IS SET TO NOT STIMULATE THE PHYSIOLOGICAL SYSTEM OF THE RECIPIENT IN ACCORDANCE WITH THE RECEIVED AUDIO INPUT — 42

THE HEARING PROSTHESIS LOGS DATA REPRESENTING THE RECEIVED AUDIO INPUT IN CORRESPONDENCE WITH THE TIMES WHEN THE HEARING PROSTHESIS IS IN THE STIMULATION-ON MODE — 44

HABILITATION AND/OR REHABILITATION METHODS AND SYSTEMS

CROSS-REFERENCE TO RELATED APPLICATIONS

This application claims priority to U.S. Provisional Application No. 62/703,373, entitled HABILITATION AND/OR REHABILITATION METHODS AND SYSTEMS, filed on Jul. 25, 2018, naming Janette Oliver of Mount Pleasant, Australia as an inventor, the entire contents of that application being incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. One example of a hearing prosthesis is a cochlear implant. Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from hearing loss typically receive an acoustic hearing aid. Conventional hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve. Cases of conductive hearing loss typically are treated by means of bone conduction hearing aids. In contrast to conventional hearing aids, these devices use a mechanical actuator that is coupled to the skull bone to apply the amplified sound. In contrast to hearing aids, which rely primarily on the principles of air conduction, certain types of hearing prostheses commonly referred to as cochlear implants convert a received sound into electrical stimulation. The electrical stimulation is applied to the cochlea, which results in the perception of the received sound. Many devices, such as medical devices that interface with a recipient, have structural and/or functional features where there is utilitarian value in adjusting such features for an individual recipient. The process by which a device that interfaces with or otherwise is used by the recipient is tailored or customized or otherwise adjusted for the specific needs or specific wants or specific characteristics of the recipient is commonly referred to as fitting. One type of medical device where there is utilitarian value in fitting such to an individual recipient is the above-noted cochlear implant. That said, other types of medical devices, such as other types of hearing prostheses, exist where there is utilitarian value in fitting such to the recipient.

SUMMARY

In an exemplary embodiment, there is a method, comprising capturing voice sound with a machine, and logging data, wherein the logged data is non-voice based data corresponding to events and/or actions in a recipient of a hearing prosthesis's real world auditory environment, wherein the recipient is a person who spoke the captured voice and/or to whom the captured s was spoken.

In an exemplary embodiment, there is a method, comprising capturing an individual's voice with a machine, and logging data corresponding to events and/or actions of the individual's real world auditory environment, wherein the individual is speaking while using a hearing assistance device, and the hearing assistance device at least one of corresponds to the machine or is a device used to execute the action of logging data.

In an exemplary embodiment, there is a method, comprising, capturing sound in a natural language environment with a machine, analyzing the sound captured by the machine to determine at least one higher level characteristic of an auditory skill development of a hearing impaired person, and at least one of identifying a revision to a habilitation and/or rehabilitation regime of the person based on the analysis, developing a habilitation and/or rehabilitation regime for the person based on the analysis, or replacing a habilitation and/or rehabilitation regime for the person with a new regime based on the analysis.

In an exemplary embodiment, there is a method, comprising capturing voice sound with a hearing prosthesis, wherein the speaker is a recipient of the hearing prosthesis, evaluating data, wherein the data is based on the captured voice, determining a hearing habilitation and/or rehabilitation related feature based on the evaluation.

In an exemplary embodiment, there is a method, comprising capturing voice sound with a machine, wherein the speaker has a hearing impairment, evaluating data based on the captured voice, and determining that there is a need for intervention in a hearing habilitation and/or rehabilitation effort based on the evaluation. A method, comprising capturing voice using a machine, determining, based on the captured voice, linguistic characteristics of the hearing impaired person, and developing a hearing habilitation and/or rehabilitation regime based on the determination.

In an exemplary embodiment, there is a method, comprising capturing voice using a machine, determining, based on the captured voice, linguistic characteristics associated with the hearing impaired person and at least one of modifying a hearing habilitation and/or rehabilitation regime that was previously implemented based on the determination or replacing a hearing habilitation and/or rehabilitation regime that was previously implemented with a new regime based on the determination.

In an exemplary embodiment, there is a hearing habilitation and/or rehabilitation system, comprising at least one of an input suite and an output suite or an input/output suite; a processing suite; and an output suite, wherein the processing suite is configured to analyze a linguistic environment metric in combination with a non-linguistic environment metric correlated to the linguistic environment metric, all inputted into the input suite and/or the input/output suite, and based on the analysis, automatically determine a recommended change in a hearing impaired person's sound environment.

BRIEF DESCRIPTION OF THE DRAWINGS

Embodiments are described below with reference to the attached drawings, in which:

FIGS. 7-16 present exemplary flowcharts for exemplary methods;

FIGS. 17 and 18 present exemplary systems;

FIGS. 22-24 present exemplary flowcharts for exemplary methods;

DETAILED DESCRIPTION

Figure 1:
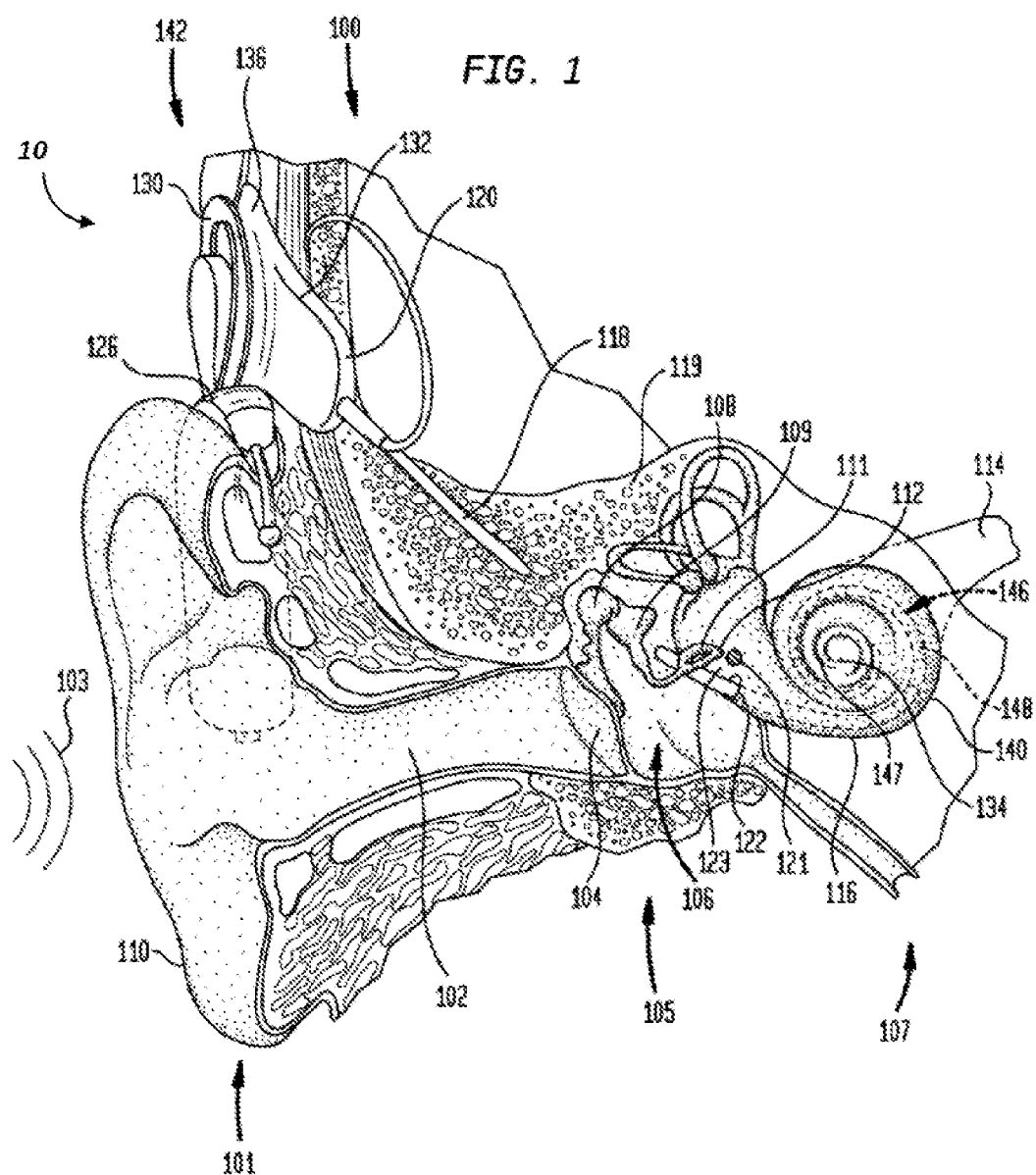
FIG. 1 is a perspective view of an exemplary hearing prosthesis in which at least some of the teachings detailed herein are applicable.

The present inventors have determined that there is variability between recipients of sensory prostheses, including cochlear implants, in terms of their individual outcomes. There are numerous factors that impact cochlear implant outcomes. These factors can act singularly or collectively on individual outcomes and to varying degrees.

The inventors have also determined that an addressable factor underlying this variability can be that typical clinical practice often fails to extend much beyond prosthesis fitting and technology orientation. In the field of hearing habilitation and/or rehabilitation, such an attitude to the habilitation and/or rehabilitation of hearing loss can be due, in some instances, to a belief that hearing technology alone is a sufficient response to the systemic impact of hearing loss/hearing impairment, on the individual, thereby overlooking essential components of aural habilitation and/or rehabilitation. Hearing loss/impairment can limit and/or prevent the individual from functioning and communicating in the real world, at least relative to that which is the case. Some embodiments of the teachings herein address this issue. Some embodiments utilize consideration of an individual's auditory diet, linguistic and social communication environment, as well as their functional behavior.

Embodiments herein include an integrated suite of tools that are arranged to effectively influence a range of capabilities beyond improving a trained target auditory task. Some embodiments are directed to targeting and training complex, real-world functions based on dynamic data derived from the individual's actual acoustic diet, functional auditory behavior and real life communication environment. Some utilitarian results can include providing objective real world information and clinical evidence for professionals, parents and/or recipient(s) of the prosthesis. Some embodiments can result in aiding the guidance of clinical management and intervention decisions. Some embodiments can result in support for improved cochlear implant outcomes. Some embodiments utilized a framework to inform personalized guided rehabilitation.

Some embodiments provide a combination of inputs that are integrated into a practical platform and thereby become effective in identifying, targeting and/or training critical aspects of an individual's listening mediated performance within the context of the recipient's daily life. The inputs can also be used as a foundation to guide, track and monitor a customized rehabilitation journey for the individual. The measures include, in some embodiments, one or more of: (a) the recipient's auditory diet e.g., by measuring the recipient's exposure to a range of different auditory scenes which can be recorded as data logs, and/or (b) the recipient's linguistic environment e.g., by analyzing various aspects of linguistic environment, as enabled by own voice and external voice monitoring on the device which can be recorded as data logs. In some embodiments, a further input stream of functional listening behaviors can be entered into the system through parent, recipient or professional responses to a validated index. Some embodiments include systems and/or methods that are utilitarian for adults and/or pediatric cochlear implant users so as to support improved listening and/or social communication outcomes.

It is noted that while at least some exemplary embodiments utilize machines or devices to classify a linguistic and/or audio scene, other embodiments utilize self-reporting and/or manual logging of such. Accordingly, any disclosure herein of data other than voice based data that is obtained or otherwise logged or otherwise captured by a machine also corresponds to a disclosure of data that is in an alternative embodiment tallied or otherwise logged manually. Indeed, in an exemplary embodiment, device 240 can be utilized for self-reporting and the like. Still, embodiments are directed towards a machine-based system/automated system in view of the utilitarian value associated there with.

Note also that while embodiments herein are directed towards capturing voice and/or sound with a microphone or other sound capture device, it is noted that in alternative embodiments, voice and/or sound need not necessarily be captured. In this regard, in an exemplary embodiment, data relating to voice and/or sound is logged in a manual manner. Accordingly, any disclosure herein of capturing and/or analysis of voice and/or sound utilizing machine corresponds to the disclosure of an alternate embodiment where data associated with the voice and/or sound is self-reported or otherwise manually logged.

Embodiments will be described in terms of a cochlear implant, but it is to be noted that the teachings detailed herein can be applicable to other types of hearing prostheses, and other types of sensory prostheses as well, such as, for example, retinal implants, etc. in an exemplary embodiment of a cochlear implant and an exemplary embodiment of system that utilizes a cochlear implant with remote components will first be described, where the implant and the system can be utilized to implement at least some of the teachings detailed herein.

FIG. 1 is a perspective view of a cochlear implant, referred to as cochlear implant 100, implanted in a recipient, to which some embodiments detailed herein and/or variations thereof are applicable. The cochlear implant 100 is part of a system 10 that can include external components in some embodiments, as will be detailed below. Additionally, it is noted that the teachings detailed herein are also applicable to other types of hearing prostheses, such as by way of example only and not by way of limitation, bone conduction devices (percutaneous, active transcutaneous and/or passive transcutaneous), direct acoustic cochlear stimulators, middle ear implants, and conventional hearing aids, etc. Indeed, it is noted that the teachings detailed herein are also applicable to so-called multi-mode devices. In an exemplary embodiment, these multi-mode devices apply both electrical stimulation and acoustic stimulation to the recipient. In an exemplary embodiment, these multi-mode devices evoke a hearing percept via electrical hearing and bone conduction hearing. Accordingly, any disclosure herein with regard to one of these types of hearing prostheses corresponds to a disclosure of another of these types of hearing prostheses or any medical device for that matter, unless otherwise specified, or unless the disclosure thereof is incompatible with a given device based on the current state of technology. Thus, the teachings detailed herein are applicable, in at least some embodiments, to partially implantable and/or totally implantable medical devices that provide a wide range of therapeutic benefits to recipients, patients, or other users, including hearing implants having an implanted microphone, auditory brain stimulators, visual prostheses (e.g., bionic eyes), sensors, etc.

In view of the above, it is to be understood that at least some embodiments detailed herein and/or variations thereof are directed towards a body-worn sensory supplement medical device (e.g., the hearing prosthesis of FIG. 1, which supplements the hearing sense, even in instances when there are no natural hearing capabilities, for example, due to degeneration of previous natural hearing capability or to the lack of any natural hearing capability, for example, from birth). It is noted that at least some exemplary embodiments of some sensory supplement medical devices are directed towards devices such as conventional hearing aids, which supplement the hearing sense in instances where some natural hearing capabilities have been retained, and visual prostheses (both those that are applicable to recipients having some natural vision capabilities and to recipients having no natural vision capabilities). Accordingly, the teachings detailed herein are applicable to any type of sensory supplement medical device to which the teachings detailed herein are enabled for use therein in a utilitarian manner. In this regard, the phrase sensory supplement medical device refers to any device that functions to provide sensation to a recipient irrespective of whether the applicable natural sense is only partially impaired or completely impaired, or indeed never existed.

The recipient has an outer ear 101, a middle ear 105, and an inner ear 107. Components of outer ear 101, middle ear 105, and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109, and the stapes 111. Bones 108, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to the cochlear implant, where the implanted cochlear implant includes a battery that is recharged by the power provided from the external device 142.

In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand or multi-strand platinum or gold wire. External device 142 also includes a magnet (not shown) positioned within the turns of wire of external coil 130. It should be appreciated that the external device shown in FIG. 1 is merely illustrative, and other external devices may be used with embodiments.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments electrode assembly 118 may be implanted at least in basal region 116, and sometimes further. For example, electrode assembly 118 may extend towards apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

Figure 2A:
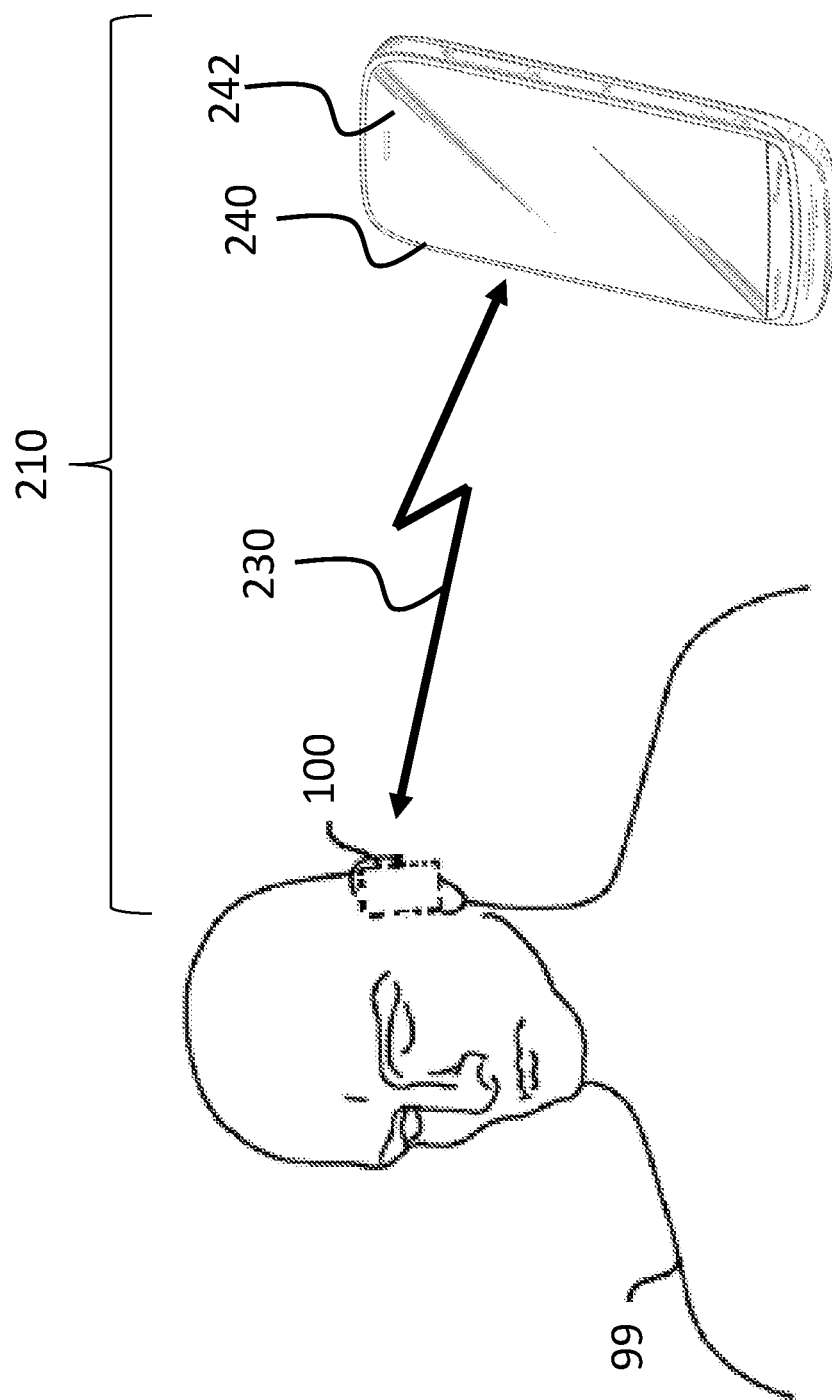
FIGS. 2A and 2B presents an exemplary system including a hearing prosthesis and a remote device in the form of a portable handheld device.

FIG. 2A depicts an exemplary system 210 according to an exemplary embodiment, including hearing prosthesis 100, which, in an exemplary embodiment, corresponds to cochlear implant 100 detailed above, and a portable body carried device (e.g. a portable handheld device as seen in FIG. 2A, a watch, a pocket device, etc.) 240 in the form of a mobile computer having a display 242. The system includes a wireless link 230 between the portable handheld device 240 and the hearing prosthesis 100. In an exemplary embodiment, the hearing prosthesis 100 is an implant implanted in recipient 99 (as represented functionally by the dashed lines of box 100 in FIG. 2A). Again, it is noted that while the embodiments detailed herein will be described in terms of utilization of a cochlear implant, the teachings herein can be applicable to other types of prostheses.

In an exemplary embodiment, the system 210 is configured such that the hearing prosthesis 100 and the portable handheld device 240 have a symbiotic relationship. In an exemplary embodiment, the symbiotic relationship is the ability to display data relating to, and, in at least some instances, the ability to control, one or more functionalities of the hearing prosthesis 100. In an exemplary embodiment, this can be achieved via the ability of the handheld device 240 to receive data from the hearing prosthesis 100 via the wireless link 230 (although in other exemplary embodiments, other types of links, such as by way of example, a wired link, can be utilized). As will also be detailed below, this can be achieved via communication with a geographically remote device in communication with the hearing prosthesis 100 and/or the portable handheld device 240 via link, such as by way of example only and not by way of limitation, an Internet connection or a cell phone connection. In some such exemplary embodiments, the system 210 can further include the geographically remote apparatus as well. Again, additional examples of this will be described in greater detail below.

As noted above, in an exemplary embodiment, the portable handheld device 240 comprises a mobile computer and a display 242. In an exemplary embodiment, the display 242 is a touchscreen display. In an exemplary embodiment, the portable handheld device 240 also has the functionality of a portable cellular telephone. In this regard, device 240 can be, by way of example only and not by way of limitation, a smart phone as that phrase is utilized generically. That is, in an exemplary embodiment, portable handheld device 240 comprises a smart phone, again as that term is utilized generically.

It is noted that in some other embodiments, the device 240 need not be a computer device, etc. It can be a lower tech recorder, or any device that can enable the teachings detailed herein.

The phrase "mobile computer" entails a device configured to enable human-computer interaction, where the computer is expected to be transported away from a stationary location during normal use. Again, in an exemplary embodiment, the portable handheld device 240 is a smart phone as that term is generically utilized. However, in other embodiments, less sophisticated (or more sophisticated) mobile computing devices can be utilized to implement the teachings detailed herein and/or variations thereof. Any device, system, and/or method that can enable the teachings detailed herein and/or variations thereof to be practiced can be utilized in at least some embodiments. (As will be detailed below, in some instances, device 240 is not a mobile computer, but instead a remote device (remote from the hearing prosthesis 100. Some of these embodiments will be described below).)

In an exemplary embodiment, the portable handheld device 240 is configured to receive data from a hearing prosthesis and present an interface display on the display from among a plurality of different interface displays based on the received data. Exemplary embodiments will sometimes be described in terms of data received from the hearing prosthesis 100. However, it is noted that any disclosure that is also applicable to data sent to the hearing prostheses from the handheld device 240 is also encompassed by such disclosure, unless otherwise specified or otherwise incompatible with the pertinent technology (and vice versa).

It is noted that in some embodiments, the system 210 is configured such that cochlear implant 100 and the portable device 240 have a relationship. By way of example only and not by way of limitation, in an exemplary embodiment, the relationship is the ability of the device 240 to serve as a remote microphone for the prosthesis 100 via the wireless link 230. Thus, device 240 can be a remote mic. That said, in an alternate embodiment, the device 240 is a stand-alone recording/sound capture device.

It is noted that in at least some exemplary embodiments, the device 240 corresponds to an Apple Watch™ Series 1 or Series 2, as is available in the United States of America for commercial purchase as of Jun. 6, 2018. In an exemplary embodiment, the device 240 corresponds to a Samsung Galaxy Gear™ Gear 2, as is available in the United States of America for commercial purchase as of Jun. 6, 2018. The device is programmed and configured to communicate with the prosthesis and/or to function to enable the teachings detailed herein.

Figure 2B:
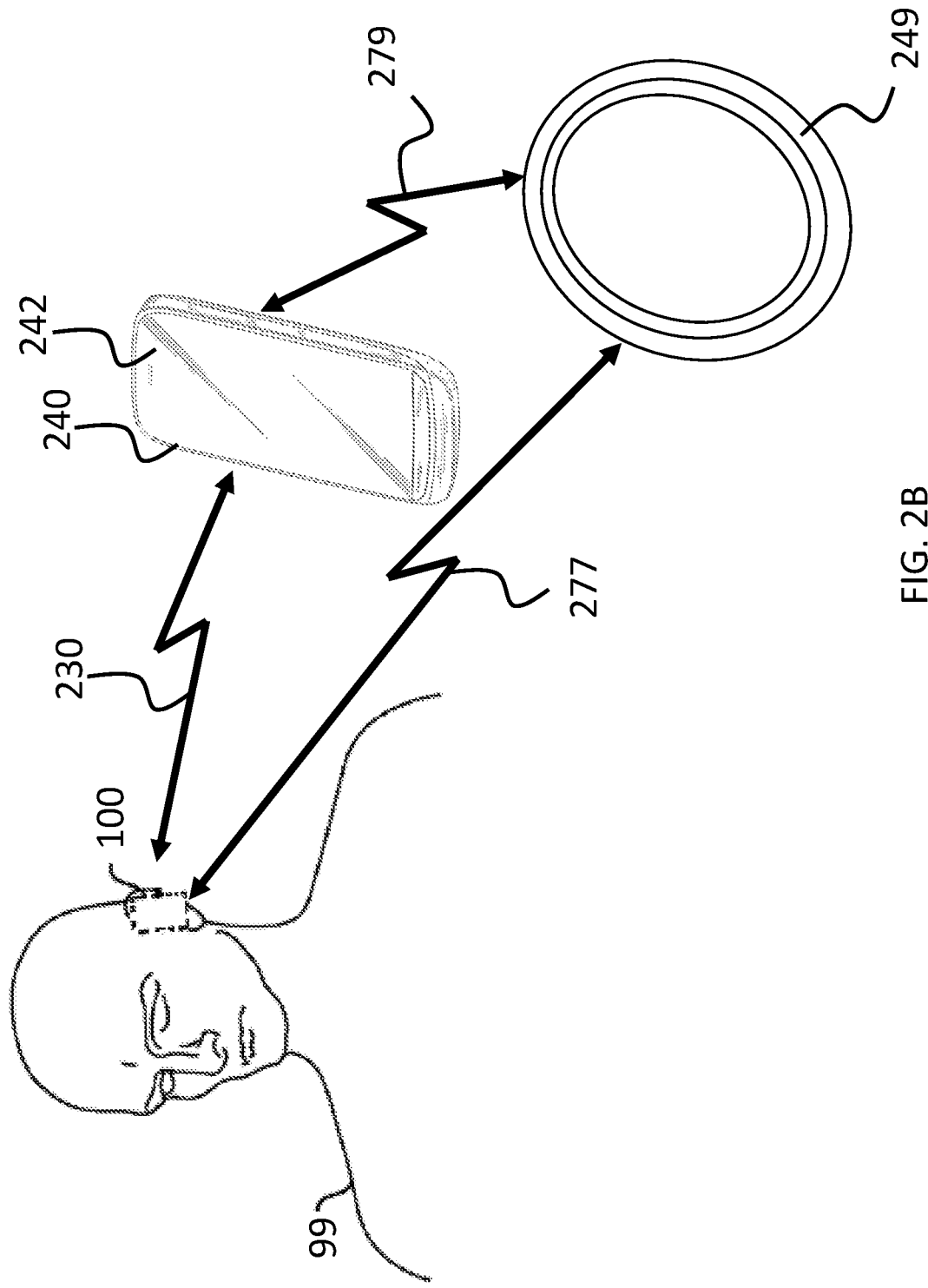

In an exemplary embodiment, a telecommunication infrastructure can be in communication with the hearing prosthesis 100 and/or the device 240. By way of example only and not by way of limitation, a telecoil 249 or some other communication system (Bluetooth, etc.) is used to communicate with the prosthesis and/or the remote device. FIG. 2B depicts an exemplary quasi-functional schematic depicting communication between an external communication system 249 (e.g., a telecoil), and the hearing prosthesis 100 and/or the handheld device 240 by way of links 277 and 279, respectively (note that FIG. 2B depicts two-way communication between the hearing prosthesis 100 and the external audio source 249, and between the handheld device and the external audio source 249—in alternate embodiments, the communication is only one way (e.g., from the external audio source 249 to the respective device)).

It is briefly noted that in an exemplary embodiment, as will be described below, the cochlear implant 100 and/or the device 240 is utilized to capture speech/voice of the recipient and/or people speaking to the recipient. Further as will be described below, the implant 100 and/or the device 240 can be used to log data, which data can be non-speech and/or non-voice based data relating to the use of the implant by a recipient thereof, such as, by way of example only and not by way of limitation, coil on/coil off time, etc. It is briefly noted that any disclosure herein of voice (e.g., capturing voice, analyzing voice, etc.) corresponds to a disclosure of an alternate embodiment of using speech (e.g., capturing speech, analyzing speech, etc.), and vis-a-versa, unless otherwise specified, providing that the art enables such. This is not to say that the two are synonymous. This is to say that in the interests of textual economy, we are presenting multiple disclosure based on the use of one. It is also noted that in at least some instances herein, the phrase voice sound is used. This corresponds to the sound of one's voice, and can also be referred to as "voice."

As will be detailed below, element 249 can represent a portal to communicate with a remote server, etc., that can enable some of the teachings herein. Specifically, by way of example only and not by way of limitation, via the aforementioned links with element 249, captured voice and/or data associated there with as well as data that is logged by the system 210, or just the implant 100, can be communicated to a remote system that can be utilized to implement some of the teachings herein. For example, element 249 can enable communication with the processing suite of the system detailed below (which includes a recommendation engine, etc., as will be detailed below), and device 240 can be in the input, output and/or the input/output suite(s) of the system.

Some embodiments link rehabilitation tools and content such that the embodiments can provide tailored recommendations for self-training and prescribed intervention based on the data collected through one or more actions, and, in some embodiments, in addition to allowing the recipient, parent or professional to track and monitor progress trajectories. Some of these actions can include:

(i) Measuring the auditory environment (auditory scene analysis and data logging). Auditory scene analysis can involve a classification and decision-making process that can recognize a wide variety of auditory environments and adapt the sound processing characteristics of the sound processor of the prosthesis accordingly. Through data logging, the system can collect and store data over a period of time in order to analyze specific trends or record data-based events/actions in the individual's real world auditory environment. This can, in some embodiments, inform evaluation of the listening needs and challenges in the individual's auditory diet.

(ii) Measuring functional listening behaviors (indices of functional auditory behavior for children and adults across the age spectrum). Tracking an individual's auditory performance through validated and normed indices of auditory behavior highlights what they can do in the real world with the auditory access they have through their cochlear implant. Such can be utilitarian with respect to achieving focused practice and intervention identification.

(iii) Dynamic communication metric measurements (Linguistic scene analysis and data logging). This can be achieved by, in some embodiments, using own voice detection and speech recognition technologies provide insight about the recipient's social integration and participation in their natural communication environment. An own voice detection (OVD) algorithms can enable measurement of specific language aspect of an individual, such as receptive and expressive word count and turn taking, and can be implemented on the sound processor. These measures can be logged in the processor with existing acoustic scene data logs, and can also be made visible to users via a mobile app, and to clinicians via the fitting software or professional portal.

Some embodiments include a library of rehabilitation resources & tools, and can include extensive portfolio of resources to support recipients and the professionals working with them across all ages and stages.

In an exemplary embodiment, own voice detection is executed according to any one or more of the teachings of U.S. Pat. No. 2016/0080878 and/or the implementation of the teachings associated with the detection of the invoice herein are executed in a manner that triggers the control techniques of that application. Accordingly, in at least some exemplary embodiments, the prosthesis 100 and/or the device 240 and/or the remote device are configured to or otherwise include structure to execute one or more or all of the actions detailed in that patent application. Moreover, embodiments include executing methods that correspond to the execution of one or more the method actions detailed in that patent application.

In an exemplary embodiment, own voice detection is executed according to any one or more of the teachings of WO 2015/132692 and/or the implementation of the teachings associated with the detection of the invoice herein are executed in a manner that triggers the control techniques of that application. Accordingly, in at least some exemplary embodiments, the prosthesis 100 and/or the device 240 and/or the remote device are configured to or otherwise include structure to execute one or more or all of the actions detailed in that patent application. Moreover, embodiments include executing methods that correspond to the execution of one or more the method actions detailed in that patent application.

An exemplary embodiment includes capturing the voice of a recipient of the prosthesis detailed herein and/or the voice of a hearing impaired person in a conversational manner/where the recipient with a person of interest is talking in a conversational tone.

Figure 3:
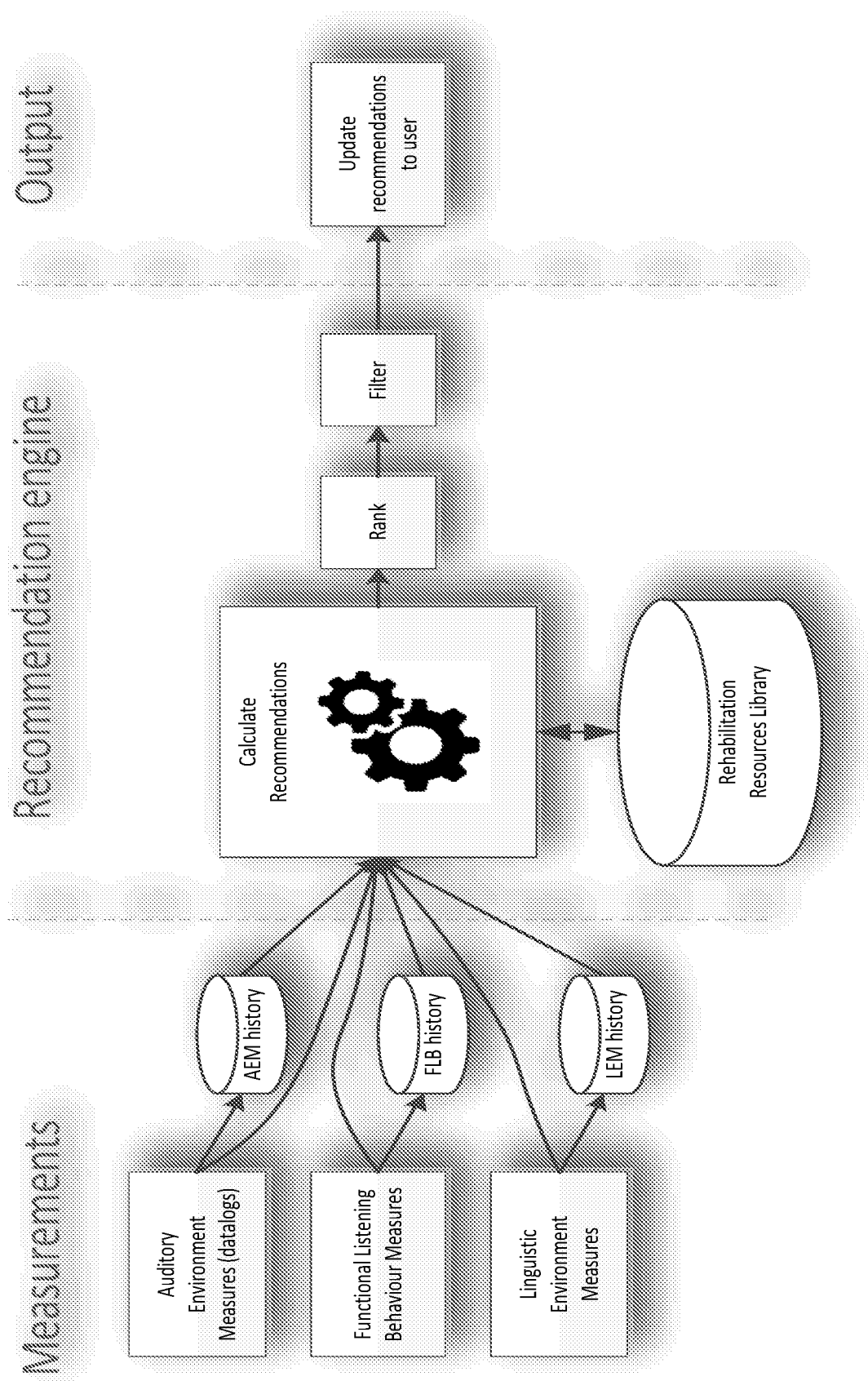
FIGS. 3 and 6 present schematics of exemplary systems.

FIG. 3 provides a system diagram of an integrated digital system capable of: using defined input metrics (i) (ii) and/or (iii) detailed above to generate goals for self-training or intervention/support; presenting personalized suggestions for activities and training drawn from a rehabilitation resources library; tracking and monitoring the user's progress; and/or updating recommendations in response to users progress and dynamic input metrics. Some additional features represented by the system of FIG. 3 will be described below.

Figure 4:
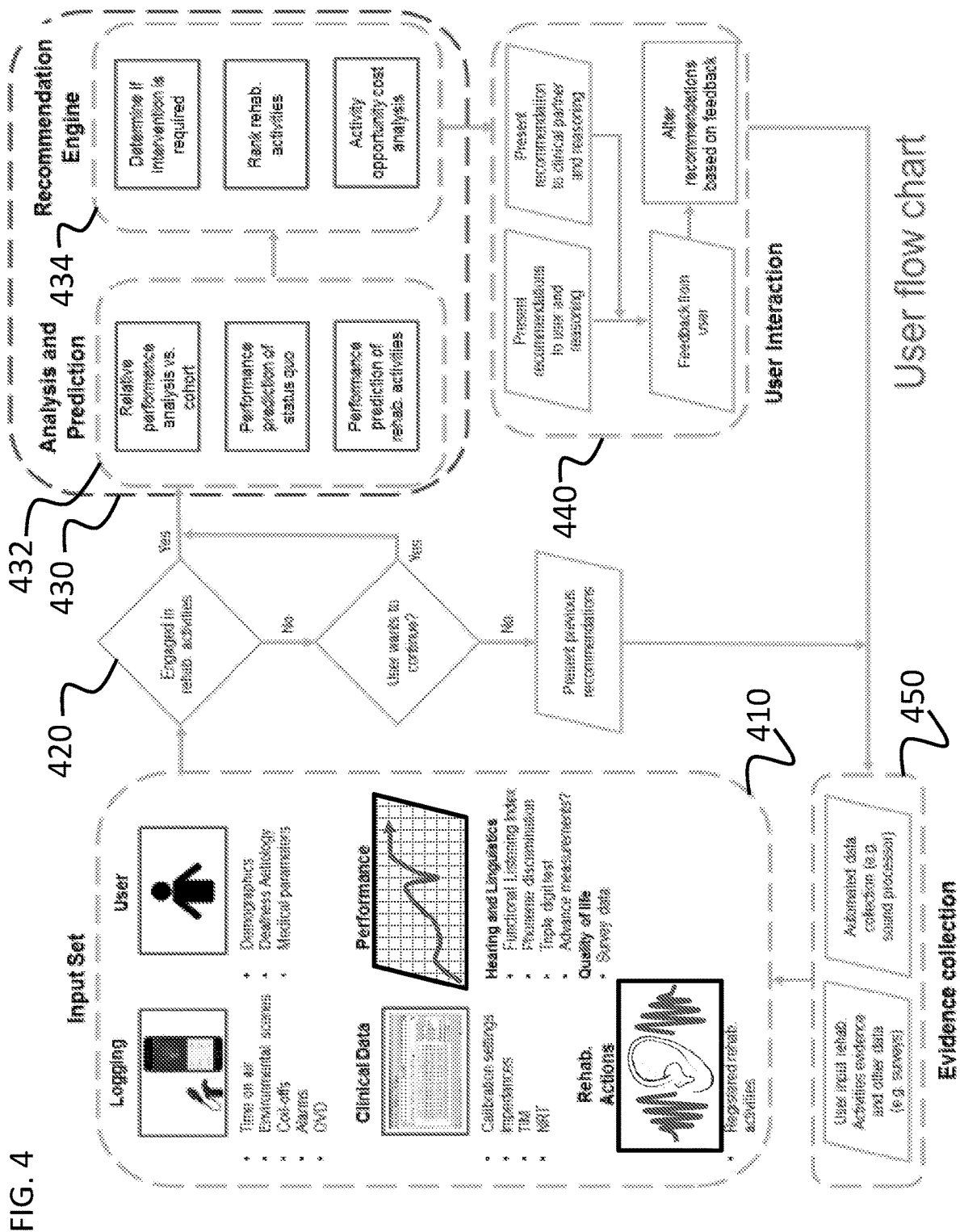
FIGS. 4 and 5 present exemplary flowcharts.

FIG. 4 is a representation of a patient, recipient and/or user flow chart of an exemplary embodiment of a rehabilitation/habilitation system according to an exemplary embodiment. An embodiment of this system can be utilized to influence/recipient/carer behavior such that they engage in activities that support improved outcomes over time. The following describes operation of an exemplary embodiment from a perspective of a hypothetical user. At action 410, there is initially a large number of variables inputted into the system, denoted under "Input Set." At action 420, the system verifies whether or not the user has engaged in previous rehabilitation activities. If they have, the user can progress along the flow. If not, there is an action of determining determine if the user want's system to rerun the recommendations.

It is noted that in at least some instances herein, the word "habilitation" or the word "rehabilitation" is utilized instead of the phrase "habilitation and/or rehabilitation." Any disclosure herein of one corresponds to a disclosure of both unless otherwise noted. In this regard, while the embodiment of FIG. 4 is presented as a rehabilitation system, embodiments also include implementing the embodiment of FIG. 4 as a habilitation system.

Action 430 includes analysis and prediction and recommendation. Action 430 is divided into a first sub-action, action 432, which includes analysis and prediction, and a second sub-action, action 434, which includes recommendation generation. Here, the system can be implemented to use the set of input data to determine such things as, for example, which cohort does the user belong to, where does the user sit in comparison to the rest of the cohort and is the answer a reasonable answer. The system can also predict where the recipient performance statistics are going to be according to the status quo and/or predict potential performance benefits from different interventions or rehabilitation activities.

Sub-action 434 utilizes a recommendation engine to generate recommendations. The recommendation engine can use a set of input data and the predictions. The result can be, from the relative performance vs. the user's cohort and the predictions, determine if intervention is required, ranking of rehabilitation activities, such as, for example, by the potential performance benefits. Also, the engine can determine a cost associated with this recommendation, and the ranking can be based on this cost.

Action 440 corresponds to a user interaction action, where the rehabilitation activities are presented to the user. In some embodiments, the activities are also presented to their allied professionals. At this action, the system can solicit feedback and change the recommendations based on the user's feedback. Action 450 includes evidence collection, which can include the collection of evidence of rehabilitation activities were engaged in, evidence of sound processor use and associated logging information, the collection of evidence from clinical partners. The collected evidence can be stored in the rehabilitation system's database.

Figure 5:
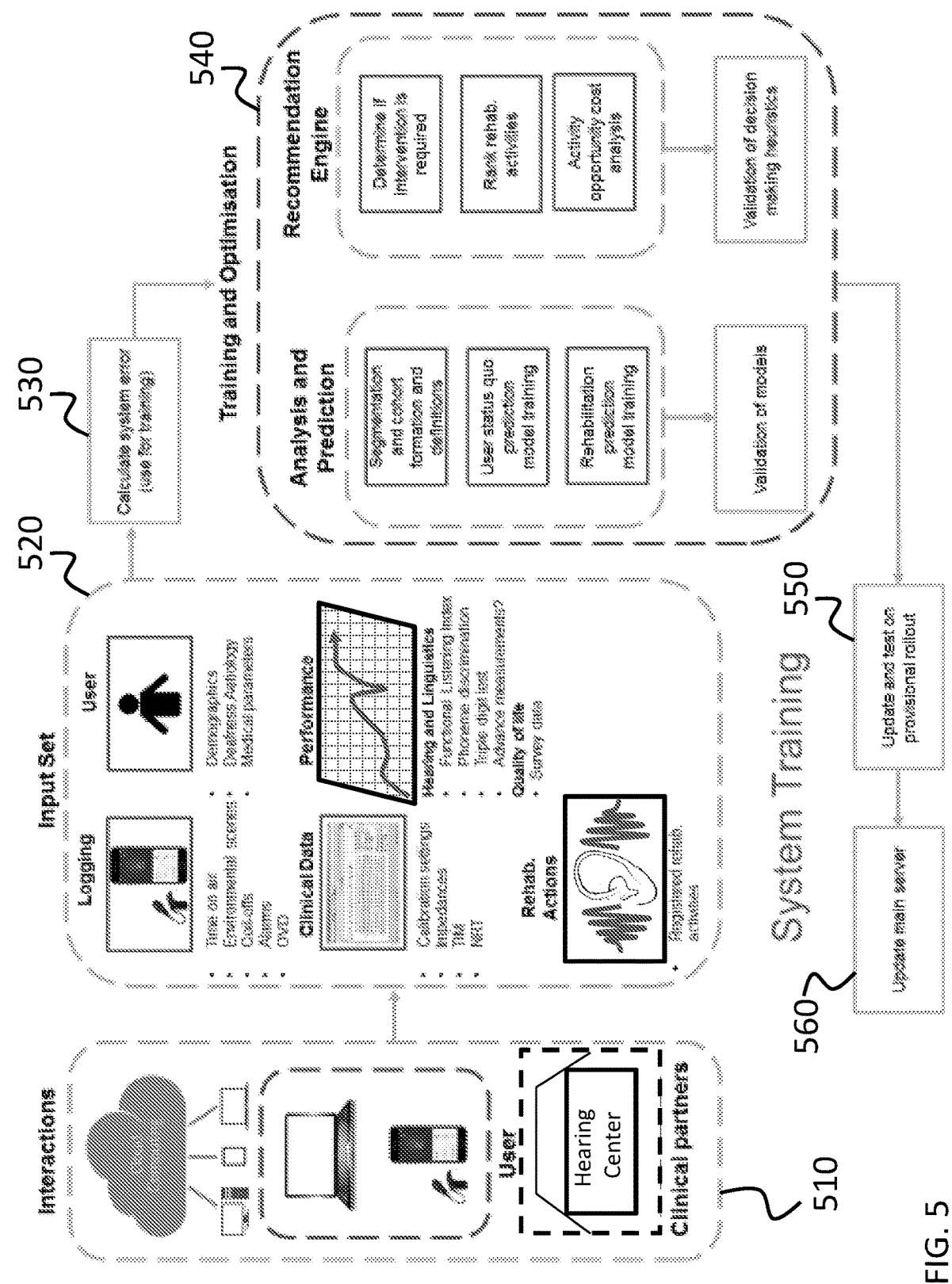

FIG. 5 displays a rehabilitation system training flow chart. The following describes operation of the technology from the perspective of the server or central control of the system. At action 510, the platform interacts with multiple of different types of user experiences (UX) and human-machine-interfaces (HMI). Here, data from clinical partners is obtained, such as, at the platform itself, via a link with a company that manufactures and/or manages and/or supplies the prosthesis, and/or via a third party data enrichment organization. Here, in some instances, all of the data collected will be stored in the database server. The types of data being collected are encompassed by the input data set. Action 520 corresponds to the action of inputting various types of data, such as that listed, wherein in some embodiments, the training of the models and algorithms utilize such. Action 530 corresponds to the calculation of system error for each recipient. The error can be an error in a predictive model(s) and/or the error in the recommendations of the interventions and rehabilitation activities.

Action 540 includes utilizing a training and optimization layer to improve the efficacy/accuracy of the models and algorithms. Here, in an exemplary embodiment, the input data of the population of recipients is split into at least two sets; the one set is for training and optimization and a second set is for validation. In an embodiment, if the validation of the models and accuracy display an improvement of the models and algorithms, the models and algorithms can be updated. After training and optimization, the updated models and algorithms are provisionally rolled-out at action 550 to determine whether the updated system has accrued any net benefits, and once it is verified that the system has accrued benefits, the system will be rolled-out across the user population at action 560.

Figure 6:
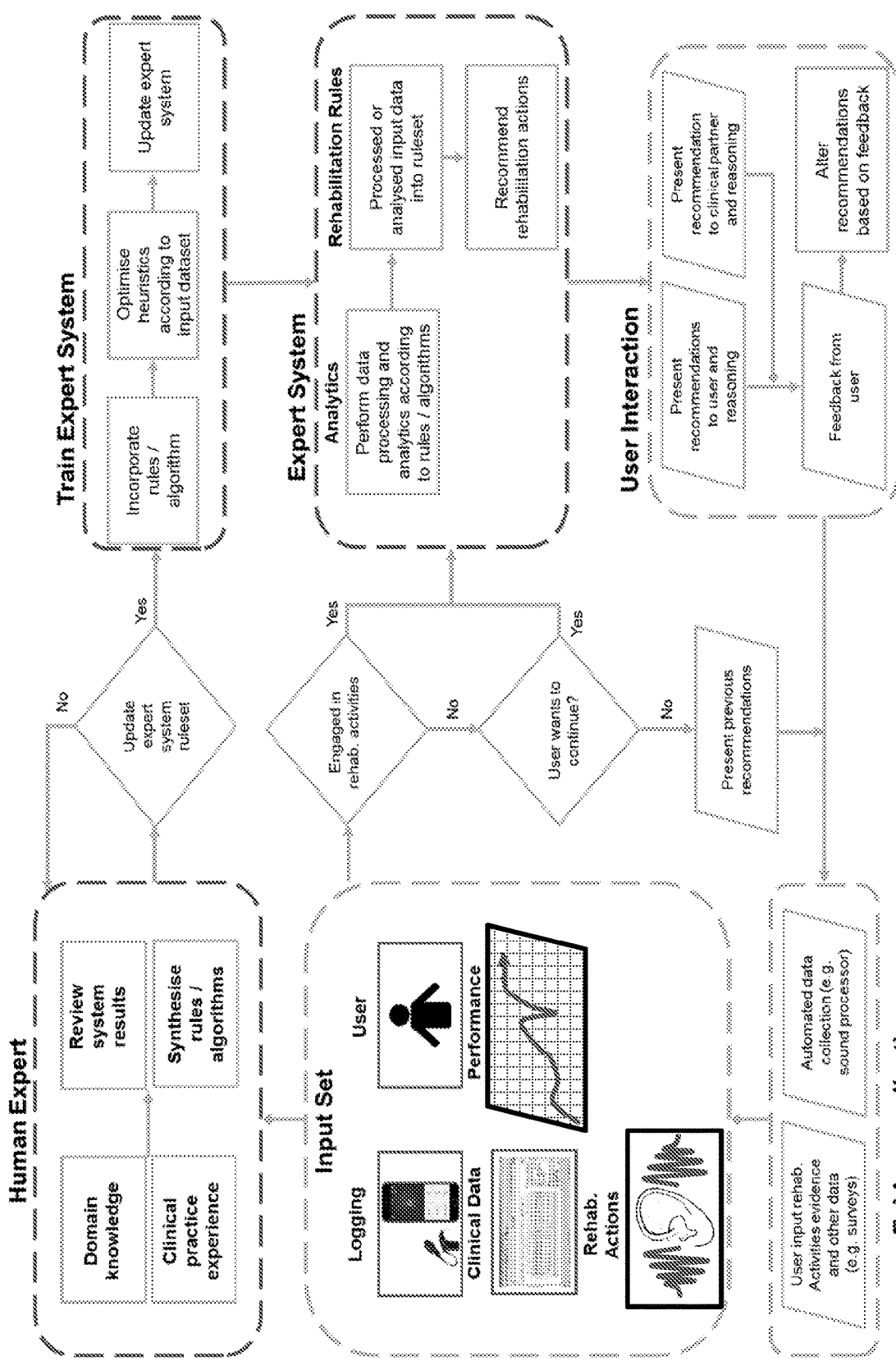

FIG. 6 presents a schematic representing an expert system foundation for AI learning that can be utilized in some embodiments. Here, in an exemplary embodiment, in order for the AI rehabilitation system to have a sufficient amount of data for training and validation ("big data"), an expert system is incorporated into the rehabilitation system. The expert system incorporates the factual domain knowledge and clinical experience of experts as heuristics such that given a set input settings rehabilitation actions and activities can be recommended to users and patients. Due the incorporation of domain knowledge and clinical experience of experts a lesser amount of data is required. As the rehabilitations platform is run and users interact with the platform, more data will be collected which will allow for the training of the AI engine (such as analytics and prediction section vis a vis a recommendation engine section).

In FIG. 6, the expert system component of the rehabilitation system is provided. Similar to the user flow chart of the rehabilitation system, input data about the user is collected, stored and submitted to the programmatic flow of the system. The main differentiation is the introduction of the human expert and the expert system. The input data is submitted to the human expert for review. With respects to the human expert's domain knowledge and clinical experience, the human expert will analyze and draw inferences from the data and then synthesis rules, algorithms and amendments. If it is decided that the Expert System should be updated, the Expert System will be trained. Training includes incorporating the new rules, algorithms and amendments; optimizing heuristics and algorithms according to input data such to maximize performance. Once the updates have been validated, the rehabilitation system's expert system is updated. During operation for the user, the input data is processed and then passed to the rule and algorithms that form a part of the expert system's recommendation engine. The output is a rehabilitation activity or set of activities. This information is presented to the user and allied professionals for review and feedback. The recommendations can then be altered according to feedback. Data is then collected about the user in terms of evidence that the rehabilitation activity has been engaged in and used the sound processor and accessories.

Some exemplary embodiments will now be described in terms of some exemplary methods. It is noted that in at least some exemplary embodiments, the devices and systems detailed above can be utilized to implement at least some of the method actions that will now be detailed.

First, in an exemplary method of obtaining data for use in the methods associated with FIGS. 3 and 4 detailed above will now be described. More specifically, FIG. 7 presents an exemplary algorithm for an exemplary method, method 700, which includes method action 710, which includes capturing voice sound with a machine, such as, for example, implant 100 and/or device 240 detailed above, or the system 210. In an exemplary embodiment, the captured voice can be captured by the microphone of the implant 100. In an exemplary embodiment, the voice can be recorded and stored in the implant 100 and/or in a component associated with the system 210 and/or can be uploaded via element 249 in real time or impartial real time. Any device, system, and/or method that can enable voice capture in a manner that will enable the teachings detailed herein can be utilized in at least some exemplary embodiments. It is noted that in at least some exemplary embodiments, the method further includes analyzing or otherwise reducing the captured voice to data indicative of the captured voice and/or data indicative of one or more properties of the captured voice, which data then can be stored in the implant of the system and/or communicated to a remote server, etc., to implement the teachings detailed herein. The data indicative of one or more properties of the captured voice will be described in greater detail below along with the use thereof. Ultimately, the data obtained in method action 710 can correspond to the linguistic environment measurements/the dynamic communication metrics detailed above.

Method 700 further includes method action 720, which includes logging data, wherein the logged data is non-voice based data corresponding to events and/or actions in a recipient of a hearing prosthesis's real world auditory environment, wherein the recipient is a person who spoke the captured voice and/or to whom the captured voice was spoken. In an exemplary embodiment, the data relates to the use of a hearing prosthesis by a recipient who spoke the captured voice and/or to whom the captured voice was spoken. In at least some exemplary embodiments, the logged data can correspond to the auditory environment measurements detailed above.

Concomitant with the teachings above, in an exemplary embodiment, the machine of method action 710 is a hearing prosthesis attached to a recipient or a smartphone, or a smart watch, or even a microphone associated with the internet of things, or a microphone of a tape recorder, etc. It can be any device that can enable the teachings herein. In an exemplary embodiment, the logged data is indicative of temporal data associated with use of the prosthesis. By way of example only and not by way of limitation, it can be a percentage of a day that the prosthesis is utilized. In an exemplary embodiment, it can be the number of hours per day per week per month etc., that the prosthesis is utilized. In an exemplary embodiment, it is the number of times in a given day or week or month etc. that the prosthesis is turned on and/or turned off or otherwise activated and/or deactivated. In an exemplary embodiment, the data indicative of temporal data associated with use of the prosthesis is associated with the time of day, whether the recipient is awake or asleep, etc. Any temporal data that can be utilized to implement the teachings detailed herein can be utilized in at least some exemplary embodiments.

In some embodiments, the logged data is indicative of whether a transcutaneous communication coil of the prosthesis is being used to communicate with another coil of the prosthesis. Again, this data can have temporal connotations associated therewith as well. In some embodiments, the logged data is indicative of what the recipient is listening to proximate the time that voice is captured. This is the so-called scene classification, as will be discussed in greater detail below. It is noted that logged data can correspond to multiple types of data. By way of example only and not by way of limitation, the data can include scene classification as well as the temporal data associated with the use of the hearing prosthesis. All of this data can be correlated in at least some exemplary embodiments so that the recipient's temporal use of the prosthesis can be evaluated with respect to the given scene that existed during the use (which includes non-use) of the prostheses.

It is noted that in at least some exemplary embodiments, there is a correlation between the data logging and the voice that is captured. That said, in some alternate embodiments, there is no correlation between the data logging in the voice that is captured. In this regard, in an exemplary embodiment, the teachings detailed herein that utilize the captured voice or the data associated with the captured voice as well as the logged data can utilize such even though there is no correlation between the two.

An alternate embodiment includes a method, comprising capturing an individual's voice with a machine and logging data corresponding to events and/or actions of the individual's real world auditory environment, wherein the individual is speaking while using a hearing assistance device, and the hearing assistance device at least one of corresponds to the machine or is a device used to execute the action of logging data.

By hearing assistance device, it is meant a hearing prosthesis as well as a device that simply help someone here, such as a device that is utilized with a smart phone and a headset or the like, which is not a hearing prosthesis. Indeed, in some embodiments, the hearing assistance device could be an amplified telephone.

It is noted that in an exemplary embodiment, the action of logging data includes logging data associated with the individual's voice sound, the captured voice. This logged data can be based on the captured sound that is captured by the machine or by another device, and thus can also be based on another source other than the machine. In an exemplary embodiment, the hearing assistance device is a hearing prosthesis, and is the machine that is utilized to capture the individual's voice. In an exemplary embodiment, the hearing assistance device is not hearing prostheses, but is still the machine that is utilized to capture the individual's voice. In an exemplary embodiment, irrespective of whether or not the hearing assistance device is a hearing prosthesis, another device other than the hearing assistance device is utilized to capture the individual's voice.

In an exemplary embodiment, the aforementioned method can entail capturing an individual's voice with a machine, and logging data associated with the individual such as, for example, how many times the individual speaks over a given temporal period, the length of the utterances of the individual, etc. To be clear, capturing an individual's voice is different than logging data associated with the individual's voice. Note further that in some embodiments, the logged data has nothing to do with the individual's voice that is captured. Thus, in an exemplary embodiment, the logged data is non-voice based data.

In an exemplary embodiment, the action of capturing the individual's voice includes capturing voice of the individual and excluding the capture of voice originating from any other source other than the individual. In an exemplary embodiment, as noted above, the hearing assistance device is a hearing prosthesis, and in some embodiments, the hearing prosthesis is attached to the individual, and the logged data is non-voice based data relating to use of a hearing prosthesis by the individual. By way of example only and not by way of limitation, the logged data can be how often the hearing prosthesis is utilized turned on, turned off, etc. thus, in an exemplary embodiment, the logged data is indicative of whether a transcutaneous communication coil of the prosthesis is being used to communicate with another coil of the prosthesis. Again, any of the logged data detailed herein can correspond to the logged data of this method, and thus the logged data can be indicative of temporal data associated with use of the hearing assistance device.

Concomitant with the teachings above or below, the logged data is indicative of what the individual is listening to proximate the time that voice is captured and/or the logged data is indicative of how the prosthesis is being used and/or whether the prosthesis is being used.

Any of the method actions detailed herein can be included or otherwise combined or otherwise utilized in an expanded version of this method, such as analyzing the captured voice to determine a characteristic associated thereof, or analyzing the captured voice to determine at least one characteristic of a language development environment associated with the voice.

FIG. 8 presents an exemplary algorithm for an exemplary method, method 800, which includes method action 810, which includes executing method 700. Method 800 also includes method action 820, which includes analyzing the captured voice to determine a characteristic associated thereof. In an exemplary embodiment, this is a determination of at least one characteristic of a language development environment associated with the voice sound. This is described in greater detail below. However, briefly, it is noted that in at least some embodiments, method action 820 can be executed by the prosthesis and/or by the device 240 and/or by a remote component, such as a device associated with the Internet of things, etc. Still further, in an exemplary embodiment, the voice sound can be transmitted wirelessly and/or in a wired matter in real time or in packets or the like to a remote device which executes method action 820, such as a remote device/system/server remote from the input portion according to the embodiments of FIGS. 3 and/or 4 detailed above and/or as detailed below.

It is noted that method action 820 can include analyzing the captured voice for such things as pronunciation and/or what is being said, either to the recipient of the hearing prosthesis and/or by the recipient of the hearing prosthesis. Moreover, an analysis can be evaluated to determine whether or not speech/voice that is captured is part of a conversation. In this regard, embodiments can be utilized where the metrics associated with how often or the length of conversations that the recipient engages in indicates the recipient status with respect to his or her ability to hear with the hearing prostheses. In an exemplary embodiment, a determination where the recipient engages in a limited number of conversations and/or engages in conversation that are only brief can indicate that the recipient is not habilitating and/or rehabilitating by an amount that otherwise should be the case for that recipients given cohort.

In an exemplary embodiment, there is the analysis and/or measurement of speech production deviance in terms of intelligibility ratings, which can be monitored, and can be used as an indicator as to whether or not the recipient is progressing in the habilitation and/or rehabilitation journey.

Moreover, what is being said by the recipient and/or to the recipient can be an indicator as to whether or not the recipient is progressing in the habilitation and/or rehabilitation journey. In this regard, if the recipient frequently uses small words and limited vocabulary when speaking, even to adults or the like, this can be an indicator that the recipient's habilitation and/or rehabilitation has been stunted or otherwise is not progressing along the lines that otherwise could be. Moreover, if the recipient speaks slowly and/or if the people that talk to the recipient speak slowly, that too can be an indicator that the recipient's habilitation and/or rehabilitation has been stunted or otherwise is not progressing along the lines that otherwise could be the case. Pronunciation as well can be an indicator. If words are being pronounced in a manner that would be analogous to someone having a diagnosis of a speech impediment, with a recipient does not have one, such can be an indicator of lacking progress.

In another exemplary embodiment, an analysis of the speech can be made to determine whether or not the recipient is utilizing what can be considered to be speech influenced by hearing impairment. In other words, how much of the recipient's speech is consistent with somebody who is deaf or otherwise has a significant hearing impairment. Machine-based systems can be utilized to determine such. In an exemplary embodiment, an analysis can be made as to whether or not the recipient's voice includes certain frequencies or whether or not the recipient voice does not include certain frequencies, which can be an indicator of how well the recipient's hearing.

It is noted that the corollary to the above is that if the recipient's voice is to use a simple word, such would be an indication that the recipient is progressing well with respect to his or her habilitation and/or rehabilitation.

It is noted that while the teachings detailed herein are often directed towards recipients of a hearing prosthesis, other embodiments include teachings that are directed to those without a hearing prosthesis. Accordingly, any disclosure herein with respect to a person who utilizes a hearing prosthesis corresponds to a disclosure in another embodiment of teachings that are directed towards a person who does not utilize a hearing prosthesis, and vice versa.

Accordingly, method action 820 can be a method action that includes analyzing the voice sound to determine or otherwise ascertain one or more the characteristics just detailed.

It is briefly noted that while some embodiments are directed towards capturing voice with a machine, other embodiments are directed towards capturing voice or capturing sound only with the prosthesis. Accordingly, in an exemplary embodiment, any disclosure of capturing voice or capturing sound with a machine corresponds to a disclosure of capturing voice and/or capturing sound only with a hearing prosthesis is otherwise noted. That said, in an alternate embodiment, any disclosure herein of capturing voice and/or capturing sound with a hearing prosthesis also corresponds to a disclosure in an alternate embodiment of capturing voice and/or sound with a non-hearing prostheses machine.

FIG. 9 presents another flowchart for another exemplary method, method 900, which includes method action 910, which includes executing method 700. It is noted that in an alternate embodiment, method action 910 can correspond the execution of method 800 or any other method detailed herein associated there with, or any other additional method actions that can have utilitarian value. Indeed, method action 910 includes analyzing the captured voice and the data obtained in method 7000 to identify at least one of (i) a weakness in an impaired hearing person's habilitation or rehabilitation regime or (ii) a real-world scenario identified by using the voice sound and/or the data as latent variables. In this regard, this is concomitant with actions 430/432/434 above as detailed with respect to FIG. 4, where if the system detailed above is used, the system solicits feedback and changes the recommendations based on the user's feedback.

Figure 10:
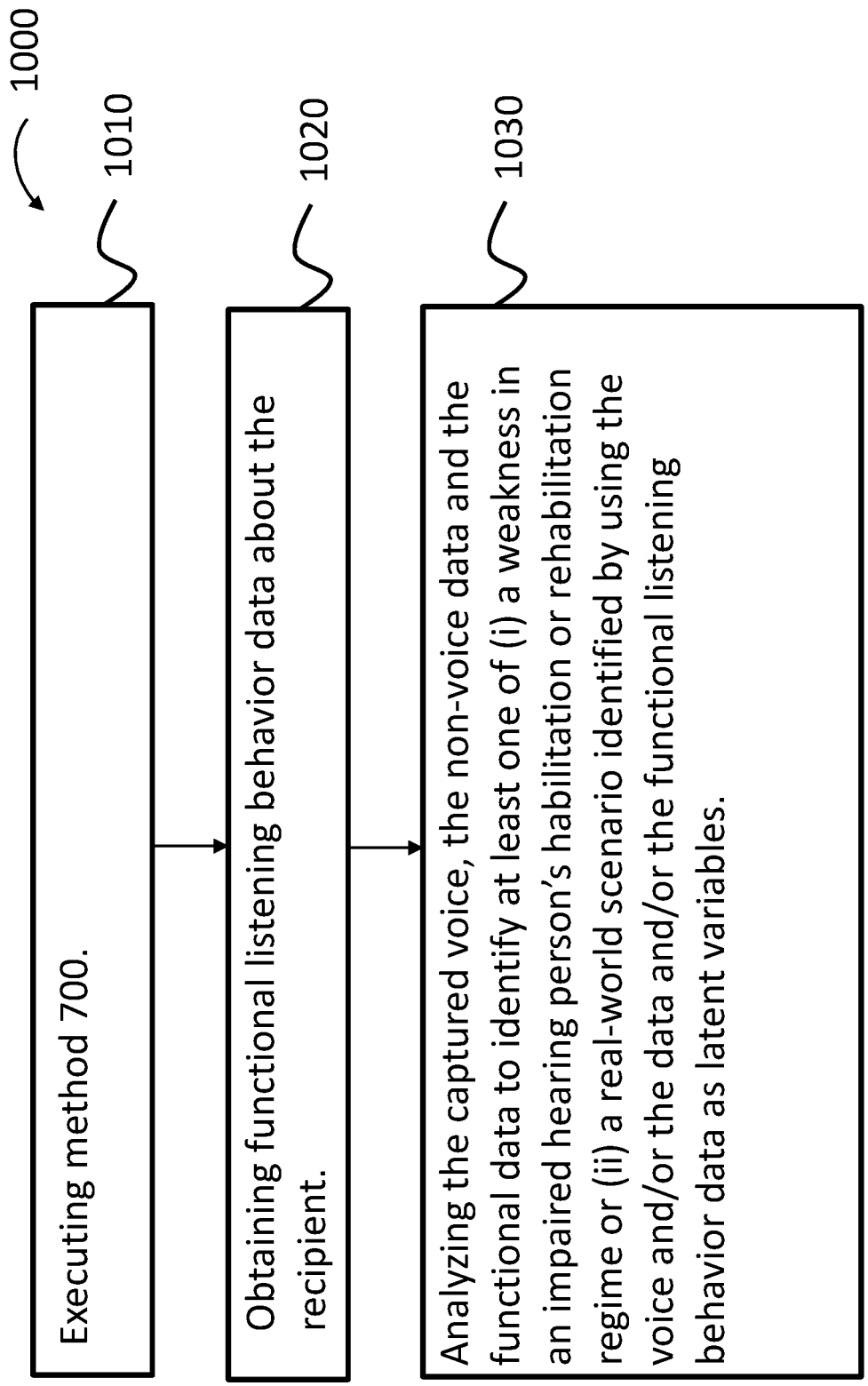

Some additional details of the identification of the weakness and real-world scenarios are discussed immediately below, but first, another embodiment utilizing method 700 is described, with respect to FIG. 10, which presents a method, method 1000, includes method action 1010, which includes executing method 700 and/or variations thereof. Method 1000 also includes method action 1020, which includes obtaining functional listening behavior data about the recipient, which functional listening behavior data can correspond to that detailed above, and thus can include obtaining indices of functional auditory behavior for children and/or adults across the age spectrum.

Method 1000 also includes method action 1030, which includes analyzing the captured voice, the non-voice data and the functional data to identify at least one of (i) a weakness in an impaired hearing person's habilitation and/or rehabilitation regime or (ii) a real-world scenario identified by using the voice sound and/or the data and/or the functional listening behavior data as latent variables. With respect to the former, the identification of a weakness in an impaired hearing person's habilitation and/or rehabilitation regime, as will be detailed in greater detail below, in an exemplary embodiment includes determining whether or not to intervene in the regime. Accordingly, method such as method 1000 and method 800 and method 900 can enable a determination as to whether or not an intervention is utilitarian. Accordingly, in an exemplary embodiment, at least some of the teachings detailed herein can be utilized to detect or otherwise determine that there is a problem with a habilitation and/or a rehabilitation regime, and also can determine that there is no habilitation and/or rehabilitation regime.

It is briefly noted that while some embodiments disclosed herein are directed towards the utilization of the log data as representing latent variables for features that the data are believed to represent, in alternative embodiments, the data is not utilized as latent variables, but instead is utilized as representative of that to which the data exactly corresponds.

In fact, with respect to the latter, it is entirely possible that in some scenarios, there is no meaningful habilitation and/or rehabilitation regime in place for a recipient. By way of example only and not by way of limitation, in an exemplary embodiment, for lack of a better phrase, a scenario can exist where a hearing impaired person has "slipped through the cracks." In this regard, in an exemplary embodiment, the teachings detailed herein can be utilized to identify such persons. That is, the teachings herein can be utilized to determine whether or not a person needs a habilitation and/or rehabilitation regime where none previously existed.

The below table presents an example of an execution of method 900 or 1000, for a case of a pediatric six month post cochlear implant 18 months of age, enrolled in day care 6 weeks prior to the implementation of the beginning of the method:

| Measurements | What might be going on in the real world? | Output & recommendations |
|---|---|---|
| Auditory Environment Metrics (Auditory diet) | Significant increase in number of coil off incidents. 75% of "time on air" in "noise" or "speech in noise" environments over the last month compared to previous 30% average. | Child may be pulling the coil off. Coil may be falling off. There has been a marked change in the daily sound environment as indicated by a significant increase in time spent in noise or speech in noise | Listening in background noise is more challenging than listening in quiet. Particularly in the early stages it can be helpful to reduce the level of background noise and be close to your child so that they can hear as clearly as possible. Consider the use of |

-continued

| Measurements | What might be going on in the real world? | Output & recommendations |
|---|---|---|
| Functional Listening Metrics | Early sound awareness skills developed along normal trajectory following implantation. Last 6 weeks indicate slowing progress with flattened trajectory | Indicates potential access issues. The child is a new listener and the majority of speech is currently presented innoise; progress is slowing. | wireless accessories. Suggestions for games and activities to play based on child's own functional auditory behaviour level. Ideas and strategies for encouraging turn taking using communication temptations and practicing waiting. You want to avoid the following: |
| Linguistic Environment Metrics | Low level of conversational turns by child over last month. | If there is too much pressure to speak this can result in a child shutting down and not speaking at all. Adults may be dominating the conversation with a baby by taking more turns than the baby or bombarding the child with language. Potential access issues in noise. | Phrases like "Billy, say _____!" or "Emma, can you say _____?" The "testing" type questions like "What is this?" Instead, focus on reciprocal and responsive interactions with equal give-and-take |

The below table presents an example of an execution of method 900 or 1000, for a case of an adult six month post cochlear implant, where the adult is a senior adult, retired from work 10 months prior to the implementation of the beginning of the method:

| Measurements | What might be going on in the real world? | Output & recommendations |
|---|---|---|
| Auditory Environment Metrics (Auditory diet) | Time on air averaging 5 hours per day. 50% of time on air in "quiet". Reduction in time spent in Music environment over last 3 months. | Possible lack of confidence in listening with the cochlear implant. Regular usage would be 8 + hours per day Music may sound too different to auditory memory. Indicates need to train the brain to process and understand auditory information. | Learning to listen through a cochlear implant requires new skills-most people find it challenging at first. Improve auditory attention to environmental sounds by taking "listening walks." Request assistance from family members to alert you to environmental sounds you do not notice or identify. Getting back in to conversation should help with your listening & |
| Functional Listening Metrics | Speech perception in quiet 80%. Prefers one on one conversations in quiet. Reports fatigue in social situations. | Although speech perception levels in quiet are good, the recipient may have withdrawn from family and friends as their hearing loss progressed and they | |

| Measurements | | What might be going on in the real world? | Output & recommendations |
|---|---|---|---|
| | Not using repair strategies | need support to re-engage. May not feel confident in a group and withdraw to a quiet environment | communication skills. Suggested practical activities and strategies for increasing device use; time in speech; and reconnecting with music through focused practice. |
| Linguistic Environment Metrics | Little initiation of conversational turns by recipient. Conversational rallies average only 2-3 turns. | Some people will have gotten out of the habit of conversing due to their hearing loss over time. Suggests lack of confidence and avoidance of social communication. | |

As seen from the above, embodiments include analyzing the captured voice and the data obtained by the methods herein to identify a habilitation and/or rehabilitation action that should be executed or should no longer be executed. Thus, FIG. 11 presents another exemplary algorithm for an exemplary method, method 1100, which includes executing method action 1110, which includes executing method 700 and/or executing method 700 and method action 1020, and then executing method action 1120, which includes analyzing the captured voice and the data to identify a habilitation and/or rehabilitation action that should be executed or should no longer be executed.

As seen above, the identification of a real-world scenario based on the voice sound and/or the data and/or the functional listening behavior data is developed based on utilizing voice sound and the data and the functional listening behavior data as latent variables. In this regard, the method is executed by extrapolating certain things from the underlying data. That said, in some alternate embodiments, the identification is executed in a manner where the data is not utilized as representative of latent variables. It is noted that in some instances, method 1000 and method 1100 are executed where the identifications of the real-world scenarios are a result of utilizing only one or only two of the three possible sources of the latent variables. Indeed, with reference to the tables detailed above, as can be seen, the analyzed captured voice is utilized to develop one real-world scenario, the non-voice data is utilized to develop another real-world scenario, and the functional data is utilized to develop a third real-world scenario (but in some embodiments, the scenario is not mutually exclusive).

Figure 12:
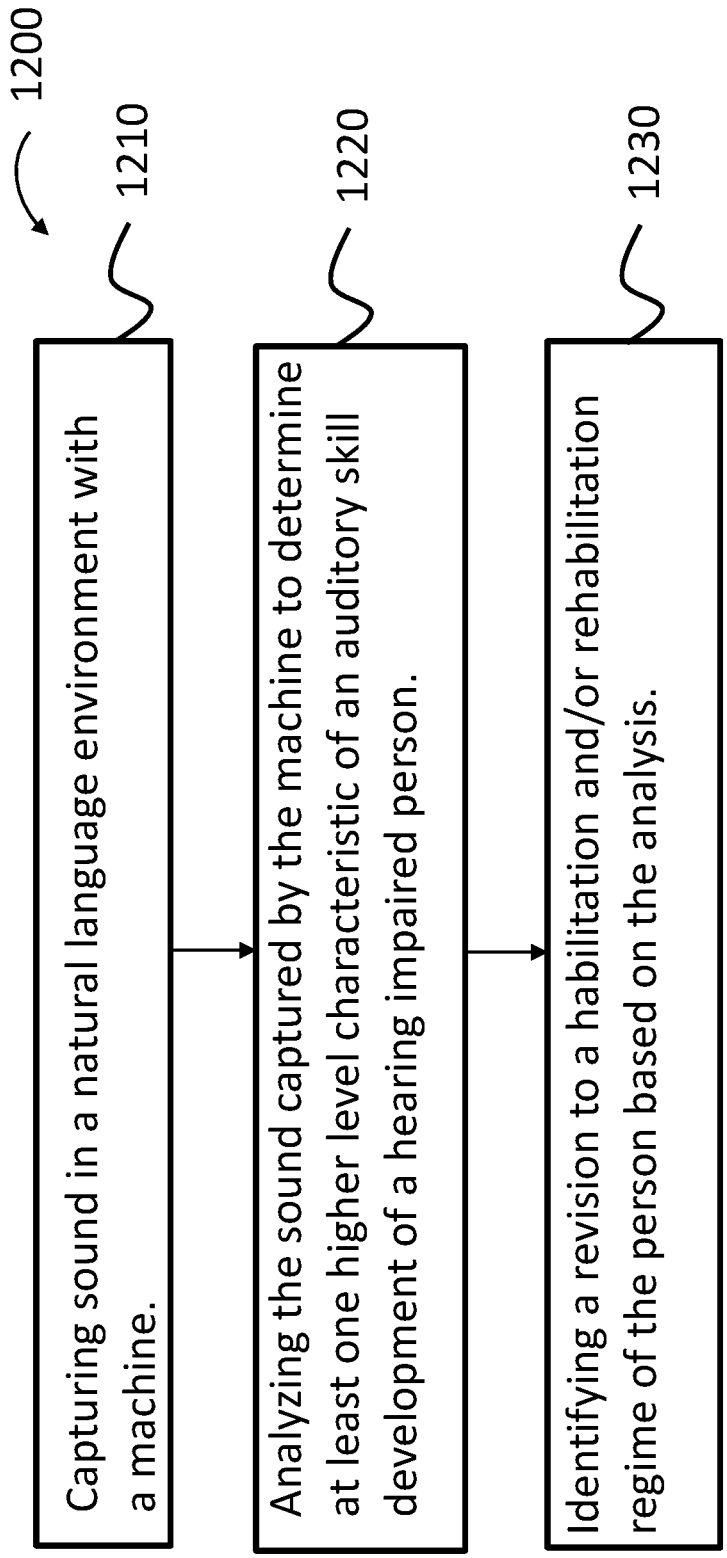

Some exemplary embodiments include utilizing the prosthesis 100 detailed above and/or the device 240 detailed above, or the system 210, or any other machines available that can implement such, to implement method 1200 of FIG. 12. Method 1200 includes method action 1210, which includes capturing sound in a natural language environment with a machine, and method action 1220, which includes analyzing the sound captured by the machine to determine at least one higher level characteristic of an auditory skill development of a hearing impaired person. This can be executed automatically and/or non-automatically, and, in some embodiments, is executed by the devices just detailed, and/or can be executed by the systems of FIGS. 5 and 6 detailed above, or by any other device and/or system that can enable this action. Method 1200 also includes method action 1230, which includes identifying a revision to a habilitation and/or rehabilitation regime of the person based on the analysis, where this action can be executed in an automated manner as well, and in other embodiments in a nonautomated manner. Key to this method is the determination of the at least one higher level characteristic of an auditory skill development of a hearing impaired person. It cannot be something that is not a higher level characteristic of an auditory skill development. In this regard, by way of example only and not by way of limitation, the meaning of higher-level characteristics corresponds to that the person of ordinary skill would understand in view of Dr. Elizabeth B. Cole's work as detailed in her work, Listening and Talking: A Guide to Promoting Spoken Language in Young Hearing-Impaired Children, of McGill University, Montreal, Québec, Canada, as associated with the Alexander Graham Bell Association for the Deaf, Washington DC, 20007. It is briefly noted that while Dr. Cole's work has been directed towards children, her work is also applicable to adults as well at least with respect to implementing the teachings herein.

In this regard, in the work Listening and Talking, Dr. Cole details levels of auditory skill development, where there exists a hierarchy of auditory skill development that is very helpful in understanding the evolution of auditory processing capabilities. In this regard, there is an initial level (a lower-level) identified as detection, which is the ability to determine the presence or absence of sound. Detection occurs when sound received through an individual's sensory receptors such as the hair cells in the inner ear, and the acoustic stimuli subsequent to the art recognized as sensation by the person receiving the sound input. Of course, this would be different with respect to the utilization of a cochlear implant, where the electrical stimulation bypasses the hair cells, but the underlying concept still applies. The person's response to the pure tones (or the electrical stimulation by the cochlear implant to evoke the sensation of pure tones) used in audiometric testing is an example of a detection task. Such would be explicitly excluded from method 1200. There is also another level, above that first level, but still a lower-level task, referred to as discrimination. This level of auditory skill development is the ability to perceive differences between sounds. For example, difference in sound qualities, intensities, duration and/or pitches. This is a lower-level task as well and is not included in the method 1200.

After that, there is the next level, which is identification, which corresponds the ability to recognize an environmental sound, and label or name what has been heard by repeating, pointing to, or writing the word or sentence that has been perceived. Here, this is within the realm of a higher level characteristic of an auditory skill development, and thus is included in the method 1200. It is also noted that there is an even more higher-level characteristic, which corresponds to comprehension. This is considered the ultimate goal of auditory processing, and is the highest level of auditory skill development. Comprehension is the ability of an individual to understand the meaning of acoustic messages by reference to his or her knowledge of language. Comprehension can be demonstrated by skills such as following oral directions, answering questions about a story, paraphrasing a story, giving the opposite of a word, and/or communicating appropriately. Comprehension of acoustic messages cannot occur unless and until the person has attained skills in the previous three auditory levels.

Thus, in an exemplary embodiment of method 1200, the higher-level characteristic is an ability of the person to identify the captured environmental sound. Still further, in an exemplary embodiment of method 1200, the higher-level characteristic is the ability of the person to comprehend the environmental sound.

It is also noted that at an even higher level than those just detailed, there exists the communication level, which corresponds to the ability to navigate through the world responding to highly variable rapidly changing speech/voice sounds with the recipient's behavior. Thus, there is a method of capturing sound in a natural language environment with a machine, analyzing the sound captured by the machine to determine at least one higher level characteristic of an auditory skill development of a hearing impaired person, and identifying a revision to a habilitation and/or rehabilitation regime of the person based on the analysis, wherein the higher level characteristic is an ability of the person to identify, comprehend and/or communicate by responding to voice directed at the person.

It is briefly noted that in at least some exemplary embodiments, a variation of method 1200 includes executing method action 1210 and 1220 without method action 1230, or executing an alternate method 1230 which includes implementing a habilitation and/or rehabilitation regime where none previously existed based on the analysis of method 1220.

In an exemplary embodiment of method 1200 or variations thereof, the hearing impaired person is a prepubescent, and the revision to the habilitation and/or rehabilitation regime includes changing a way of speaking to the person. In an exemplary embodiment, the person is a post-pubescent and the revision to the habilitation and/or rehabilitation regime includes increasing a time in a speech environment.

Concomitant with the teachings above, action 1230 can be a result of using the teachings of FIGS. 3, 4, 5, and/or 6 above.

Figure 13:
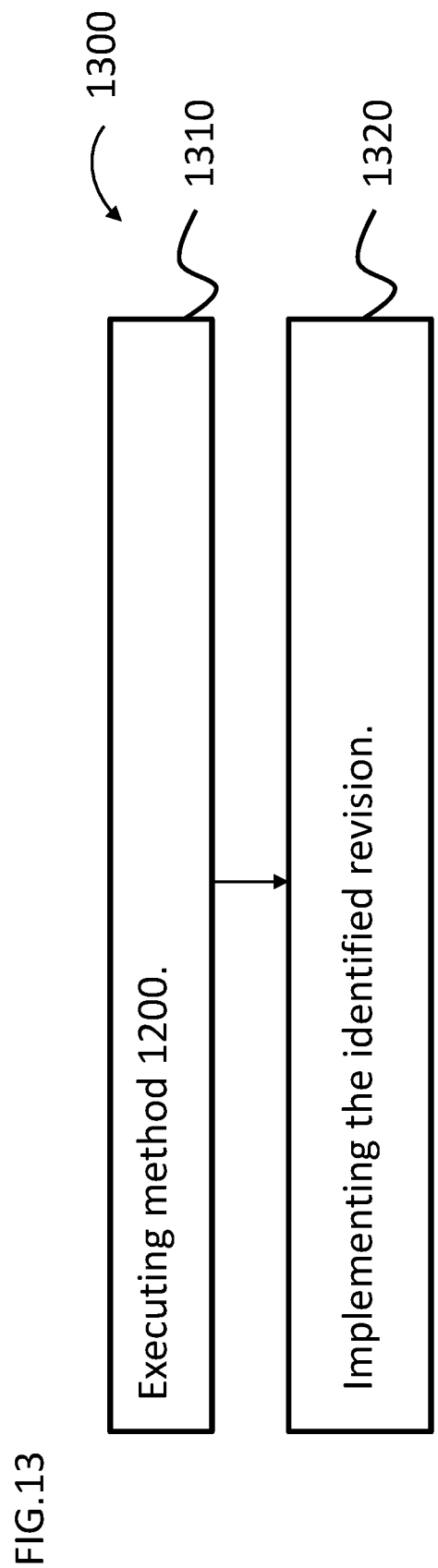

FIG. 13 presents an exemplary algorithm for another exemplary method, method 1300, which includes method action 1310, which includes executing method 1200, or in some embodiments, a portion of method 1200. Method 1300 also includes method 1320, which includes the action of implementing the identified revision. By way of example only and not by way of limitation, with respect to the prepubescent child example detailed above, the implementation would be for the parent or caregiver to change the way that he or she speaks to the prepubescent child.

In an exemplary embodiment of method 1200, the action of analyzing the sound captured by the machine includes analyzing voice sound of the person with voice sound of a second person speaking to the person to determine a level of comprehension by the person, and the action of identifying the revision includes identifying the revision based on the determined level of comprehension by the person. By way of example only and not by way of limitation, if the second person speaking to the person with the hearing impediment is being asked certain questions, and the answers given by the person with the hearing impediment is providing the wrong answers or providing the right answers, such can determine the level of comprehension by the person. Moreover, in an exemplary embodiment, irrespective of the questions, the way in which the second person speaks to the person with the hearing impediment can be indicative of how that second person perceives the person with the hearing impediment's ability to comprehend. By way of example only and not by way of limitation, if the second person speaks exceedingly slow and/or exceedingly loud, that can be an indication that the person cannot comprehend what the second person is saying. Further by way of example only and not by way of limitation, if the second person is utilizing short tiny simple words, such can be an indication of how that second person perceives the comprehension level of the person with the hearing impediment. Indeed, in an exemplary embodiment as detailed above with respect to revising a habilitation and/or rehabilitation regime, the language of the second person could be the basis for the revision, such as, for example, stop speaking in a manner that slows the person with a hearing impediment's habilitation rehabilitation progress, or utilize more sophisticated words or speak faster so as to exercise the recipient's cognitive abilities to improve his or her rehabilitation and/or habilitation progress.

Concomitant with the embodiments detailed above, in an exemplary embodiment, the person that is the subject of method 1200 is a post-pubescent mentally healthy adult with a cochlear implant. Further, the action of analyzing the sound captured by the machine includes analyzing voice sound of the person with voice sound of a second person speaking to the person to determine a level of comprehension by the person, and the action of identifying the revision includes identifying the revision based on the determined level of comprehension by the person. In an exemplary embodiment of method 1300, the implementation of the identified revision can include, for example, recipient's wife or husband speaking to him or her differently, etc.

An alternate embodiment of method 1200 includes also analyzing the sound captured by the machine to determine at least one non-higher level characteristic of an auditory skill development of a hearing impaired person, and identifying a revision to a habilitation and/or rehabilitation regime of the person based on the determined at least one non-higher level characteristic in addition to the determined at least one higher level characteristic. That said, an alternate embodiment of method 1200 includes explicitly not analyzing the sound captured by the machine to determine at least one non-higher level characteristic of an auditory skill development of a hearing impaired person, and/or explicitly not identifying a revision to a habilitation and/or rehabilitation regime of the person based on any non-higher level characteristic.

Some additional details associated with method 1200 are detailed below. Indeed, some additional details associated with the action of capturing voice and/or sound and analyzing the captured voice and/or sound or detailed below. First, however, another innovative method is described.

Figure 14:
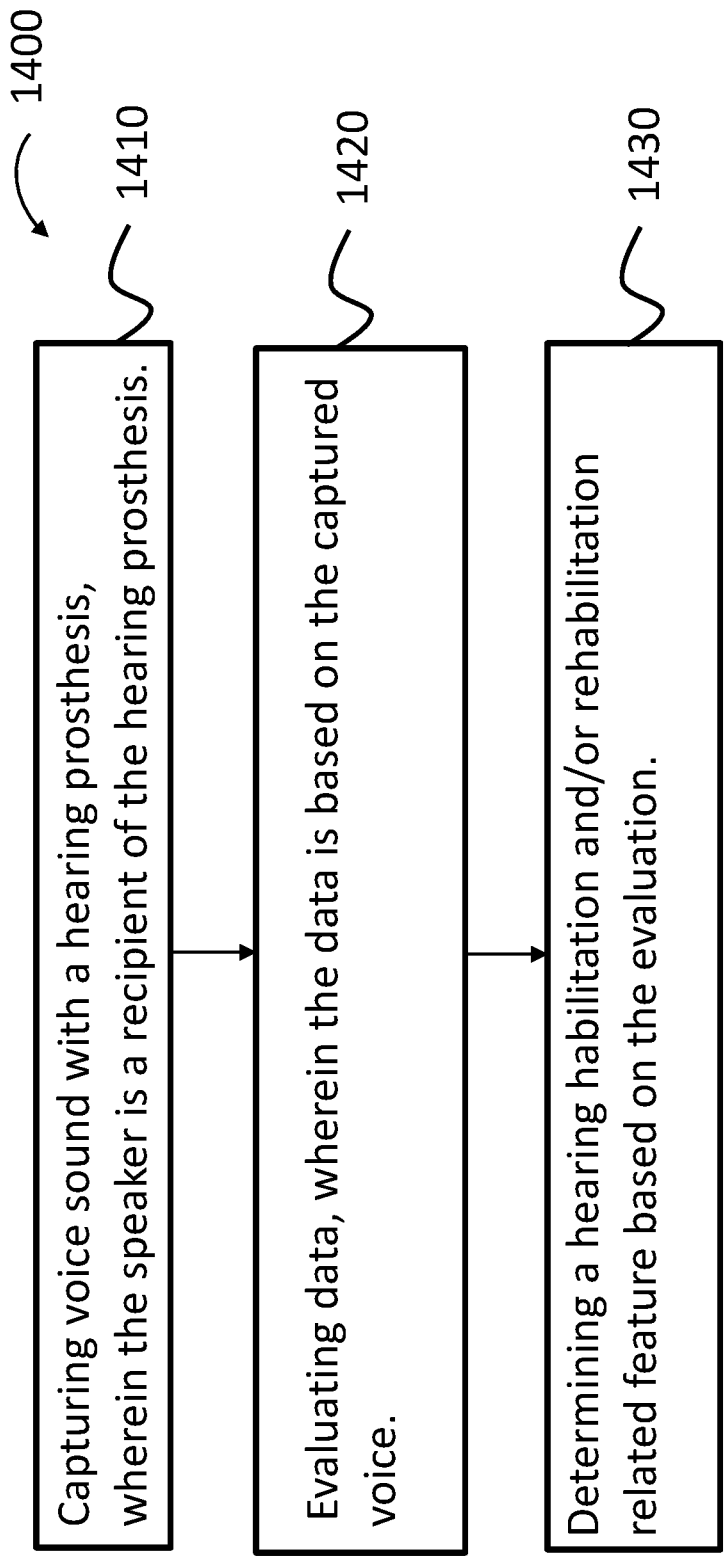

FIG. 14 provides an exemplary algorithm for an exemplary method, method 1400, which includes method action 1410, which includes capturing voice sound with a hearing prosthesis, wherein the speaker is a recipient of the hearing prosthesis. Method 1400 also includes method action 1420, which includes evaluating data based on the captured voice, and includes method action 1430, which includes determining a hearing habilitation and/or rehabilitation related feature based on the evaluation.

Figure 15:
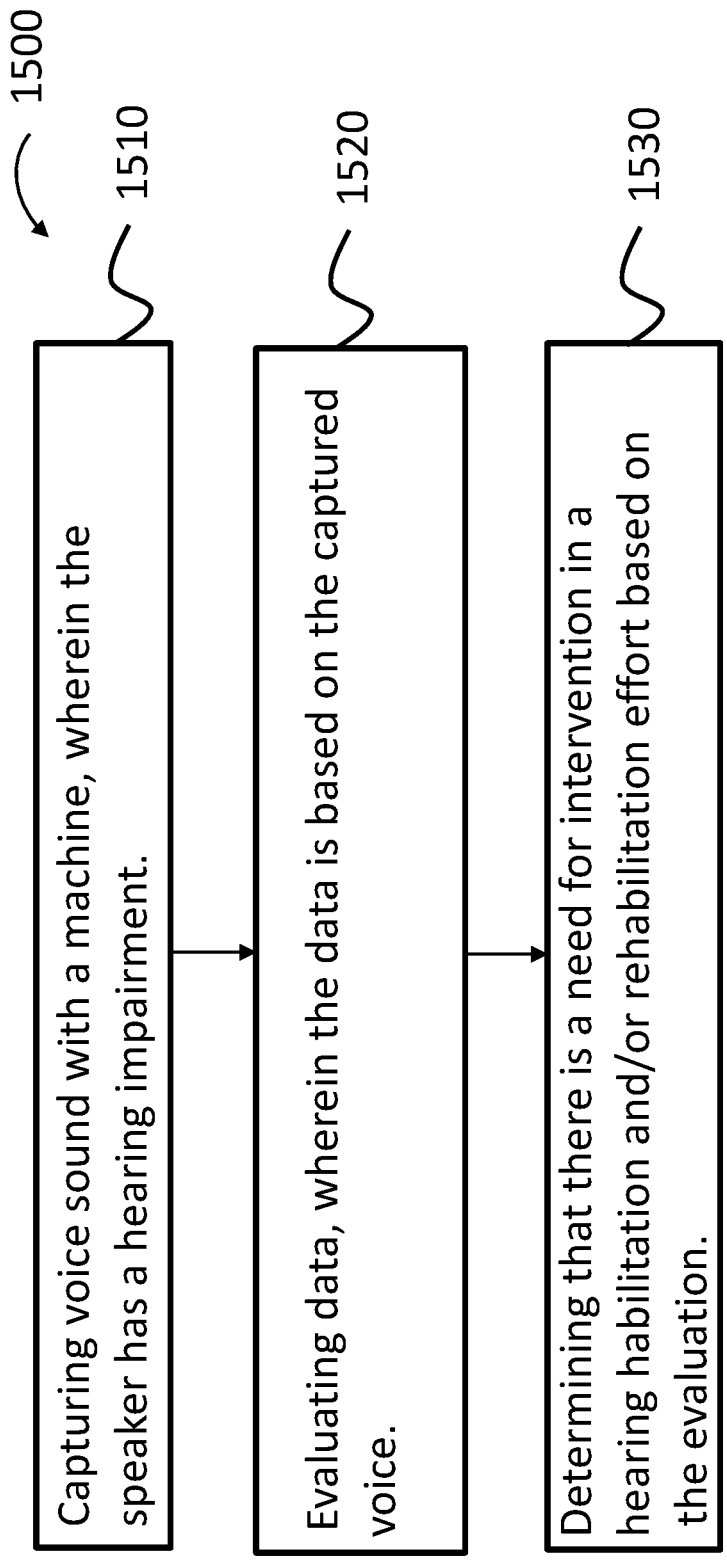

In a variation of method 1400, there is method 1500, where FIG. 15 presents an algorithm for such method. Method 1500 includes the action of capturing voice sound with a machine, wherein the speaker has a hearing impairment, as represented by block 1510 of FIG. 15. Method 1500 also includes method action 1520, which includes evaluating data, wherein the data is based on captured voice. Method 1500 also includes method action 1530, which includes the action of determining that there is a need for intervention in a hearing habilitation and/or rehabilitation effort based on the evaluation. Again, as detailed above, this can be a determination that someone who does not have a habilitation and/or rehabilitation regime needs a habilitation and/or rehabilitation regime.

To be clear, simply utilizing a hearing prosthesis or otherwise trying to "get better" on one's own is not a habilitation and/or rehabilitation regime. Another way of looking at this is that the phrase regime connotes structure and planning and something that is thought out and something that is selected from amongst other possibilities. It is not something that results from happenstance or merely one's existence. Note further that some embodiments can include, based on the execution of the teachings detailed herein, the issuance of a specific prescription for a habilitation and/or rehabilitation regime.

It is noted that some embodiments include converting the captured voice sound to text and the performance of an automatic evaluation of the text. In an exemplary embodiment, the text can be classified, which classification can be utilized in the evaluations detailed herein vis-à-vis the voice data. In this regard, in some embodiments that utilize the analysis of the voice, the voice that is analyzed can be raw speech/raw voice sound, while in other embodiments the data that is utilized in the analysis can be data that is converted from the raw speech/raw voice sound. Thus, some embodiments explicitly measure/classify or otherwise analyze converted data, and some embodiments explicitly measure/classify or otherwise analyze nonconverted voice sound, and/or a combination thereof.

In at least some exemplary embodiments, systematic methods of evaluating the voice sound using natural language processing (NLP) can be utilized in at least some exemplary embodiments.

In at least some exemplary embodiments, linguistic features that are associated with spoken text, based on empirical results from studies, for example, are utilized in at least some exemplary embodiments, to evaluate the voice sound. At least some algorithms utilize one or two or three or four or five dimensional measurements. By way of example only and not by way of limitation, in at least some exemplary embodiments, an algorithm that has utilitarian value with respect to evaluating voice sound utilizes an acoustic dimension, a lexical dimension, a grammatical dimension, and/or a discourse dimension. The algorithm can analyze the content for one or more these dimensions and develop a score or otherwise a metric with respect to the text.

With respect to the actions of evaluating data, wherein the data is based on captured voice, this data could be evaluating the raw signal represented by the captured voice, such as the output from a microphone utilized to capture the voice sound, whether such signal was recorded when a recording medium/memory medium or evaluated in real time. Conversely, the data based on captured voice could be data that results from a pre-analysis of the signal from the microphone/signal stored on memory. By way of example only and not by way of limitation, the signal can be analyzed to identify certain data that is utilitarian with respect to executing the methods herein and/or reduced so that the data includes those features that are utilitarian, and what is evaluated and method action 1420 and method action 1520 is that data. Any data that is based on the captured voice can be utilized in at least some exemplary embodiments, providing that such enable the teachings detailed herein.

Figure 16:
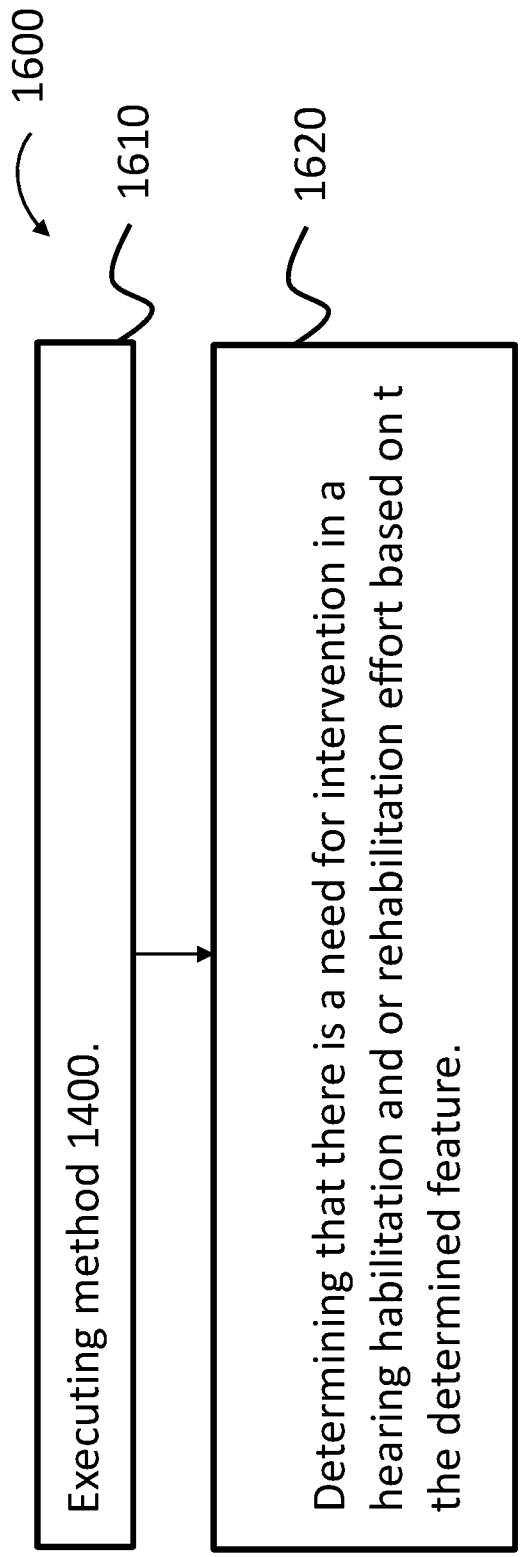

FIG. 16 presents an exemplary algorithm for an exemplary method, method 1600, which utilizes some of the features of method 1500. As can be seen, method 1600 includes method action 1610, which includes executing method 1400. Method 1600 also includes method action 1620, which includes the action of determining that there is a need for intervention in a hearing habilitation and/or rehabilitation effort based on the determined feature determined in method action 1430.

In an exemplary embodiment associated with the action of determining a hearing habilitation and/or rehabilitation related feature, such can correspond to any of the actions detailed herein associated with habilitation and/or rehabilitation of hearing. By way of example only and not by way of limitation, the feature of increasing device usage, increasing time and voice sound environment, and/or the utilization of music to reconnect through focused practice can be a habilitation and/or rehabilitation related feature. Still further by way of example only and not by way of limitation, the habilitation and/or rehabilitation feature can be a feature that is deleterious to the ultimate goal of such, such as by way of example only and not by way of limitation, a determination that the recipient frequently does not use the hearing prostheses/elevated coil off times, etc.

The below focuses on method 1400, although it is noted that the various features described herein can also be applicable to method 1500 at least in a modified manner of practicing such.

In an exemplary embodiment, there is the action of executing method 1400 (or method 1500), combined with the action of determining that there is a need for intervention in an existing hearing habilitation and/or rehabilitation effort associated with the recipient of the prosthesis based on the determined feature. Corollary to this is that in an exemplary embodiment, there is an action of executing method 1400 (or method 1500), combined with the action of determining that there is little to no and/or no need for intervention in an existing hearing habilitation and/or rehabilitation effort associated with the recipient of the prosthesis based on the determined feature. Consistent with the teachings above, it is to be understood that this method action can be executed utilizing any of the systems detailed herein, and such can be executed in an automated manner. By way of example only and not by way of limitation, in an exemplary embodiment, referring to the above tables, a determination can be made that the adult should increase the device usage over that which was previously determined for the recipient's habilitation and/or rehabilitation regime. Still further, in an exemplary embodiment, the intervention can be that the recipient must be exposed to more voice sound than that which was previously believed to be the case.

Method action 1410 specifically indicates that the voice sound is captured with the prosthesis, and that the speaker is a recipient of the prosthesis. In this regard, embodiments of method 1400 can be executed utilizing, for example, hearing prostheses that include "own-voice" detection ability. In this regard, in an exemplary embodiment of the execution of method 1400, the hearing prosthesis is configured to identify own-voice occurrence, such that the captured voice is identified as the recipient's voice sound based on the use of the prosthesis's own voice identification capabilities. Note also that in an exemplary embodiment, this can be the case for method action 1510 as well. Indeed, even in the case where method action 1510 is executed without the utilization of a hearing prosthesis, the machine can utilize on voice detection abilities. In this regard, in an exemplary embodiment, the device 240 can be programmed to recognize a particular person's voice. Still further, the device 240 can be configured are part of a system that can determine who is speaking. In an exemplary embodiment, device 240 can be utilized in a manner where a person actively indicates to the device who is speaking or operates device so that it only records when a certain person speaking, etc.

In view of the above, it can be seen that using own voice detection devices can fulfill one of the pillars of the system detailed above. Specifically, dynamic communication metrics (linguistic scene analysis and data logging) can be executed using such, and thus by using own voice detection and voice sound recognition technologies provide insight about the recipient's social integration and participation in their natural communication environment. Such can be utilized to take measurements of receptive and expressive word count and turn taking, as noted above, and can be logged in the sound processor of the prosthesis (or any other device).

In this regard, it is noted that in an exemplary embodiment, the teachings detailed herein include an exemplary method that includes the method action of determining a recipient hearing performance based on the recipient's own voice, where own voice algorithms or otherwise detection systems are utilized to capture the voice of the recipient and/or are utilized to segregate the voice the recipient from other voices that can be captured by the sound capture system. In this regard, in an exemplary embodiment, the teachings detailed herein include capturing voice that is limited to the voice sound of the recipient and excludes the voice of others.

Accordingly, in an exemplary embodiment, there is method 1200 wherein at least one of (i) the action of capturing sound includes capturing voice of the hearing impaired person excluding the capture of voice originating from any other source other than the person; (ii) the method further includes removing voice other than voice of the hearing impaired person and then analyzing the sound; or (iii) the action of analyzing the sound captured by the machine includes only analyzing voice of the person. Indeed, in this regard, with respect to method 700, in an exemplary embodiment, the action of capturing voice includes capturing voice of the recipient and excluding the capture of voice originating from any other source other than the recipient.

In an exemplary embodiment, there is method 800, wherein at least one of (i) the action of capturing voice includes capturing voice of the recipient excluding the capture of voice originating from any other source other than the recipient; (ii) the method further includes removing voice other than voice of the recipient and then analyzing the captured voice; or (iii) the action of analyzing the captured voice includes only analyzing voice of the recipient.

It is briefly noted that these aforementioned exclusions to voice other than the recipient/the hearing impaired person can be implemented in another manner where some of the voice from others is also evaluated or otherwise captured if by accident or on purpose with respect to a limited amount relative to the voice of the person of interest. In this regard, there methods where the amount of voice captured constitutes at least 70, 75, 80, 85, 90, or 95% on a per word basis of voice from the hearing impaired person with a recipient of the prosthesis or the person of interest.

It is also noted that in at least some exemplary embodiments, the sound scene classification can be utilized to aid in the teachings detailed herein. In this regard, an exemplary embodiment includes executing method 1400 and/or 1500, along with the action of using a machine to automatically classify a sound scene. The machine can be the hearing prosthesis of method action 1410, or can be a separate machine. The method can further comprise classifying a sound scene at the time that the voice was captured using the machine. In some exemplary embodiments of these methods, the evaluation of the data is evaluated in view of the classified sound scene. As noted above, embodiments associated with measuring the recipient's auditory diet can be achieved by measuring the recipient's exposure to a range of different auditory scenes which can be recorded as data logs. In this regard, such can correspond to one of the pillars of the system detailed above, specifically, the measurement of the auditory environment.

It is noted that in at least some exemplary embodiments, the sound scene classification is executed in accordance with the teachings of US patent application publication number 2017/0359659. Accordingly, in at least some exemplary embodiments, the prosthesis 100 and/or the device 240 and/or the remote device are configured to or otherwise include structure to execute one or more or all of the actions detailed in that patent application. Moreover, embodiments include executing methods that correspond to the execution of one or more the method actions detailed in that patent application.

In an exemplary embodiment, the action of evaluating the data of method action 1420 and/or method action 1520 includes evaluating at least one characteristic of a language development environment associated with the voice.

In an exemplary embodiment, the action of capturing voice is executed during a normal conversation outside of a testing environment. Indeed, in an exemplary embodiment, this is the case for all of the methods detailed herein. That said, it is noted that in at least some exemplary embodiments, the action of capturing voice is executed during a testing environment outside of a normal conversation. Still, the teachings detailed herein can have utilitarian value with respect to obtaining data associated with a hearing impaired person as the hearing impaired person travels through normal life experiences. Such can be utilitarian with respect to the fact that much more data can be obtained relative to that which be the case in limited testing environments. Further, more dynamic data can be obtained/the data can be obtained more frequently relative to that which would be the case if the data was limited to only testing environments.

In this regard, in at least some exemplary embodiments include capturing voice and/or sound during times of social communication engagement. In this regard, at least some exemplary embodiments include capturing sound only during such engagements. Corollary to this is that in at least some exemplary embodiments include capturing sound during hearing mediated social communication scenarios.

In an exemplary embodiment, at least 50, 55, 60, 65, 70, 75, 80, 85, 90, 91, 92, 93, 94, 95, 96, 97, 98, 99, or 100% of the voice that is captured and/or utilized according to the teachings detailed herein is voice that is captured during a normal conversation outside of a testing environment and/or is voice associated with hearing mediated social communication. Note that a normal conversation can include the voice interaction between an infant and an adult, and thus the concept of a conversation is a very broad concept in this regard. That said, in some other embodiments, the normal conversation is a sophisticated conversation which is limited to a conversation between fully mentally developed people.

In an exemplary embodiment, the methods detailed herein can also include determining an intervention regime after a determination is made that there is a need for intervention.

Consistent with the teachings detailed herein, where any one or more the method actions detailed herein can be executed in an automated fashion unless otherwise specified, in an exemplary embodiment, the action of determining an intervention regime can be executed automatically. Indeed, in an exemplary embodiment, the action of determining that there is a need for an intervention can be executed automatically as well.

As seen from the above, embodiments include a hearing habilitation and/or rehabilitation system. The system can include an input suite, which can be any device or system that can enable the input set of 410 or 520 above to be inputted into the system and/or that can enable the action of 510 detailed above. In this regard, in an exemplary embodiment, the input suite can be a computer-based system such as a desktop or laptop computer. The inputs we can be a smart phone or a smart handheld computer or even a smartwatch in some embodiments. Any device or system that can enable the input of the input set for 10 detailed above can be utilized in at least some exemplary embodiments. In this regard, any device or system that can enable actions for 10 and/or 510 and 520 above can be utilized in at least some exemplary embodiments. In an exemplary embodiment, the input suite can enable one or more the method actions detailed herein associated with the capture of sound and/or the capture of voice sound. Moreover, the input suite can enable one or more of the method actions detailed herein associated with handling the logged data as detailed above, such as the data logged in method action 720 detailed above. In at least some exemplary embodiments, the inputs suite corresponds to the machine that is utilized to capture the voice while in other embodiments the inputs suite can correspond to a device that interfaces with machine captures the voice. Thus, in an exemplary embodiment, the input suite can correspond to a device that is configured to electronically communicate with the machine. In some embodiments, the input suite can be the display of the device 240 above while in other embodiments, as noted above, the inputs we can correspond to a personal computer or a mainframe computer-human interface, etc.

In an exemplary embodiment, the input suite (or the input/output suite, as will be described in greater detail below) is in signal communication with a hearing prosthesis of the hearing impaired person.

In an exemplary embodiment of the system, the system also includes a processing suite. In an exemplary embodiment, the processing suite is a microprocessor-based system and/or can be a computer system based system that can enable one or more of the actions associated with analyzing the captured voice to determine a characteristic associated thereof, such as the characteristic of the language development environment associated with voice. In an exemplary embodiment, the processing suite can be configured to identify the weakness in the impaired hearing person's habilitation and/or rehabilitation and/or the real-world scenario that is identified by using the voice and/or the data as latent variables. In this regard, in an exemplary embodiment, the processing suite can be configured to execute any one or more of the analysis and/or determination functions and/or evaluating functions and/or identification functions and/or processing functions and/or classifying functions and/or recommending functions detailed herein. In an exemplary embodiment, the processing suite can do this in an automated fashion. In an exemplary embodiment, the processing suite corresponds to the recommendation engine of FIG. 3 above, and is what executes method actions 430 and 530 and 540 of FIGS. 4 and 5.

In an exemplary embodiment, the system also includes an output suite. In an exemplary embodiment, the output suite can correspond to the inputs suite while in other embodiments the output suite is a separate from the inputs suite. In this regard, the output suite can correspond to a personal computer, or any of the components associated with the inputs suite detailed above. Thus, in an exemplary embodiment, the system can include an input suite and an output suite and/or an input/output suite where, with respect to the latter, input and output suites are combined. In an exemplary embodiment, the output suite corresponds to the device that provides the output of FIG. 3. In an exemplary embodiment, the output suite corresponds to the device that enables the execution of action 440 detailed above.

FIG. 17 provides a black-box schematic of an embodiment where the input suite 3142 receives input 3144, and provide the input via communication line 3146 (which can be via the internet, or hard-wired communication in the case of the system being on a laptop computer) to processing suite 3242, which communicates with the output suite 3249 via communication line 3248 (again, internet, hardwired, etc.), where the output is represented by 3030. FIG. 18 provides an alternate embodiment which instead utilizes an input/output suite 3942.

In an exemplary embodiment, a processing suite is configured to generate goals for self-training and/or goals for intervention/support, the generation based on defined input metrics such as input metrics associated with a measured auditory environment, and measured functional listening behavior and/or metrics associated with dynamic communication, any one or more of these being imported into the system via the input and/or the input/output suite. The processing suite can be configured to develop personalized suggestions for activities and/or training. In an exemplary embodiment, the processing suite draws from a rehabilitation and/or rehabilitation resources library, and/or, while in other embodiments, the processing suite develops its own recommendations for habilitation and/or rehabilitation which are not located in a library. The processing suite also provides the ability to track and monitor a user's progress and develop updated recommendations in response to the user's progress and/or any new input. The processing suite can also verify whether or not a user has engaged in previous habilitation and/or rehabilitation activities. The processing suite can be a smart processing suite in that it can deduce a user's desires, such as determining if the user wants the system to return recommendations prior to actually returning those recommendations. It may be the case that users may simply not want to learn the results of the system.

The processing suite can be configured to identify which cohort the user belongs, where the user sits in comparison to the rest of the cohort, whether such a determination is reasonable or not, predict where the recipient performance statistics are going to be according to the status quo, and predict potential performance benefits from different interventions and/or rehabilitation and/or habilitation activities. When the processing suite operates as a recommendation engine, the processing suite utilizes input data and also the predictions to determine if intervention can be utilitarian or otherwise is required. In an exemplary embodiment, the process we can evaluate the relative performance versus the user's cohort and, in some instances, evaluate the predictions in combination with all of these, and then make a determination whether or not intervention is utilitarian.

The processing suite can be configured to rank habilitation and/or rehabilitation activities by the potential performance benefits that the system determines may result from the given activities. Moreover, the processing suite can indicate the cost associated with each habilitation and/or rehabilitation activity. In some embodiments, the activities can be ranked by both cost and potential performance benefits. In an exemplary embodiment, the two can be separate: the processing suite can provide a list of activities ranked in hierarchy with respect to their performance benefits and then list those activities in descending cost. Alternatively, and/or in addition to this, the processing suite can evaluate the benefits and the costs and develop a single list that ranks the activities based on both. In some embodiments, the benefits and costs can be equally weighted, while in other embodiments more weight can be given to one versus the other.

Any of the presentation actions detailed above can be executed by the output suite and/or the input/output suite.

The processing suite can perform evidence evaluation, where the evidence is inputted via the input suite and/or the input/output suite.

In an exemplary embodiment, the processing suite is configured to analyze a linguistic environment metric in combination with a non-linguistic environment metric correlated to the linguistic environment metric, all inputted into the input suite and/or the input/output suite, and based on the analysis, automatically determine a recommended change in a hearing impaired person's sound environment. In an exemplary embodiment, the non-linguistic environment metric is an auditory environment metric and/or a functional listening metric.

In an exemplary embodiment, the processing suite includes an expert sub-system (represented by way of example with respect to the expert system details of FIG. 6 above) that includes factual domain knowledge and clinical experience of experts as heuristics, and the processing suite is configured to provide, to the output suite and/or the input/output suite, rehabilitation and/or habilitation actions and/or activities based on input into the input suite and/or the input/output suite. In this regard, the system can be an artificial intelligence rehabilitation and/or rehabilitation system. The system is provided with a sufficient amount of data for training and validation ("big data"), and an expert sub-system is incorporated into the overall system. The expert sub-system can incorporate the factual domain knowledge and/or clinical experience of experts as heuristics such that given a set of input settings via the input/input/output suites, habilitation actions and/or rehabilitation actions and activities can be recommended to users and patients. In some embodiments, there is the incorporation of domain knowledge and/or clinical experience of experts. This can result in a lesser amount of data being needed by the system relative to that which would be the case without the experts to achieve comparable output, all other things being equal.

Exemplary embodiments can be configured such that the system operates as a rehabilitation and/or habilitation platform, and can be run with user interaction with the platform, and as this happens as users interact with the platform, more data will be collected which will allow for the training of the artificial intelligence engine (analytics and prediction section vis a vis recommendation engine section). With reference to FIG. 6 above, the expert sub-system portion can be a system that can be trained so as to be updated as needed, where a determination that updating is utilitarian can be made by the human expert. The sub-system is thus a system configured to be trained by, for example, incorporating new rules, algorithms and amendments, optimizing heuristics and algorithms according to input data such as to maximize performance. The expert sub-system is configured such that once the updates have been validated, the rehabilitation system's expert sub-system is updated. During operation for the user, the input data is processed and then passed to the rule and algorithms that form a part of the systems recommendation engine.

In an exemplary embodiment, the trained and/or partially trained sub-system provides output in the form of a habilitation and/or rehabilitation activity or set of activities. As part of a training process, this information is presented to the user and allied professionals for review and feedback. The recommendations can then be altered according to feedback. Data is then collected about the user in terms of evidence that the rehabilitation activity has been engaged in and the hearing prosthesis has been used.

Thus, as seen from the above, in an exemplary embodiment, the processing suite is an expert sub-system of the system that includes a code of and/or from a machine learning algorithm to analyze the metrics, and wherein the machine learning algorithm is a trained system trained based on a statistically significant population of hearing impaired persons.

An exemplary machine learning algorithm can be a DNN, according to an exemplary embodiment. In at least some exemplary embodiments, the input into the system can be processed by the DNN (or the code produced/from by the DNN).

A "neural network" can be used as a machine learning system. Any disclosure herein of the species "neural network" constitutes a disclosure of the genus of a "machine learning system." While embodiments herein focus on the species of a neural network, it is noted that other embodiments can utilize other species of machine learning systems accordingly, any disclosure herein of a neural network constitutes a disclosure of any other species of machine learning system that can enable the teachings detailed herein and variations thereof. To be clear, at least some embodiments according to the teachings detailed herein are embodiments that have the ability to learn without being explicitly programmed. Accordingly, with respect to some embodiments, any disclosure herein of a device, system constitutes a disclosure of a device and/or system that has the ability to learn without being explicitly programmed, and any disclosure of a method constitutes actions that results in learning without being explicitly programmed for such.

Embodiments thus include analyzing the obtained data/input into the system utilizing a code of and/or from a machine learning algorithm to develop data that can be utilized to implement the applicable teachings herein. Again, in an exemplary embodiment, the machine learning algorithm can be a DNN, and the code can correspond to a trained DNN and/or can be a code from the DNN (more on this below).

It is noted that in some embodiments, there is no "raw speech"/"raw voice sound" input into the system in general, and the DNN in particular. Instead, it is all pre-processed data. Any data that can enable the system and/or the DNN or other machine learning algorithm to operate can be utilized in at least some exemplary embodiments.

It is noted that any method action disclosed herein corresponds to a disclosure of a non-transitory computer readable medium that has program there on a code for executing such method action providing that the art enables such. Still further, any method action disclosed herein where the art enables such corresponds to a disclosure of a code from a machine learning algorithm and/or a code of a machine learning algorithm for execution of such. In this regard, the code can correspond to a trained neural network. That is, as will be detailed below, a neural network can be "fed" significant amounts (e.g., statistically significant amounts)

of data corresponding to the input of a system and the output of the system (linked to the input), and trained, such that the system can be used with only input, to develop output (after the system is trained). This neural network used to accomplish this later task is a "trained neural network." That said, in an alternate embodiment, the trained neural network can be utilized to provide (or extract therefrom) an algorithm that can be utilized separately from the trainable neural network. In one embodiment, there is a path of training that constitutes a machine learning algorithm starting off untrained, and then the machine learning algorithm is trained and "graduates," or matures into a usable code—code of trained machine learning algorithm. With respect to another path, the code from a trained machine learning algorithm is the "offspring" of the trained machine learning algorithm (or some variant thereof, or predecessor thereof), which could be considered a mutant offspring or a clone thereof. That is, with respect to this second path, in at least some exemplary embodiments, the features of the machine learning algorithm that enabled the machine learning algorithm to learn may not be utilized in the practice some of the method actions, and thus are not present the ultimate system. Instead, only the resulting product of the learning is used.

In an exemplary embodiment, the code from and/or of the machine learning algorithm utilizes non-heuristic processing to develop the data utilizeable by the system. In this regard, the system that is utilized to execute one or more of the method actions detailed herein, takes in data and extracts fundamental signal(s) therefrom, and uses this to inform itself. By way of example only and not by way of limitation, the system utilizes algorithms beyond a first-order linear algorithm, and "looks" at more than a single extracted feature. Instead, the algorithm "looks" to a plurality of features. Moreover, the algorithm utilizes a higher order nonlinear statistical model, which self learns what feature(s) in the input is important to investigate. As noted above, in an exemplary embodiment, a DNN is utilized to achieve such. Indeed, in an exemplary embodiment, as a basis for implementing the teachings detailed herein, there is an underlying assumption that the features of voice and/or the other input into the system that enable the production of hearing loss to be made are too complex to otherwise specified, and the DNN is utilized in a manner without knowledge as to what exactly on which the algorithm is basing its prediction/at which the algorithm is looking to develop its prediction. Still further, in an exemplary embodiment, the output is a prediction of an audiogram.

In at least some exemplary embodiments, the DNN is the resulting code used to make the prediction. In the training phase there are many training operations algorithms which are used, which are removed once the DNN is trained.

Briefly, it is noted that in at least some embodiments, the neural networks or other machine learning algorithms utilized herein do not utilize correlation, or, in some embodiments, do not utilize simple correlation, but instead develop relationships. In this regard, the learning model is based on utilizing underlying relationships which may not be apparent or otherwise even identifiable in the greater scheme of things. In an exemplary embodiment, MatLAB, Buildo, etc., are utilized to develop the neural network. In at least some of the exemplary embodiments detailed herein, the resulting train system is one that is not focused on a specific voice feature, but instead is based on overall relationships present in the underlying significant samples (e.g., statistically significant samples) provided to the system during the learning process. The system itself works out the relationships, and there is no known correlation based on the features associated with the relationships worked out by the system.

The end result is a code which is agnostic to input features. That is, the code of the trained neural network and/or the code from the trained neural network is such that one cannot identify what input features are utilized by the code to develop the production (the output of the system). The resulting arrangement is a complex arrangement of an unknown number of features of voice that are utilized to predict the recommendations of the system. The code is written in the language of a neural network, and would be understood by one of ordinary skill in the art to be such, as differentiated from a code that utilized specific and known features. That is, in an exemplary embodiment, the code looks like a neural network.

Consistent with common neural networks, there are hidden layers, and the features of the hidden layer are utilized in the process to predict the hearing impediments of the subject.

Still, it noted that in at least some exemplary embodiments, one or more method actions detailed herein are executed without utilizing a neural network or otherwise some form of machine learning algorithm or code based thereon. Still, in at least some exemplary embodiments, some method actions are executed by utilizing a code written in the language of a neural network.

It is further noted that in at least some exemplary embodiments, the data that is utilized to train the machine learning systems detailed herein can be developed utilizing a significant population (e.g., statistically significant population) that has a hearing aid and/or a cochlear implant, etc.

Thus, in view of the above, it is to be understood that in at least some embodiments, the code of the machine learning algorithm is a trained neural network.

Figure 19A:
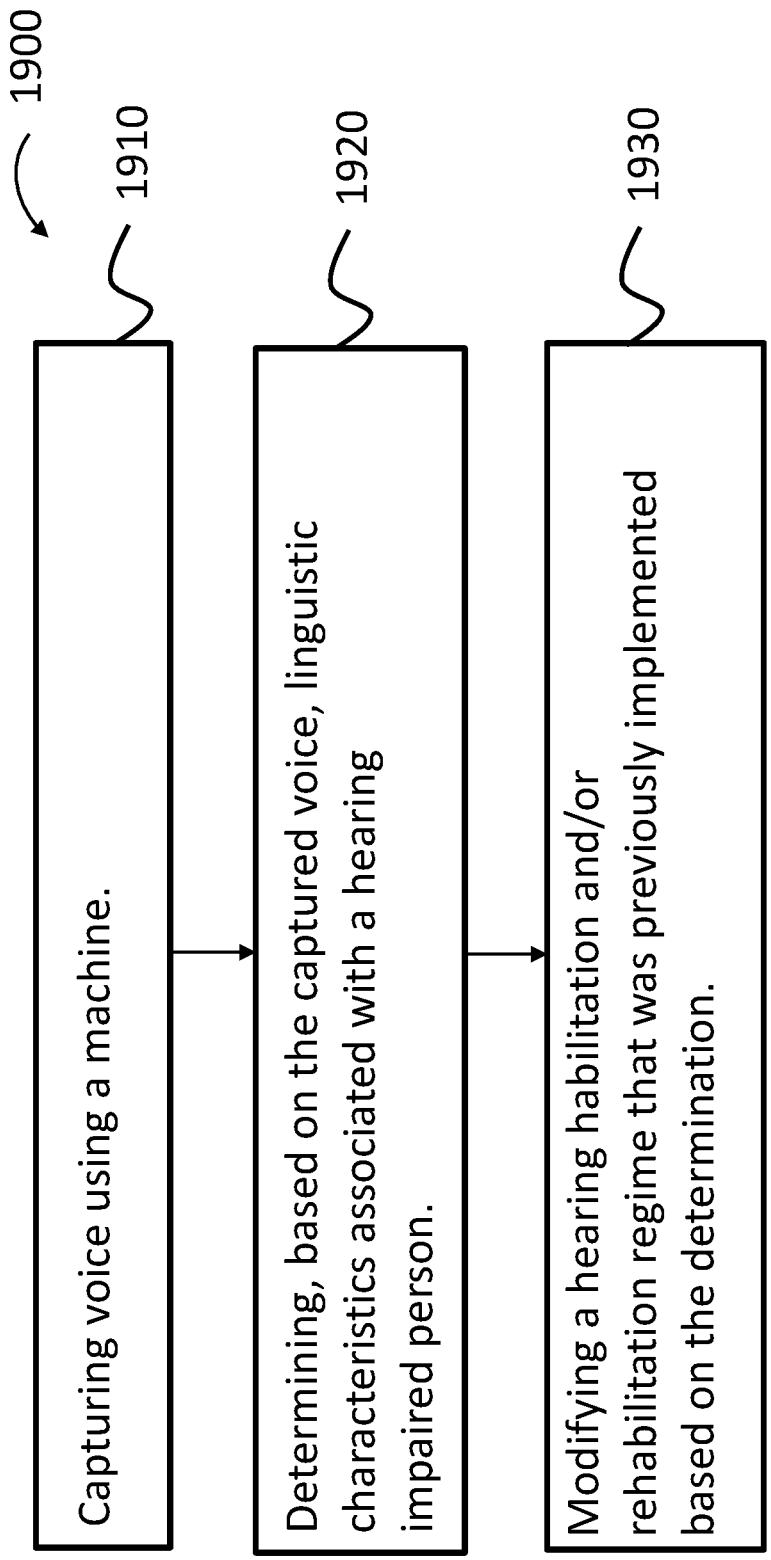
FIGS. 19A-19D present exemplary flowcharts for exemplary methods.

FIG. 19A presents an exemplary algorithm for another exemplary method, method 1900, which includes action 1910, which includes capturing voice using a machine, which action can be executed according to any of the teachings herein or any other that can achieve such. Method 1900 also includes method action 1910, which includes determining, based on the captured voice, linguistic characteristics (which are encompassed by the "linguistic environment metrics" detailed above) associated with a hearing impaired person. Method 1900 also includes method action 1930, which includes modifying a hearing habilitation and/or rehabilitation regime that was previously developed based on the determination.

Figure 19B:
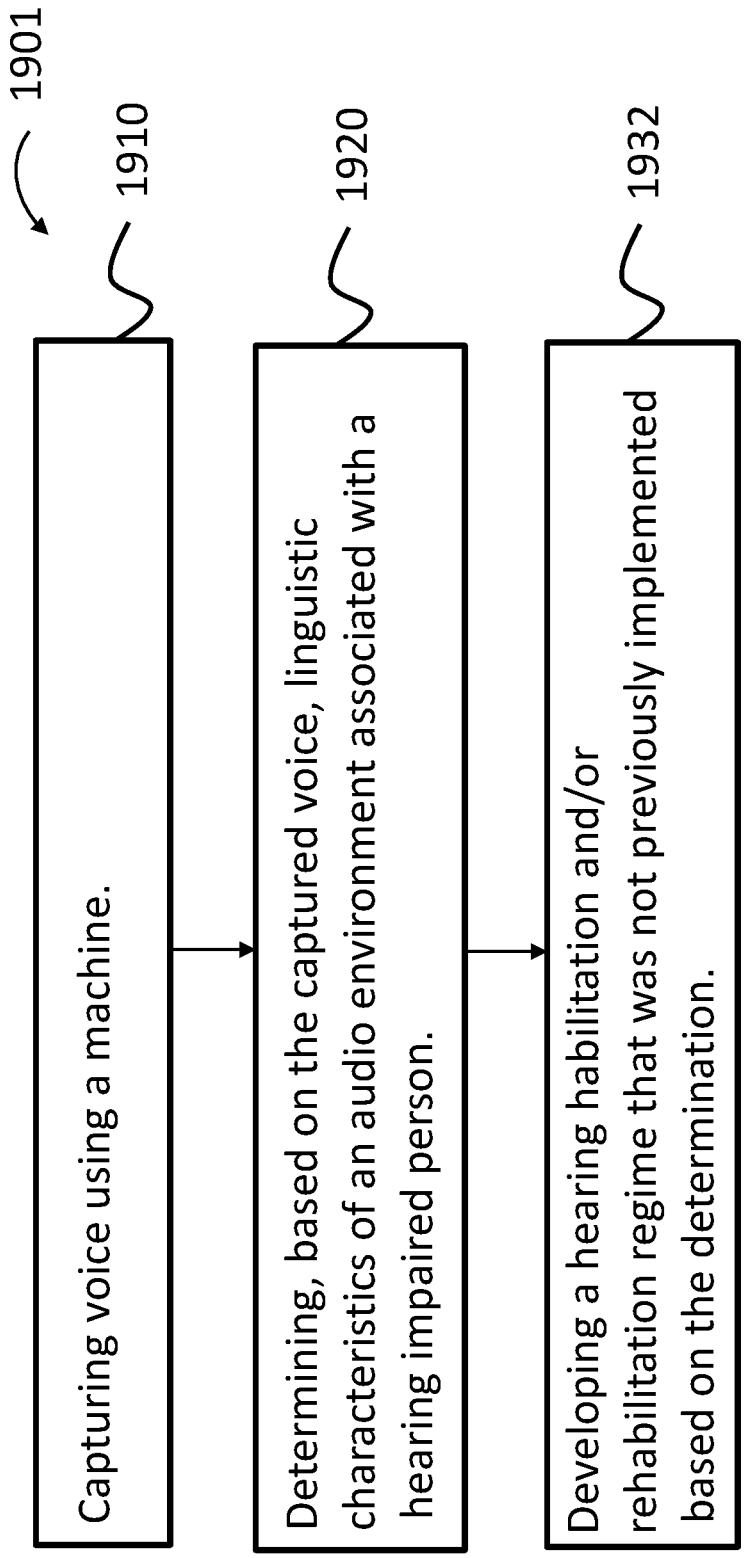

It is important, very important, to note that the action of modifying a hearing habilitation and/or rehabilitation regime that was previously implemented is not, and we repeat, not, the same as developing a hearing habilitation and/or rehabilitation regime that was not previously implemented based on the determination. Indeed, FIG. 19B provides an alternate exemplary algorithm for an exemplary method, method 1901, where method action 1932 is the action of developing a hearing habilitation and/or rehabilitation regime that was not previously implemented.

Figure 19C:
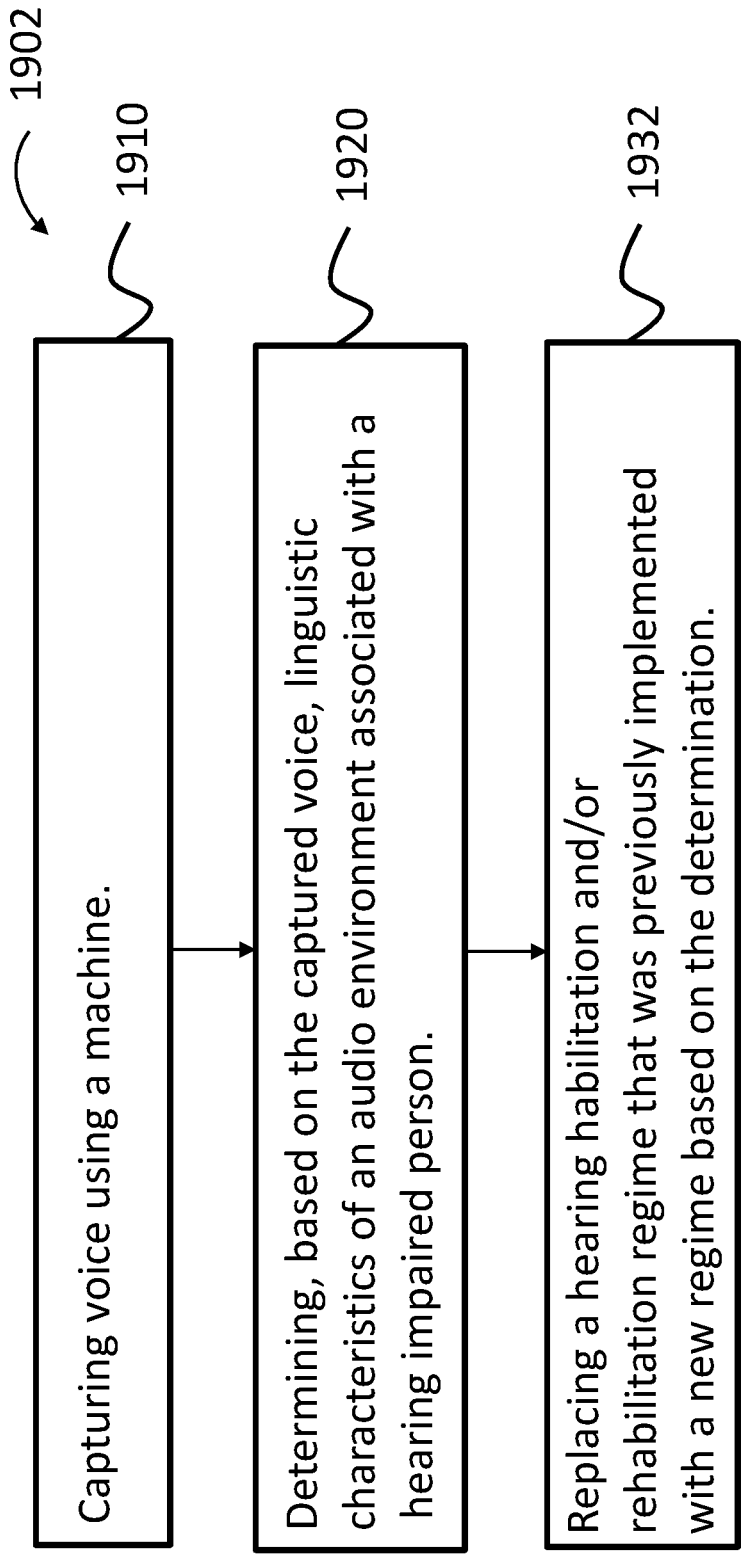

Note also that method 1900 and method 1901 are different from method 1902, as represented by the algorithm in FIG. 19C, which includes method action 1934, which includes replacing a hearing habilitation and/or rehabilitation regime that was previously implemented with a new regime based on the determination. In this regard, replacing a regime is different from modifying the regime and developing a regime that was not implemented.

As will be detailed below, at least some embodiments include a non-transitory computer readable medium having recorded thereon, a computer program for executing at least a portion of any of the methods detailed herein, the computer program including code for executing one or more or all of the method actions detailed herein or otherwise for implementing the functionality of any of the systems and/or devices herein.

Accordingly, in an exemplary embodiment, there is non-transitory computer readable medium having recorded thereon, a computer program for executing at least a portion of a method, the computer program including code for determining, based on data that is based on voice sound captured by a machine, linguistic characteristics associated with a hearing impaired person and code for at least one of modifying a hearing habilitation and/or rehabilitation regime that was previously implemented based on the determination or replacing a hearing habilitation and/or rehabilitation regime that was previously implemented with a new regime based on the determination. In an exemplary embodiment, the code for executing the action of modifying and/or replacing a hearing habilitation and/or rehabilitation regime based on the determination includes code for eliminating one or more features of an audio environment which were previously part of the regime or otherwise exposed to the recipient. In an exemplary embodiment, the code for executing the action of modifying and/or replacing a hearing habilitation and/or rehabilitation regime based on the determination includes code for adding one or more features of an audio environment which were previously not part of the regime or otherwise not present in the recipient's auditory diet.

In an exemplary embodiment, the linguistic characteristics comprise at least one of: (i) a measure of quantity of voice by the recipient or (ii) a measure of quantity of voice by one or more people other than the recipient. In some embodiments, the linguistic characteristics further comprise at least one of and/or 2 or more or only 2, 3 or more or only 3, 4 more only 4, or five or more or only 5, 6 or more or only 6, 7 or more or only 7, eight or more or only 8, 9 or more or only 9, 10 or more or only 10, or 11 or more or only 11, of:
  a measure of proportion of time spent by the recipient speaking,
  a measure of proportion of time spent by the recipient receiving voice from others,
  a measure of quantity of words spoken by the recipient,
  a measure of quantity of sentences spoken by the recipient,
  a measure of quantity of words spoken by one or more people other than the recipient,
  a measure of quantity of sentences spoken by one or more people other than the recipient,
  a measure of quantity of conversational turns by the recipient,
  a measure of quantity of conversations initiated by the recipient,
  a measure of quantity of phonetic features produced by the recipient,
  a measure of length of utterances by the recipient or by others, or
  a measure of voice quality.

In an exemplary embodiment, the linguistic characteristics comprise at least one of: (i) a measure of quantity of voice by the recipient or (ii) a measure of quantity of voice by one or more people other than the recipient.

In an exemplary embodiment, the action of modifying and/or replacing a hearing habilitation and/or rehabilitation regime based on the determination includes eliminating one or more features of an audio environments which were previously part of the regime or otherwise exposed to the recipient. Also, in an exemplary embodiment, the action of modifying and/or replacing a hearing habilitation and/or rehabilitation regime based on the determination includes adding one or more features of to an audio environment which were previously not part of the regime or otherwise not present in the recipient's auditory diet. Moreover, in some embodiments, the actions of determining linguistic characteristics and modifying and/or replacing a hearing habilitation and/or rehabilitation regime based on the determination are executed in an automated method.

It is also noted that in an exemplary embodiment, there is a modification to methods 1900 and/or 1902, wherein prior to the modifying and/or replacing action, there is the action of capturing second voice using a machine (which second voice is captured before the voice of method 1900 and 1902), determining based on the second captured voice, linguistic characteristics of an audio environment to which a hearing impaired person is exposed, and developing a rehabilitation regime based on the determination based on the second captured voice.

Figure 19D:
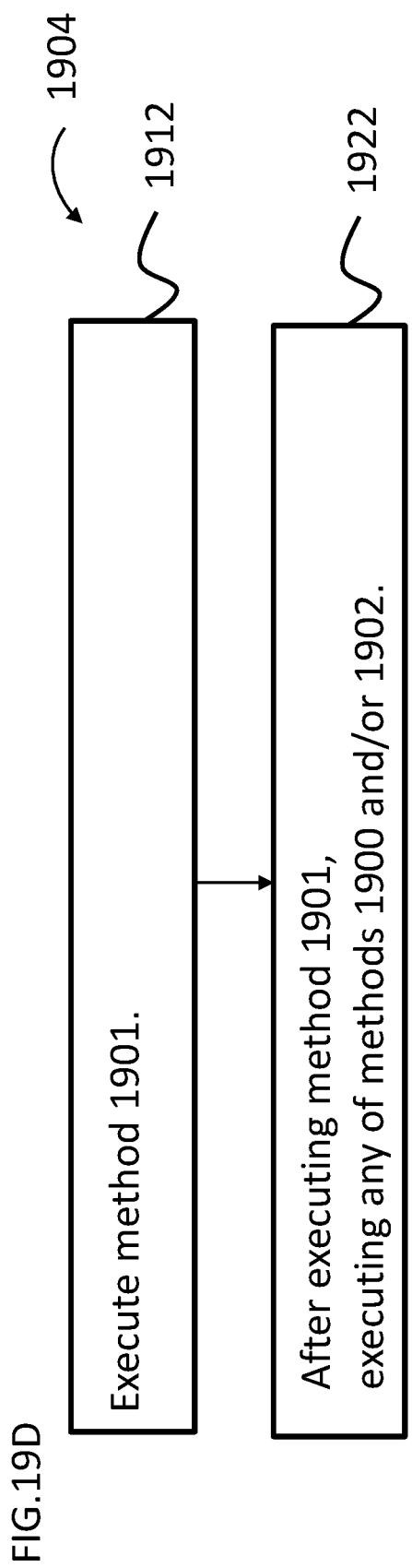

Indeed, FIG. 19D provides an exemplary algorithm for an exemplary method, method 1904, which includes method action 1912, which includes executing method 1901. Subsequently, after executing method 1901, method action 1922 is executed, which includes executing any of methods 1900 and/or 1902. In this regard, in an exemplary embodiment, the regime that is modified or otherwise abandoned or otherwise replaced is the regime developed in method action 1912.

Now with reference to FIGS. 20 to 24, teachings are provided that enable the methods herein, in at least some exemplary embodiments, where there is a voice capture component, where the captured voice is analyzed or the like. In this regard, any one or more the following teachings associated with FIGS. 20 to 24 can be utilized with the captured voice, wherein the captured voice is voice of the recipient or voice directed to the recipient or otherwise associated with the recipient. This is distinguished from the other data/the non-voice data that is utilized in at least some exemplary embodiments of the teachings detailed herein and/or the scene classification detailed herein. That said, it is noted that in at least some exemplary embodiments, the teachings below associated with FIGS. 20 to 24 can be applicable to some of the other method actions detailed above, such as, for example, determining coil on and/or off time, etc. Accordingly, the teachings detailed below can be utilized as a basis to obtain data for some of the other nonvoice data methods detailed herein.

It is explicitly noted that at least some exemplary embodiments include the teachings below when combined with the non-voice data logging detailed herein and/or the scene classification logging detailed herein. When used in combination, such can be directed towards identifying a weakness in a recipient's habilitation and/or rehabilitation regime or a need for such and the first instance. This is different than the mere analysis subsequent to collection or real-time analysis of voice. By analyzing the voice in combination with the other data, a habilitation and/or a rehabilitation regime can developed and/or altered and/or eliminated and/or replaced based on the analysis.

It is further explicitly noted that at least some exemplary embodiments include the teachings below without the aforementioned data logging. Here however, the voice is evaluated to determine features associated with the higher levels of hearing. By analyzing the voice so as to identify the features associated with higher levels a hearing, an existing habilitation and/or a rehabilitation regime altered and/or eliminated and/or replaced based on the analysis (as opposed to developing one based on the analysis in the first instance where none was previously developed).

Figure 20:
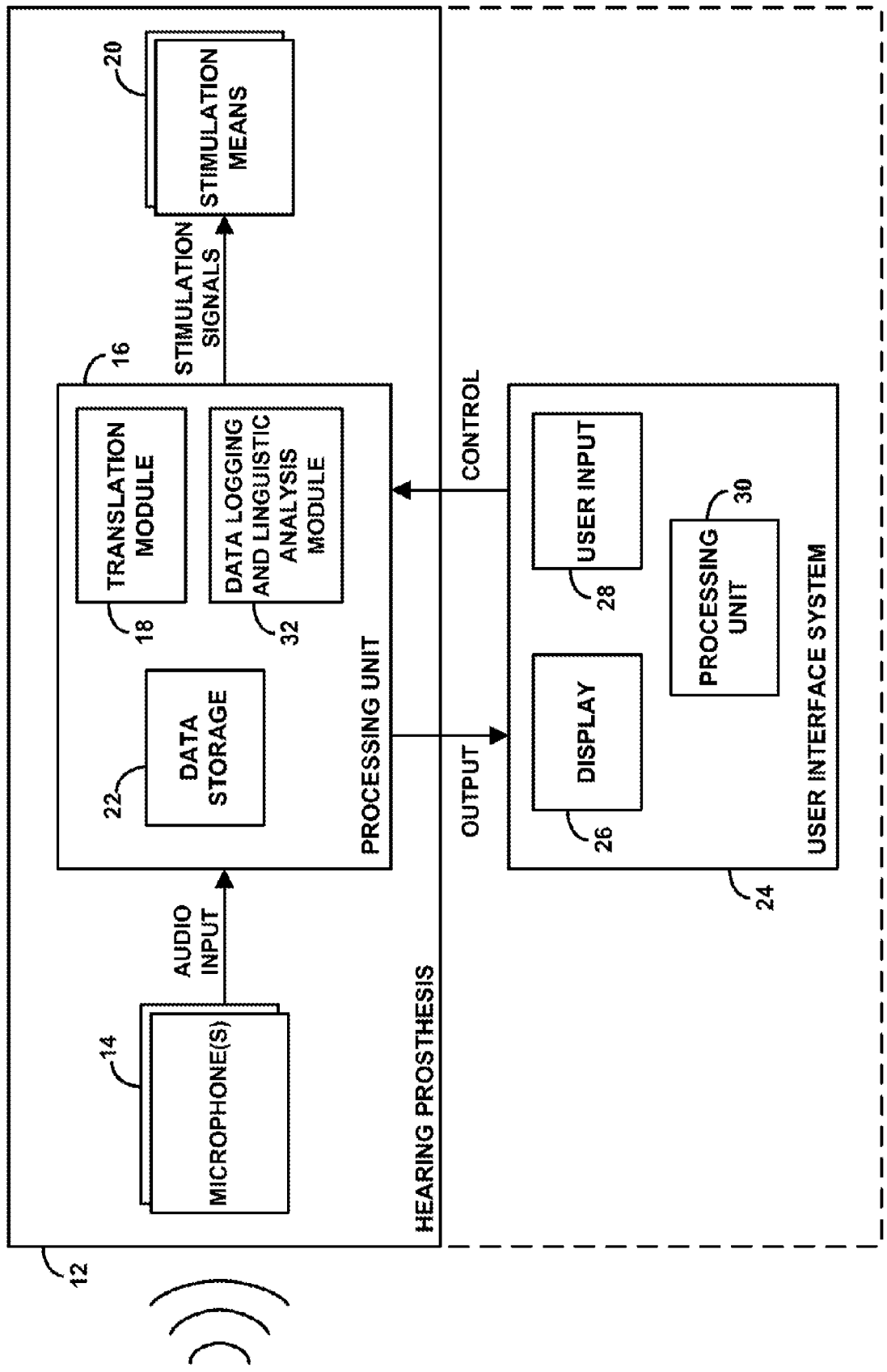
FIGS. 20 and 21 present exemplary systems.

FIG. 20 is a simplified block diagram of an example hearing prosthesis 12 operable in accordance with the present disclosure, which can correspond to any of the prostheses detailed herein and/or variations thereof, if only in a modified manner. As shown, the example hearing prosthesis 12 generally includes one or more microphones (microphone inputs) 14 for receiving audio input representing an audio environment of the prosthesis recipient, a processing unit 16 having a translation module 18 for translating a representation of the received audio input into stimulation signals, and stimulation means (one or more stimulation outputs) 20 for stimulating the physiological system of the recipient in accordance with the stimulation signals and thus in accordance with the received audio input.

It is noted that in an exemplary embodiment, the apparatus of FIG. 20 can be utilized to collect and/or capture any of the data that is disclosed herein as being collected and/or captured or otherwise logged, unless otherwise noted. That said, it is noted that any of the functionality associated with the device of FIG. 20 can be transferred to the device of FIG. 240 detailed above, and/or a remote device, such as a remote device that is in signal communication with the prosthesis 100 and/or the device 240 via element 259, etc., providing that the art enables such otherwise that such can be utilitarian. Accordingly, any disclosure herein of functionality of the device of FIG. 20 can correspond to a disclosure of a functionality of any other device disclosed herein or any other device that can implement the teachings detailed herein.

In this regard, in some embodiments, there is functional migration between the implant and the device 240, and vice versa, and between either of these two and the remote device via element 259, which can be implemented according to any of the teachings of WO2016/207860, providing that such enables such.

This example hearing prosthesis may represent any of various types of hearing prosthesis, including but not limited to those discussed above, and the components shown may accordingly take various forms. By way of example, if the hearing prosthesis is a hearing aid, the translation module 18 may include an amplifier that amplifies the received audio input, and the stimulation means 20 may include a speaker arranged to deliver the amplified audio into the recipient's ear. As another example, if the hearing prosthesis is a vibration-based hearing device, the translation module 18 may function to generate electrical stimulation signals corresponding with the received audio input, and the stimulation means 20 may include a transducer that delivers vibrations to the recipient in accordance with those electrical stimulation signals. And as yet another example, if the hearing prosthesis is a cochlear implant, the translation module 18 may similarly generate electrical signals corresponding with the received audio input, and the stimulation means 20 may include an array of electrodes that deliver the stimulation signals to the recipient's cochlea. Other examples are possible as well.

In practice, the processing unit 16 may be arranged to operate on a digitized representation of the received audio input as established by analog-to-digital conversion circuitry in the processing unit, microphone(s) or one or more other components of the prosthesis. As such, the processing unit 16 may include data storage (e.g., magnetic, optical or flash storage) 22 for holding a digital bit stream representing the received audio and for holding associated data. Further, the processing unit 16 may include a digital signal processor, and the translation module 18 may be a function of the digital signal processor, arranged to analyze the digitized audio and to produce corresponding stimulation signals or associated output. Alternatively, or additionally, the processing unit may include one or more general purpose processors (e.g., microprocessors), and the translation module 18 may include a set of program instructions stored in the data storage 22 and executable by the processor(s) to analyze the digitized audio and to produce the corresponding stimulation signals or associated output.

Further, the processing unit 16 may control and/or track the extent to which the hearing prosthesis stimulates the physiological system of the recipient. For instance, as noted above, the prosthesis may have a stimulation mode that can be switched between a stimulation-on mode and a stimulation-off mode. In the stimulation-on mode, the prosthesis would be set to stimulate the physiological system of the recipient in accordance with audio input being received by the prosthesis, such as by providing corresponding stimulation signals when the audio input is of sufficient amplitude and of particular frequency and to not provide stimulation signals if the audio input is threshold low amplitude or is of some other frequency. And in the stimulation-off mode, the prosthesis would be set to not stimulate the physiological system of the recipient in accordance with the audio input being received by the prosthesis, regardless of the amplitude and frequency of the audio input.

The processing unit may switch between these stimulation modes in accordance with user input or may determine when a user has switched the hearing prosthesis between these stimulation modes. For instance, the processing unit may receive user input directing the hearing prosthesis to switch between stimulation-on mode and stimulation-off mode, and the processing unit may responsively set the stimulation mode accordingly and make note of the current stimulation mode. Alternatively, a user may change the stimulation mode of the prosthesis (such as by switching between a coil-on mode and coil-off mode), and the processing unit may make note of that change in stimulation mode. Further, the processing unit may switch the prosthesis between stimulation-on mode and stimulation-off mode from time to time based on a programmed schedule or other trigger events and may similarly make note of the current stimulation mode.

As further shown, the example hearing prosthesis 12 includes or is coupled with a user interface system 24 through which the recipient or others (e.g., a clinician) may control operation of the prosthesis and view various settings and other output of the prosthesis. In practice, for instance, the user interface system 24 may include one or more components internal to or otherwise integrated with the prosthesis. Further, the user interface system 24 may include one or more components external to the prosthesis, and the prosthesis may include a communication interface arranged to communicate with those components through a wireless and/or wired link of any type now known or later developed.

In a representative arrangement, the user interface system 22 may include one or more user interface components that enable a user to interact with the hearing prosthesis. As shown by way of example, the user interface components may include a display screen 26 and/or one or more input mechanisms 28 such as a touch-sensitive display surface, a keypad, individual buttons, or the like. These user interface components may communicate with the processing unit 16 of the hearing prosthesis in much the same way that conventional user interface components interact with the host processor of a personal computer. Alternatively, the user interface system 24 may include one or more standalone computing devices such as a personal computer, mobile phone, tablet, handheld remote control, or the like, and may further include its own processing unit 30 that interacts with the hearing prosthesis and may be arranged to carry out various other functions.

In practice, user interface system 24 may enable the recipient to control the stimulation mode of the hearing prosthesis, such as to turn stimulation functionality on and off. For instance, at times when the recipient does not wish to have the prosthesis stimulate the recipient's physiological system in accordance with received audio input, the recipient may engage a button or other input mechanism of the user interface system 24 to cause processing unit 16 to set the prosthesis in the stimulation-off mode. And at times when the recipient wishes to have the prosthesis stimulate the recipient's physiological system in accordance with the received audio input, the recipient may engage a similar mechanism to cause the processing unit 16 to set the prosthesis in the stimulation-on mode. Further, the user interface system 24 may enable the recipient or others to program the processing unit 16 of the prosthesis so as to schedule automatic switching of the prosthesis between the stimulation-on mode and the stimulation-off mode.

In accordance with the present disclosure, as noted above, the example hearing prosthesis 12 will additionally function to log and output data regarding the received audio input. In particular, the hearing prosthesis may analyze the received audio input so as to determine one or more linguistic characteristics in the recipient's audio environment and may output data representing the determined one or more linguistic characteristics. Further, the hearing prosthesis may use its stimulation mode as a basis to generate this data, such as by determining and logging linguistic characteristics just with respect to the audio input received while the hearing prosthesis is in the stimulation-on mode, or by separately recording (i) linguistic characteristics in the audio input received at times when the hearing prosthesis was in the stimulation-on and (ii) linguistic characteristics in the audio input received at times when the hearing prosthesis was in the stimulation-off mode.

The hearing prosthesis may then output logged data from time to time for external analysis, such as for external determination and reporting of linguistic characteristics in the recipient's audio environment. For instance, the user interface system 24 may periodically poll the hearing prosthesis to obtain from the prosthesis the latest linguistic characteristics logged by the prosthesis, such as the latest logged linguistic characteristics corresponding with stimulation-on mode and the latest logged linguistic characteristics corresponding with stimulation-off mode. And the user interface system 24 may process that data and provide a graphical user interface that depicts a comparison of the logged linguistic characteristics (possibly per stimulation mode) over time.

The audio input that forms the basis for this analysis is the same audio input that the hearing prosthesis is arranged to receive and use as a basis to stimulate the physiological system of the recipient when the prosthesis is in the stimulation-on mode. Thus, as the hearing prosthesis receives audio input, the hearing prosthesis may not only translate that audio input into stimulation signals to stimulate the recipient's physiological system if the hearing prosthesis is in the stimulation-on mode but may also log data regarding the same received audio output, such as data regarding linguistic characteristics in the audio input in correlation with the stimulation mode. Further, even at times when the hearing prosthesis is receiving audio input but is not stimulating the recipient's physiological system (e.g., because stimulation is turned off or because the audio input amplitude or frequency is such that the prosthesis is set to not provide stimulation), the hearing prosthesis may still log data regarding that received audio input, such as linguistic characteristics in correlation with the stimulation mode. Any or all of this data may then be clinically relevant and useful in developing therapy and training (e.g., remediation) for the recipient.

Figure 21:
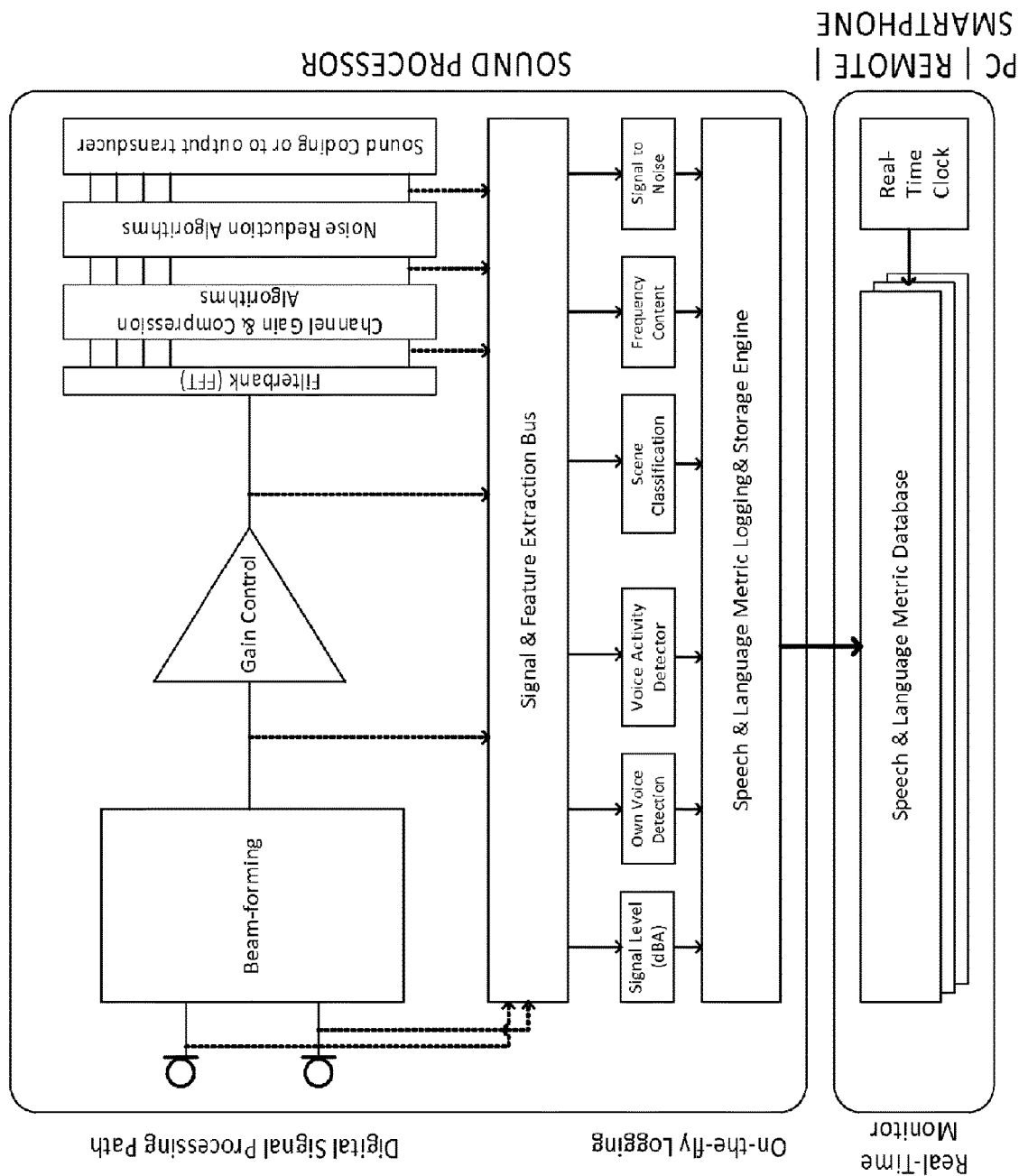

As shown in FIG. 21, the processing unit 16 of the example hearing prosthesis 12 includes a data logging and linguistic analysis (DLLA) module 32 for carrying out some or all of these added functions. This DLLA module 32 may be integrated in whole or in part with the translation module 18, such as by making use of some of the same components of the hearing prosthesis as the translation module 18. Further, as with the translation module, this DLLA module may be provided in various forms. For instance, the DLLA module may be provided as a function of a digital signal processor, or as a set of program instructions stored in data storage and executable by one or more processors to carry out the data logging and linguistic analysis functions. The DLLA can alternatively be a data logging device without analysis function.

In practice, as the processing unit 16 receives audio input representing the audio environment of the recipient, the processing unit module may evaluate the audio input in real-time so as to determine one or more linguistic characteristics in the audio input.

The "linguistic characteristics" explored here are characteristics specifically related to language production and receipt, and therefore may or may not include more general audio characteristics such as amplitude, frequency, or the like. Examples of linguistic characteristics include, among others, (1) a measure of proportion of time spent by the recipient speaking, (2) a measure of proportion of time spent by the recipient receiving voice from others, (3) a measure of quantity of words spoken by the recipient, (4) a measure of quantity of sentences spoken by the recipient, (5) a measure of quantity of words spoken by one or more people other than the recipient, (6) a measure of quantity of sentences spoken by one or more people other than the recipient, (7) a measure of quantity of conversational turns by the recipient, (8) a measure of length of utterances by the recipient or by others, (9) a measure of quantity of phonetic features produced by the recipient, such as voiced vs unvoiced voice sounds, vowels versus consonants, or a more specific breakdown of consonant articulation such as plosives, affricatives, fricatives, sibilants, nasal, flap, tap, approximant, lateral, trill, and so forth, including for instance a measure of rate of syllabic or other voice production and/or a measure of phoneme variations created, (10) a measure of quality of voice exposure, such as presentation level and signal to noise ratio of the voice, (11) a measure of words spoken by adult versus words spoken by children, (12) a measure of quantity of conversations engaged in or initiated by the recipient, and (13) indications of whether the voice is shouted or conversational.

The processing unit may apply various well known audio analysis techniques, or other techniques now known or later developed, to determine the one or more linguistic characteristics in the audio input and may do so in real-time (e.g., continually or periodically as the hearing prosthesis receives the audio input).

Further, in terms of determining whether identified voice is voice of the recipient or voice of another person in the recipient's environment, the processing unit may take various factors into consideration.

Moreover, to facilitate carrying out this analysis in real-time, the processing unit may limit its analysis to identify key parameters as proxies for more complex linguistic characteristics or may generally estimate various ones of the linguistic characteristics rather than striving to determine them exactly.

In some embodiments, the processing unit receives the audio input, the processing unit may record various associated data in data storage 22. Further, the processing unit may output the data in real-time or at some later time to the user interface system 24.

By way of example, as the processing unit determines the one or more linguistic characteristics of the recipient's audio environment, the processing unit may record those characteristics in correspondence with indications of whether the hearing prosthesis is in the stimulation-on mode or is rather in the stimulation-off mode.

Alternatively, the processing unit may limit its determination and logging of linguistic characteristics to be just with respect to audio input that the prosthesis receives at times when the hearing prosthesis is in the stimulation-on mode. For instance, the processing may track the linguistic characteristics just at times when the prosthesis is in the stimulation-on mode, and not at times when the prosthesis is in the stimulation off mode. And the processing unit may output data representing the determined linguistic characteristics, possibly in real-time as the processing unit determines the linguistic characteristics. As another example, as the processing unit receives the audio input, the processing unit may record the digitized audio itself, or a representation of the digitized audio, in correspondence with indications of whether the hearing prosthesis is in the stimulation-on mode or is rather in the stimulation off mode, with or without determining one or more linguistic characteristics in the audio input. For instance, using an internal or real-world clock, the processing unit may timestamp the digitized audio (e.g., with periodic timestamps) and may correspondingly record times when the prosthesis transitions between stimulation-on mode to stimulation-off mode, and the combination of those two sets of data would thus indicate which portions of the audio input were received by the prosthesis when the prosthesis was in the stimulation-on mode and which portions of the audio input were received by the prosthesis when the prosthesis was in the stimulation-off mode. And the processing unit may output this data as well, again possibly in real-time as the processing unit establishes this data. As still another example, in regular operation, the processing unit may be configured to record assorted other data related to operation of the hearing prosthesis, again in correspondence with indications of when the prosthesis is in the stimulation-on mode and when the prosthesis is in the stimulation-off mode. For instance, the processing unit may record instances of the prosthesis receiving certain control signals from the user interface system 24, such as instances of user input changing various programs or other operational parameters of the prosthesis, and the processing unit may correlate those recorded instances with indications of the stimulation mode. Likewise, the processing unit may record various signal processing parameters of the processing unit, such as parameters of one or more classifier algorithms used to determine linguistic characteristics and/or parameters used by the translation module 18 to generate stimulation signals based on the received audio input.

As with the linguistic characteristics, the processing unit may keep track of such operational parameters and changes in operational parameters at times when the prosthesis is in the stimulation-on mode and may separately keep track of such operational parameters and changes in operational parameters at times when the prosthesis is in the stimulation-off mode. Furthermore, the processing unit may additionally include with this data various determined linguistic characteristics as discussed above. And here again, the processing unit may output this data, possibly in real-time as the processing unit establishes the data.

In practice, the processing unit may provide this and other data to the user interface system 24 in various forms for presentation to a user such as the recipient or a clinician, or otherwise to transmit to device 240 and/or a remote device via element 259, etc. For example, the processing unit may provide the data in raw form, as one or more lists of metrics and associated values, such as a list of metrics corresponding with stimulation-on mode and a separate list of metrics corresponding with stimulation-off mode. As another example, the processing unit may structure the data as graphs and other charts more readily understandable at quick glance. For instance, rather than or in addition to listing the number of words spoken by the recipient on each of various days, the processing unit may provide a graph that shows change in number of words spoke per day or per other unit of time, which could then be analyzed in terms of the recipient's environment. In practice, the processing unit may generate these graphs as graphical user interfaces suitable for presentation by display 26.

In an alternative arrangement, note also that some of this analysis and presentation could be done by an external processing unit, such as processing unit 30 of an external computing device. In line with the discussion above, for instance, the processing unit 16 of the hearing prosthesis may record separate sets of linguistic characteristics corresponding with stimulation-on mode and stimulation-off mode, and processing unit 16 may periodically or otherwise from time to time provide the latest such sets of data to the processing unit 30 of the external computing device. Upon receipt of such data, processing unit 30 may then timestamp each received set of data with an indication of the current day, time of day, or the like. And processing unit 30 of the external computing device may then analyze the data to determine one or more linguistic characteristics in the audio, again possibly in correspondence with the stimulation mode of the prosthesis, and may similarly present output representing that information, such a depictions of changes in linguistic characteristics in the recipient's audio environment over time.

FIG. 21 is next a block diagram depicting more specifically various components that may be included in a representative processing unit 16 and user interface system 24 in accordance with the present disclosure. In particular, FIG. 2 depicts processing unit 16 as a sound processor and user interface system 24 as a real-time monitor, such as a PC, smartphone, and/or remote control. The figure depicts on the sound processor a representative signal processing path for core hearing therapy. Further, the figure depicts extraction of certain metrics from various signal processing blocks, and forwarding of those metrics to a logging engine. The logging engine may then function to categorize the metrics, establish linguistic characterizations, and log the characterizations such as by incrementing counts of particular linguistic characterizations (e.g., number of words spoken by the recipient, number of words spoken by others, etc.), in correspondence with stimulation mode as discussed above. And the real-time monitor is then connected to the sound processor so as to read the stored logs, such as by periodically polling for the latest logged data. And the auxiliary device may timestamp and that data for comparison and trending, such as to determine and present indications of changes over time (e.g., one week versus the last, one month versus the last, etc.) in linguistic characteristics in the recipient's environment.

Figure 22:
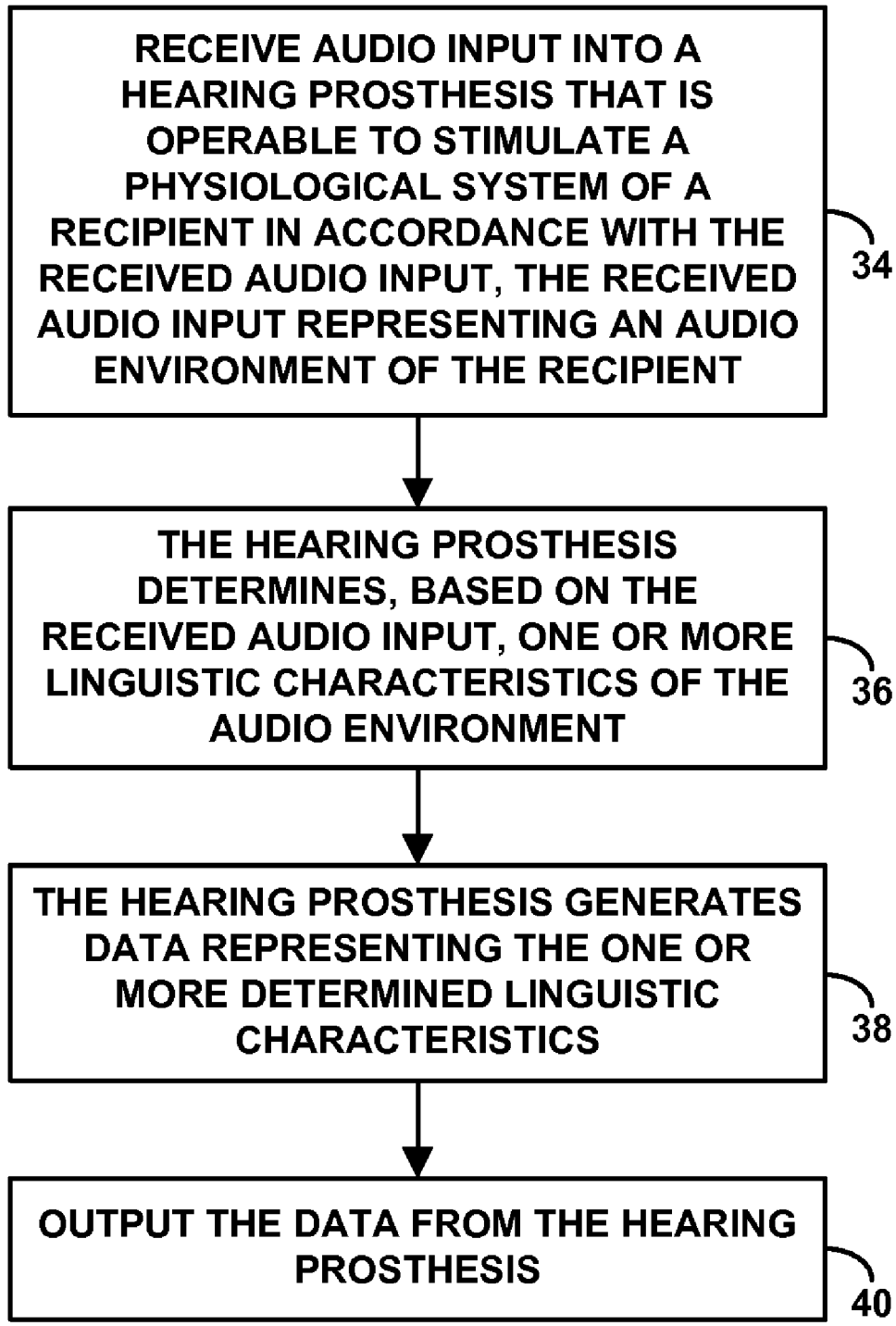

FIG. 22 is next a flow chart depicting functions that can be carried out in accordance with a representative method. As shown in FIG. 22, at block 34, the method includes receiving audio input into the hearing prosthesis 12 that is operable to stimulate a physiological system of a recipient in accordance with the received audio input, the received audio input representing an audio environment of the recipient. Further, at block 36, the method involves the hearing prosthesis determining, based on the received audio input, one or more linguistic characteristics of the audio environment. Still further, at block 38, the method involves the hearing prosthesis generating data representing the one or more determined linguistic characteristics. And at block 40, the method involves outputting the data from the hearing prosthesis, such as providing the data to a computing system for presentation.

Although these functions are shown in series in the flow chart, the hearing prosthesis may in practice continuously carry out these functions in real-time. For instance, as the hearing prosthesis receives audio input, the hearing prosthesis may continuously or periodically analyze the audio input to determine linguistic characteristics and may continuously or periodically generate and output data representing the latest determined linguistic characteristics.

Further, in line with the discussion above, the hearing prosthesis may have a stimulation mode that switches between a stimulation-on mode in which the hearing prosthesis is set to stimulate the physiological system of the recipient in accordance with the received audio input and a stimulation-off mode in which the hearing prosthesis is set to not stimulate the physiological system of the recipient in accordance with the received audio input. And in that case, the hearing prosthesis may take the stimulation mode into account while generating the data representing the determined one or more linguistic characteristics.

For example, the hearing prosthesis may include in the data indicia of when the hearing prosthesis was in the stimulation-on mode and/or when the hearing prosthesis was in the stimulation-mode. More particularly, the hearing prosthesis may include in the data one or more correlations between times when the hearing prosthesis was in the stimulation-on mode and one or more of the one or more determined linguistic characteristics, and perhaps similarly for times when the hearing prosthesis was in the stimulation-off mode. Similarly, the hearing prosthesis may maintain separate sets of data for each stimulation mode.

As another example, using an internal clock or a real-world clock, the hearing prosthesis may time-stamp the received audio input and may record times when the hearing prosthesis was in the stimulation-on mode and times when the hearing prosthesis was in the stimulation-off mode. And the hearing prosthesis may correlate the recorded times with the timestamped received audio input so as to determine which audio input was received during stimulation-on mode and which audio input was received during stimulation-off mode. With that information, the hearing prosthesis may then provide output correlating certain determined linguistic characteristics with stimulation-on mode and other determined linguistic characteristics with stimulation-off mode.

It is noted that any of the actions, devices, functions, etc., associated with logging the voice/data associated with voice disclosed herein can also be used, exactly as disclosed or in a modified form, to log the other data/non-voice data that is obtained by implementing the teachings detailed herein. It is also noted that any of the actions devices functions etc., associated with analyzing or otherwise manipulating or otherwise handling the voice/data associated with the voice disclosed herein can also be used, exactly as disclosed or in a modified form, to manipulate or otherwise handle the nonvoice data that is obtained by implementing the teachings detailed herein.

Alternatively, or additionally, the hearing prosthesis may determine the one or more linguistic characteristics specifically based on the audio input received during stimulation-on mode and not based on audio input received during stimulation-off mode. Further, whether or not the hearing prosthesis determines one or more linguistic characteristics based on the audio input received during stimulation-off mode, the hearing prosthesis could be arranged to limit the generated data to be based on just the audio input received during stimulation-on mode.

FIG. 23 is next another flow chart depicting functions that can be carried out in accordance with a representative method. As shown in FIG. 4, at block 42, the method involves receiving audio input into a hearing prosthesis that is operable to stimulate a physiological system of a recipient in accordance with the received audio input, where at times while receiving the audio input the hearing prosthesis is in a stimulation-on mode in which it is set to stimulate the physiological system of the recipient in accordance with the received audio input and at other times while receiving the audio input the hearing prosthesis is in a stimulation-off mode in which it is set to not stimulate the physiological system of the recipient in accordance with the received audio input. Further, at block 44, the method involves the hearing prosthesis logging data representing the received audio input in correspondence with the times when the hearing prosthesis is in the stimulation-on mode, such as recording in or in correlation with the logged data indicia of when the hearing prosthesis is in the stimulation-on mode, and perhaps separately when the hearing prosthesis is in the stimulation-off mode, or by maintaining counters separately for the two stimulation modes.

It is noted that in some embodiments, the method actions associated with FIG. 23 are utilized with the actions detailed herein detailing the capture of voice. In this regard, as noted above, some embodiments, the raw voice is utilized, while in other embodiments, process voice is utilized. In this regard, implementing the method of FIG. 23 can be utilized to process the voice, which processed voice can be utilized in the methods detailed herein which utilize data based on voice or otherwise processed the voice.

Figure 24:
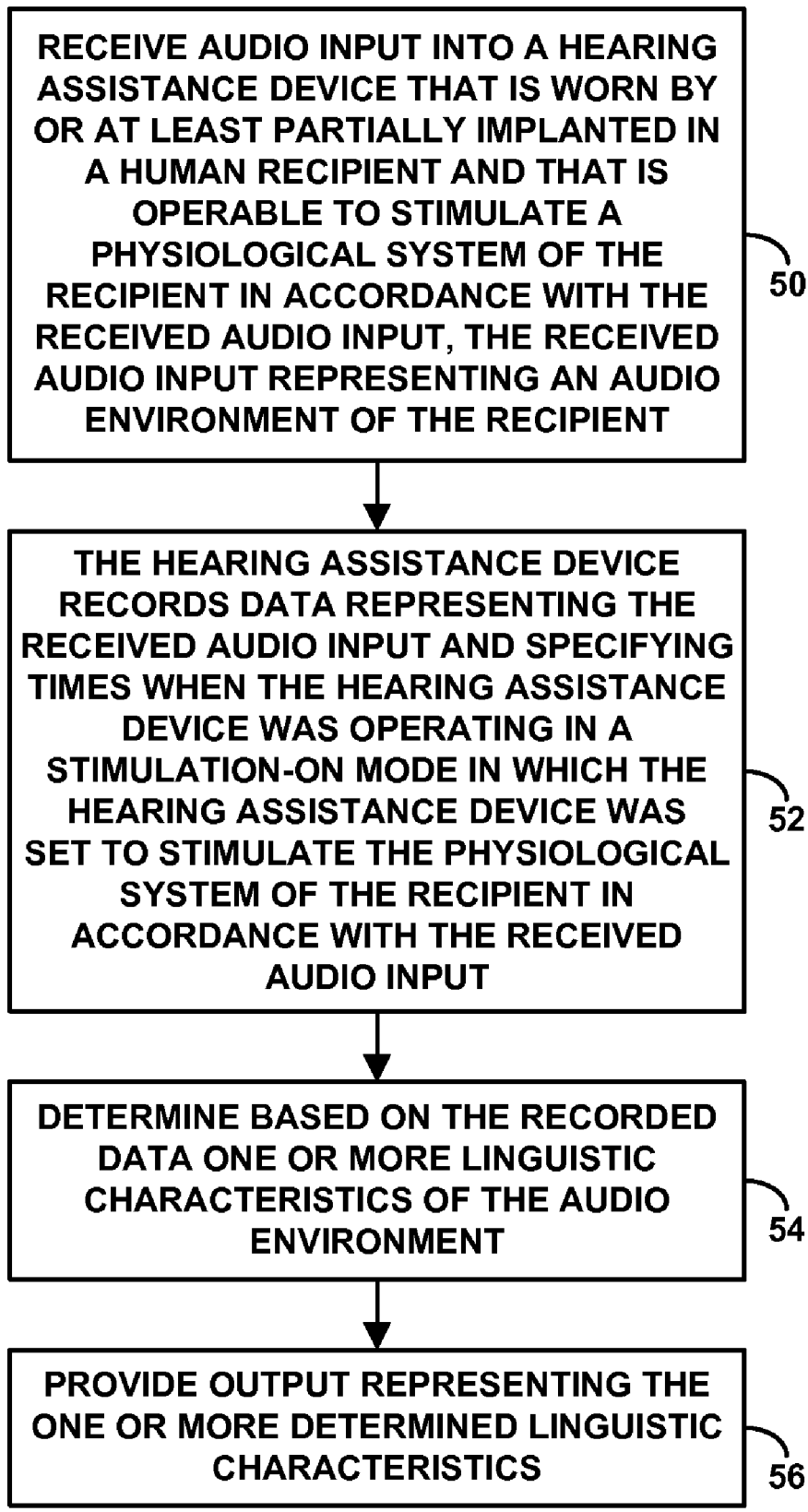

FIG. 24 is next yet another flow chart depicting functions that can be carried out in accordance with a representative method. As shown in FIG. 5, at block 50, the method involves receiving audio input into a hearing assistance device that is worn by or at least partially implanted in a human recipient and that is operable to stimulate a physiological system of the recipient in accordance with the received audio input, the received audio input representing an audio environment of the recipient. Further, at block 52, the method involves the hearing assistance device recording data representing the received audio input and specifying times when the hearing assistance device was operating in a stimulation-on mode in which the hearing assistance device was set to stimulate the physiological system of the recipient in accordance with the received audio input. Still further, at block 54, the method involves determining based on the recorded data one or more linguistic characteristics of the audio environment. And at block 56, the method involves providing output representing the one or more determined linguistic characteristics.

In practice, as discussed above, the hearing assistance device itself may carry out the acts of determining the one or more linguistic characteristics and providing the output representing the one or more determined linguistic characteristics. Alternatively, a processing system external to the hearing assistance device, such as a separate computing device for instance, may carry out those functions, in which case the method may further include transferring the data from the hearing assistance device to the external processing system. In either case, as further discussed above, the output may also associate the one or more determined linguistic characteristics with the specified times when the audio input caused the hearing assistance device to stimulate the physiological system of the recipient.

The following includes teachings are provided that enable the methods herein, in at least some exemplary embodiments, where there is a voice capture component, where the captured voice is analyzed or the like. In this regard, any one or more the following teachings associated can be utilized with the captured voice, wherein the captured voice is voice of a recipient or to a recipient. This is distinguished from the other data/the non-voice data/the scene classification that is utilized in at least some exemplary embodiments of the teachings detailed herein and/or the scene classification detailed herein.

It is explicitly noted that at least some exemplary embodiments include the teachings below when combined with the non-voice data logging detailed herein and/or the scene classification logging detailed herein. When used in combination, such can be directed towards identifying a weakness in a recipient's habilitation and/or rehabilitation regime or a need for such and the first instance. This is different than the mere collection of voice in the subsequent analysis or even real time analysis thereof. By analyzing the voice in combination with the other data, a habilitation and/or a rehabilitation regime can developed and/or altered and/or eliminated and/or replaced based on the analysis.

It is further explicitly noted that at least some exemplary embodiments include the teachings below without the aforementioned data logging. Here however, the voice is evaluated to determine features associated with the higher levels of hearing. By analyzing the voice so as to identify the features associated with higher levels a hearing, a habilitation and/or a rehabilitation regime can developed and/or altered and/or eliminated and/or replaced based on the analysis.

In some respects, the prosthesis 100 and/or the device 240 can correspond to a device that enables the recipient or otherwise a hearing impaired person to have a portable or wearable sound capture device. Any device and/or system that will enable the implementation of a self-contained or wearable portable sound capture device that can enable the teachings detailed herein outside of a testing environment during normal life can be utilized in at least some exemplary embodiments.

In some embodiments, and integrated or plug-in microphone is coupled to an optional pre-processing component that can provide a variety of functions such as A/D conversion, digital/analog filtering, compression, automatic gain control, balance, noise reduction, and the like. The preprocessed signal is coupled to a processor component that works cooperatively with memory to execute programmed instructions. Optionally, mass storage may be provided in the device itself as has become available in media player devices such as the iPod produced by Apple Computer, Inc. Alternatively, mass storage may be omitted, which would prohibit the use of logging or subsequent analysis, or mass storage may be implemented remotely via devices coupled to the external input/output. The user interface may be implemented as a graphical, text only, or hardware display depending on the level of information required by a user.

In at least some exemplary embodiments of the teachings detailed herein, signals are detected by the microphone, pre-processed if necessary or desired, and provided as input to the processing component. In one embodiment, the processor component functions to store pre-processed voice signals in memory and/or mass storage for subsequent, asynchronous analysis. In another application, a predefined word list (or phrase list) is loaded into memory where each word is represented by text or, more commonly, each word is represented as a digital code that more readily matched to the pre-processed voice signal that is presented to the processor component. Processes executing on the processor component operate to match portions of the monitored voice signal with the word list and maintain a count of how frequently each word on the word list occurs.

In an exemplary scenario, an adult, such as a parent, teacher, daycare supervisor, nanny, employer, or other adult. Adult engages in interactive communication with a child. The communication may include direct discussion of vocabulary, but more frequently involves everyday discussions about other topics, sports, news, household and world events, and the like. A utilitarian result of the teachings herein can be to enable adults to be more aware of language and vocabulary usage in the context of these everyday communications.

In view of the above, it is to be understood that teachings detailed herein can involve the combination of at least one sound capture device to capture voice, and a computer or data processor for performing analysis and reporting functions. So, for example, adults and/or child are provided with a wearable, wireless microphone system (it is noted that the teachings detailed herein can also be extended to the scenario where it is the person who does not have the hearing impairment that has the sound capture device, which can be utilitarian with respect to a scenario where the recipient is an infant or the like).

Alternatively, or in addition, the room in which the communication occurs can be outfitted with one or more microphones that are coupled to computer system via wired (e.g., universal serial bus or sound card connection) or wireless connections. Microphones arrayed in this scenario are less intrusive to the participants, but may compromise the ability to discriminate particular speakers and may be more subject to background noise. On the other hand, distributed microphones can be used to track movements of the speakers and provide information about non-verbal conditions in the learning environment during the communication (e.g., distance between adult and child).

A computer system may be implemented as a personal computer, laptop computer, workstation, handheld computer or special-purpose appliance specifically designed to implement some teachings herein. It is contemplated that some or all of the voice analysis functionality may be implemented in a wearable computer and/or integrated with voice capture device, or provided in a device such as a dictation machine, cell phone, voice recorder, MP3 recorder/player, iPod by Apple Computers Inc., or similar device.

In operation, in at least some exemplary embodiments, hearing impaired person voice and/or caregiver voice captured for analysis by computer, which computes and displays metrics that quantify certain characteristics of the communication. Examples of metrics that may be produced in this manner include counting the number of words spoken, counting the frequency at which words are spoken, estimating word length, estimating sentence complexity, and the like. It is believed that some of these metrics, such as sentence complexity and word length, can be estimated using imprecise techniques that count syllables or measure utterance duration, count phonemes, look for changes in cadence, volume, or other clues in the voice signal that indicate complexity without actually attempting to decipher the particular word that is spoken. U.S. Pat. No. 6,073,095 describes an exemplary imprecise recognition technique for spotting words in voice that includes techniques that may be useful in the practice of the teachings herein.

Optionally, the analysis performs an estimate of the emotional content or feedback "tone" of the communication being monitored. It is believed by many researchers that positively intoned voice (e.g., "good job") and negatively intoned voice (e.g., "bad boy") impact the learning rate for various topics, including vocabulary and the amount of interactive voice or turn-taking where an adult or child speaks and the other responds. Similarly, the number of questions asked of a child in contrast with directives given to a child may affect the rate of learning. Both precise and imprecise language analysis techniques can be used to develop a metric related to the emotional content, or the question/directive content of communications, turn-taking, or other content features of voice that are determined to be relevant to a supportive learning environment.

In at least some exemplary embodiments, there is a non-transitory computer readable medium corresponding to a software product. The logical operations of the components herein described may be implemented (1) as a sequence of microprocessor implemented acts or program modules running on a microprocessor and/or (2) as interconnected machine logic circuits or circuit modules within a computing device. The implementation is a matter of choice dependent on the performance requirements of the particular application. Accordingly, the logical operations described herein may be referred to variously as operations, routines, structural devices, acts, or modules. While the following embodiments are discussed as being implemented as software, it will be recognized by one skilled in the art that these operations, structural devices, acts and modules may be implemented in software, in firmware, in special purpose digital logic, and any combination thereof.

The software according to some exemplary embodiments can be such that such can be utilized with a signal from a sound component, which may have been preprocessed by the microphone or associated processing circuitry, in analog or digital form. Capture component may be implemented as a stream object, for example, the Java programming environment, or an equivalent in other programming environments. Optionally, capture component may perform functions such as analog to digital conversion, compressing, filtering, normalizing, amplifying, and the like to provide a sound signal suitable for analysis by signal analysis component.

Signal analysis component according to at least some exemplary embodiments performs any of a variety of functions that quantify characteristics of captured sound, including human-made sounds and other sounds in the learning environment. For example, signal analysis component detects features in the sound signal such as word/utterance boundaries, elapsed time between word/utterance boundaries, sentence boundaries, language (English, French, Japanese, etc.), sentence boundaries, changes in volume or inflection, and the like. The features may be detected by application of rules 407 (e.g., a silence for 0.5 microseconds indicates a word/utterance boundary) or by comparison of the voice signal to defined patterns. The use of defined patterns can be user independent or user dependent, and can be used to, for example, predefine a set of vocabulary words that are to be counted. Optionally, the signal analysis component may perform voice recognition and/or speaker recognition to convert sounds to words and identify which speaker is associated with particular spoken words. Similarly, signal analysis may involve the conversion of sounds to phonemes, estimates of the spoken word, word roots, and the like. The signal analysis may recognize longer, multiword passages and dissertations in addition to or instead of individual words and word parts. Signal analysis component uses these detected features to determine metrics such as word count, word length, language complexity, sentence length, and the like. Metrics are provided to user feedback component that presents selected information to the users using a graphic display, text display audio display, signal lights, or other interface mechanism. Metrics can be logged for later analysis and later presentation to a user.

In some embodiments, acoustic signals are detected by the microphone(s), pre-processed if necessary or desired, and provided as input to the processor. In one embodiment a predefined word list (or phrase list) is loaded into memory and processes executing on the processor component operate to match portions of the monitored voice signal with the word list and maintain a count of how frequently each word on the word list occurs. Processes executing on the processor may be used to perform voice recognition, speaker recognition, and to compute any other desired metric.

Some embodiments include a distributed architecture for implementing features of some teachings herein. In the implementation, client processes involving capturing voice and presenting feedback to the user are provided by a client component while signal processing and analysis is provided by a network-coupled service. Resources used to implement service 605 may be shared across a plurality of clients. Clients may be implemented with comparatively low cost, lightweight components as the computationally intensive processes are offloaded to the signal processing service. Network may comprise a local area network (LAN), wide area network (WAN), public network such as the Internet, or other network implementations.

The teachings herein can in part describe methods, systems, methods and processes that can be applied to a variety of applications including research tools, educational tools, and to commercial applications for use in homes and businesses. Although a number of these applications are specifically disclosed herein, it should be understood that some of the teachings herein are adaptable to a wide variety of applications in which benefit from monitoring, analyzing and reporting sounds in a natural language environment. Linguistic applications refer to a broad class of applications that are directed to improving speech skills such as vocabulary by monitoring voice, analyzing the speech, and providing some form of feedback such that speakers can improve the speech learning environment. A computerized speech monitoring system records speech (e.g., words, utterances, dialogue, monologue and the like) within the listening environment of a learner, from various sources including the learner's own speech. Various metrics concerning quantity, level and quality of the speech are computed. The system feeds back this information in the form of reports or other indication so that the participants can at least be aware of the language environment.

Some embodiments are directed to methods that result in supporting vocabulary and language development in non-classroom contexts such as childcare centers, preschools, homes and the like. Conversely, some other embodiments are not directed to this, and such is simply an ancillary result/collateral result, in this regard, the teachings detailed herein are primarily directed to improving a person's ability to hear. Moreover, the teachings detailed herein are primarily directed to improving a person's ability to hear the higher-level functions as detailed above. Moreover, the teachings detailed herein are primarily directed to improving a person's ability to hear where that person has a hearing disability.

It is noted that in some exemplary embodiments, there is the utilization of prelinguistic applications. While in other embodiments, the methods detailed herein specifically exclude prelinguistic applications. Pre-linguistic applications refer to a class of applications that are directed to developing and improving speech skills before a learner has developed linguistic speech skills, or while a learner is acquiring linguistic speech skills. Some teachings can be readily adapted to monitor, analyze and report with respect to pre-linguistic utterances including vegetative sounds, cooing, babbling and the like. These sounds may be precursors to linguistic skills in infants and young children, or may be a permanent or semi-permanent level of communication for impaired individuals. A pre-linguistic speech monitoring system in accordance with at least some exemplary embodiments can records sounds (e.g., vocalizations, vegetative sounds, utterances, dialogue, monologue, and the like) within the listening environment of a learner, from various sources including the learner's own sounds. Various metrics concerning quantity, level and quality of the sounds may be computed. The system feeds back this information to other speakers, parents, teachers and the like.

Some embodiments utilize complex material monitoring. In addition to applications that involve language acquisition and skill development, there are some implementations that utilize content-aware applications. Complex material monitoring applications involve detecting the occurrence of strings of words, phrases, books, portions of books, poems, songs, and the like that are indicative of content being received by a learner. Occurrence of a complex passage in a sound stream can be identified by, for example, recognizing the words and comparing those words to known text. Although the system in accordance with the teachings herein can be configured to identify complex passages in their entirety by comparing the recognized speech with a text file or the like representing a passage being read, in many cases it will only be utilitarian to recognize selected passages or paragraphs within a complex work. Analysis processes may provide metrics indicating how often a passage is spoken, the speed with which it is spoken, how the speed varies over time, and the like. Difficult portions of a spoken passage can be identified and called out to the speaker or a parent, coach, teacher and/or the like to provide feedback as to the speaker's performance. Alternatively, and/or in addition to this, spoken words and/or sounds of varying length can be processed and filtered to derive a signature that represents occurrence of those words in a sound stream. Hence, it is not necessary to for the system to actually recognize words and compare that to known text, merely to recognize when a signature corresponding to the passage occurs in the sound signal being monitored. Depending on the type of processing and filtering, and the sounds themselves, the signature may be more or less speaker independent.

In at least some scenarios, there is utilitarian value with respect to knowing information about the progress of conversations and the interaction between multiple speakers. For example, some students learn more from interactive teaching in which they are asked questions and encouraged to form an answer whereas other students learn best by a lecture-style approach to providing information. Similarly, infant speech development is impacted by the frequency and manner in which a parent or other adult speaks to the infant and listens to the response (linguistic or pre-linguistic). This back and forth of the flow of communication is referred to as "turn-taking".

In an exemplary scenario, there is an interaction between a child and a parent with the interaction is monitored. In this example it may only be utilitarian to monitor who is speaking and measure the length of each speaking segment and the quiet time between utterances. The system in accordance with some teachings herein can develop metrics indicating the frequency and duration of the turn-taking, as well as indicating the cadence or other characteristics that help speakers, parents, educators, researchers, or other interested parties understand and improve the language environment. More detailed analysis can identify information in the sound signal that indicate tone, repetition of words, distinguish vegetative sounds from linguistic and pre-linguistic sounds, monitor the frequency and duration of distracting background sounds, and the like.

The teachings herein can enable participants in the language environment being monitored to replace observers (e.g., as exist in a testing environment), thereby lessening or eliminating the influence and expense of human observers in the research environment.

Another feature that is implemented herein is the operation in a natural language environment, as opposed to a clinical, classroom, or other special-purpose environment, the quantity and variety of data that can be gathered is significantly greater than possible with other research techniques. Whereas a conventional researcher might be limited to an hour or so of monitoring a subject in a computer laboratory, the teachings herein can allow the subject to be monitored throughout the day and over many days. Moreover, the subject is not monitored alone, but in context of the various other people with which the subject normally interacts. The subject can be monitored in conversations with a variety of people, in a variety of backgrounds, on telephone calls, and the like. This quantity and quality of data is difficult to obtain using conventional techniques.

It is to be noted that in at least some exemplary embodiments, the methods detailed herein are implemented such that unscripted speech that occurs in a natural language environment to be used. Once sounds are recorded the speaker or an assistant can code the recorded sounds to correlate the speech to particular speakers, words or complex concepts. This enables sounds that are pre-linguistic to be correlated to meaningful words by someone familiar with the speaker, even when that person is not a speech or linguistic expert. In turn, this encoding can be used to augment or replace the learning file used by speech recognition and voice enabled applications. Moreover, as a person progresses with language development or overcomes a language impediment, the analysis and reporting features of the teachings herein allow the speaker, assistants, or software to become aware of the changes so that the coding can be updated to reflect the new characteristics of the speaker. In this manner the teachings herein can enable a system for continuously and dynamically improving training of a variety of software applications.

It is specifically noted that the teachings detailed herein do not apply to foreign-language applications or otherwise are not utilized to learn a foreign language. Moreover, the teachings detailed herein do not apply to assessing speech disorders and/or otherwise not utilized to treat or otherwise improve a speech disorder.

The teachings detailed herein can contemplates the use of computers and automation to perform a more granular, sensitive and accurate analysis of sound patterns than has been performed in the past. Conventional analysis techniques operate at the granularity of words, phonemes, and the like which have generally developed from the study of normally-developed individuals speaking a particular language. These techniques are often not sufficient to study and understand sounds made by persons that are not normally developed individuals speaking that particular language. For example, pre-linguistic infants and children, injured persons, handicapped persons, impaired persons, and the like do not always produce sounds that can be handled at the granularity of a conventional model.

Figure 25:
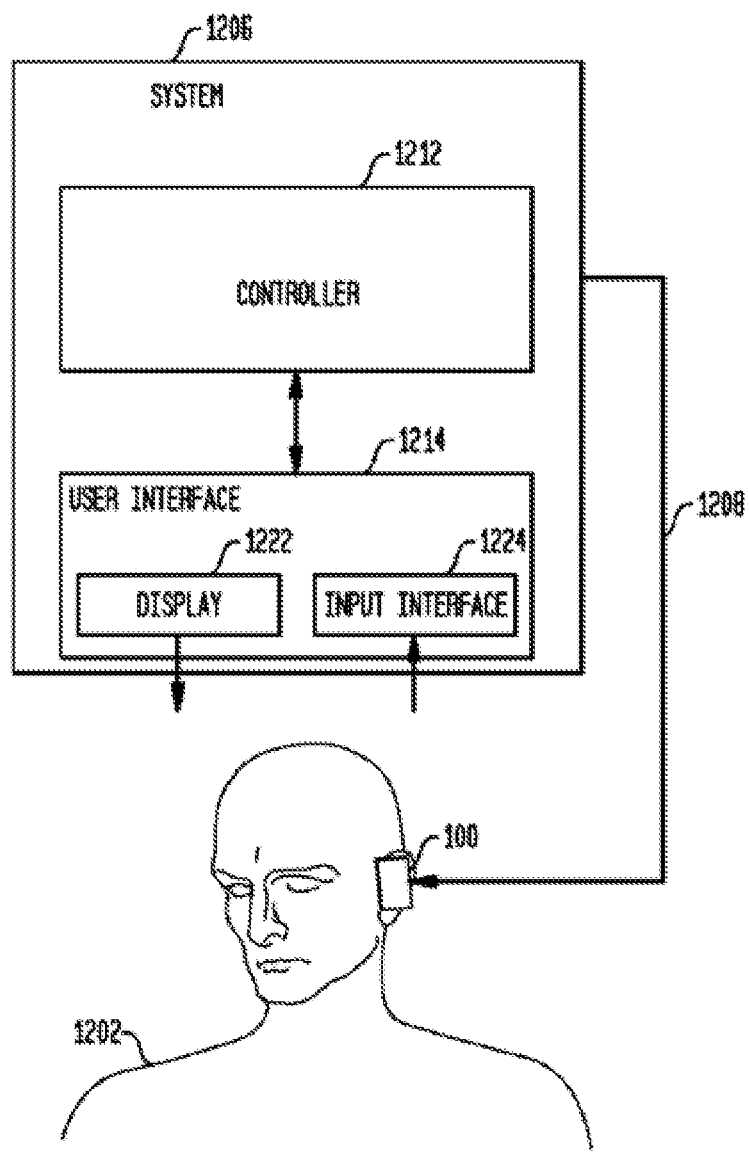
FIG. 25 presents an exemplary functional schematic of an exemplary system according to an exemplary embodiment.

FIG. 25 presents a functional schematic of a system with which some of the teachings detailed herein and/or variations thereof can be implemented. In this regard, FIG. 25 is a schematic diagram illustrating one exemplary arrangement in which a system 1206 can be used to execute one or more or all of the method actions detailed herein in conjunction with the use of a hearing prosthesis 100. System 1206 will be described, at least in part, in terms of interaction with a recipient. In an exemplary embodiment, system 1206 is a recipient controlled system. In an exemplary embodiment, system 1206 can correspond to the remote device 240, which, as detailed above, can be a portable handheld device, and/or can be a personal computer, etc. It is also noted that system 106 can correspond to the system of FIGS. 17 and 18 detailed above, or any of the processing systems herein, as well as the processing components of FIGS. 3, 4, 5 and 6 detailed above.

In an exemplary embodiment, system 1206 can be a system having additional functionality according to the method actions detailed herein. In the embodiment illustrated in FIG. 25, the hearing prosthesis 100 can be connected to system 1206 to establish a data communication link 1208 between the hearing prosthesis 100 and system 1206. System 1206 is thereafter bi-directionally coupled by a data communication link 1208 with hearing prosthesis 100. Any communications link that will enable the teachings detailed herein that will communicably couple the implant and system can be utilized in at least some embodiments.

System 1206 can comprise a system controller 1212 as well as a user interface 1214. Controller 1212 can be any type of device capable of executing instructions such as, for example, a general or special purpose computer, a handheld computer (e.g., personal digital assistant (PDA)), digital electronic circuitry, integrated circuitry, specially designed ASICs (application specific integrated circuits), firmware, software, and/or combinations thereof. As will be detailed below, in an exemplary embodiment, controller 1212 is a processor. Controller 1212 can further comprise an interface for establishing the data communications link 1208 with the hearing prosthesis 100. In embodiments in which controller 1212 comprises a computer, this interface may be, for example, internal or external to the computer. For example, in an exemplary embodiment, controller 1206 and cochlear implant may each comprise a USB, Firewire, Bluetooth, Wi-Fi, or other communications interface through which data communications link 1208 may be established. Controller 1212 can further comprise a storage device for use in storing information. This storage device can be, for example, volatile or non-volatile storage, such as, for example, random access memory, solid state storage, magnetic storage, holographic storage, etc.

User interface 1214 can comprise a display 1222 and an input interface 1224 (which, in the case of a touchscreen of the portable device, can be the same). Display 1222 can be, for example, any type of display device, such as, for example, those commonly used with computer systems. In an exemplary embodiment, element 1222 corresponds to a device configured to visually display a plurality of words to the recipient 1202 (which includes sentences), as detailed above.

Input interface 1224 can be any type of interface capable of receiving information from a recipient, such as, for example, a computer keyboard, mouse, voice-responsive software, touch-screen (e.g., integrated with display 1222), microphone (e.g. optionally coupled with voice recognition software or the like) retinal control, joystick, and any other data entry or data presentation formats now or later developed. It is noted that in an exemplary embodiment, display 1222 and input interface 1224 can be the same component, e.g., in the case of a touch screen). In an exemplary embodiment, input interface 1224 is a device configured to receive input from the recipient indicative of a choice of one or more of the plurality of words presented by display 1222.

It is noted that in at least some exemplary embodiments, the system 1206 is configured to execute one or more or all of the method actions detailed herein, where the various sub-components of the system 1206 are utilized in their traditional manner relative to the given method actions detailed herein.

It is also noted that in at least some exemplary embodiments, system 1206 can correspond to the train system detailed above, or otherwise can correspond to the processing suite detailed above although in other embodiments, the system can correspond to the entire processing suite, the input suite and the output suite detailed above.

In an exemplary embodiment, the system 1206, detailed above, can execute one or more or all of the actions detailed herein and/or variations thereof automatically, at least those that do not require the actions of a recipient.

In this vein, it is again noted that the schematic of FIG. 25 is functional. In some embodiments, a system 1206 is a self-contained device (e.g., a laptop computer, a smart phone, etc.) that is configured to execute one or more or all of the method actions detailed herein and/or variations thereof. In an alternative embodiment, system 1206 is a system having components located at various geographical locations. By way of example only and not by way of limitation, user interface 1214 can be located with the recipient (e.g., it can be the portable handheld device 240) and the system controller (e.g., processor) 1212 can be located remote from the recipient. By way of example only and not by way of limitation, the system controller 1212 can communicate with the user interface 1214, and thus the portable handheld device 240, via the Internet and/or via cellular communication technology or the like. Indeed, in at least some embodiments, the system controller 1212 can also communicate with the user interface 1214 via the Internet and/or via cellular communication or the like.

Again, in an exemplary embodiment, the user interface 1214 can be a portable communications device, such as, by way of example only and not by way of limitation, a cell phone and/or a so-called smart phone. Indeed, user interface 1214 can be utilized as part of a laptop computer or the like. Any arrangement that can enable system 1206 to be practiced and/or that can enable a system that can enable the teachings detailed herein and/or variations thereof to be practiced can be utilized in at least some embodiments.

Figure 26:
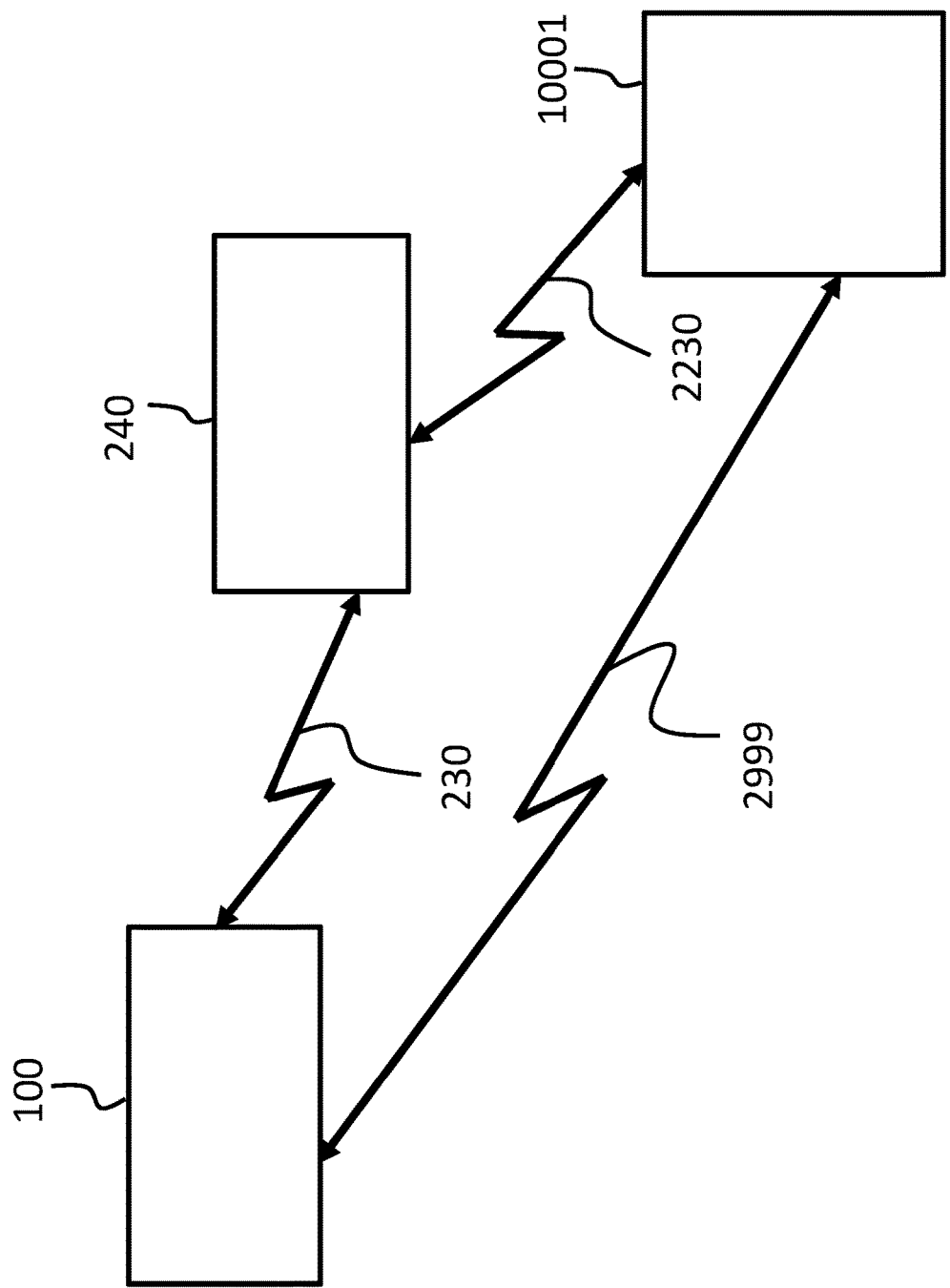
FIG. 26 presents another exemplary functional schematic of an exemplary system according to an exemplary embodiment.

In view of the above, FIG. 26 depicts an exemplary functional schematic, where the remote device 240 is in communication with a geographically remote device/facility 10001 via link 2230, which can be an internet link. The geographically remote device/facility 10001 can encompass controller 1212, and the remote device 240 can encompass the user interface 1214. Also, as can be seen, there can be a direct link 2999 with the prosthesis 100 and the remote facility 10001

Accordingly, an exemplary embodiment entails executing some or all of the method actions detailed herein where the recipient of the hearing prosthesis, the hearing prosthesis 100 and/or the portable handheld device 240 is located remotely (e.g., geographically distant) from where at least some of the method actions detailed herein are executed.

In view of the above, it can be seen that in an exemplary embodiment, there is a portable handheld device, such as portable handheld device 240, comprising a cellular telephone communication suite (e.g., the phone architecture of a smartphone), and a hearing prosthesis functionality suite, (e.g., an application located on the architecture of a smartphone that enables applications to be executed that is directed towards the functionality of a hearing prosthesis) including a touchscreen display. In an exemplary embodiment, the hearing prosthesis functionality suite is configured to enable a recipient to adjust a feature of a hearing prosthesis, such as hearing prosthesis 100, remote from the portable handheld device 240 via the touchscreen display (e.g., by sending a signal via link 230 to the hearing prosthesis 100).

It is noted that in describing various teachings herein, various actions and/or capabilities have been attributed to various elements of the system 210. In this regard, any disclosure herein associated with a given functionality or capability of the hearing prosthesis 100 also corresponds to a disclosure of a remote device 240 (e.g., a portable handheld device) having that given functionality or capability providing that the art enable such and/or a disclosure of a geographically remote facility 10001 having that given functionality or capability providing that the art enable such. Corollary to this is that any disclosure herein associated with a given functionality or capability of the remote device 240 also corresponds to a disclosure of a hearing prosthesis 100 having that given functionality or capability providing that the art enables such and/or disclosure of a geographically remote facility 10001 having that given functionality or capability, again providing that the art enable such. As noted above, the system 210 can include the hearing prosthesis 100, the remote device 240, and the geographically remote device 1000.

It is further noted that the data upon which determinations are made or otherwise based with respect to the display of a given interface display can also correspond to data relating to a more generalized use of the system 210. In this regard, in some embodiments, the remote device 240 and/or the hearing prosthesis 100 can have a so-called caregiver mode, where the controls or data that is displayed can be more sophisticated relative to that which is the case for the normal control mode/the recipient control mode. By way of example only and not by way of limitation, if the recipient is a child or one having diminished faculties owing to age or ailment, the system 210 can have two or more modes. Accordingly, the data detailed herein can corresponds to input regarding which mode the system 210 is being operated in, and a given display can be presented based on that mode. For example, the caregiver display can have more sophisticated functionalities and/or the ability to adjust more features and/or present more data than the recipient mode. In an exemplary embodiment, a user can input into the remote device 240 a command indicating that the hearing prosthesis is to be operated in caregiver mode, and the displays presented thereafter caregiver mode displays, and these displays are presented until a command is entered indicating that the hearing prosthesis is to be operated in recipient mode, after which displays related to recipient mode are displayed (until a caregiver command is entered, etc.). That said, in an alternate embodiment, a caregiver and/or the recipient need not enter specific commands into system 210. In an exemplary embodiment, system 210 is configured to determine what mode it should be operated in. By way of example only and not by way of limitation, if a determination is made that the caregiver's voice has been received within a certain temporal period by the hearing prosthesis 100, the system 210 can enter the caregiver mode and present the given displays accordingly (where if the caregiver's voice is not been heard within a given period of time, the default is to a recipient control mode). Corollary to this is that in at least some exemplary embodiments, two or more remote devices 240 can be utilized in system 210, one of which is in the possession of the recipient, and another of which is in the possession of the caregiver. Depending on the data, various displays are presented for the various remote devices 240.

It is noted that any method detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by a human being. It is further noted that any disclosure of a device and/or system detailed herein corresponds to a method of making and/or using that the device and/or system, including a method of using that device according to the functionality detailed herein.

It is noted that embodiments include non-transitory computer-readable media having recorded thereon, a computer program for executing one or more or any of the method actions detailed herein. Indeed, in an exemplary embodiment, there is a non-transitory computer-readable media having recorded thereon, a computer program for executing at least a portion of any method action detailed herein.

Any action disclosed herein that is executed by the prosthesis 100 can be executed by the device 240 and/or the remote system in an alternative embodiment, unless otherwise noted or unless the art does not enable such. Thus, any functionality of the prosthesis 100 can be present in the device 240 and/or the remote system an alternative embodiment. Thus, any disclosure of a functionality of the prosthesis 100 corresponds to structure of the device 240 and/or the remote system that is configured to execute that functionality or otherwise have a functionality or otherwise to execute that method action.

Any action disclosed herein that is executed by the device 240 can be executed by the prosthesis 100 and/or the remote system in an alternative embodiment, unless otherwise noted or unless the art does not enable such. Thus, any functionality of the device 240 can be present in the prosthesis 100 and/or the remote system an alternative embodiment. Thus, any disclosure of a functionality of the device 240 corresponds to structure of the prosthesis 100 and/or the remote system that is configured to execute that functionality or otherwise have a functionality or otherwise to execute that method action.

Any action disclosed herein that is executed by the remote system can be executed by the device 240 and/or the prosthesis 100 in an alternative embodiment, unless otherwise noted or unless the art does not enable such. Thus, any functionality of the remote system can be present in the device 240 and/or the prosthesis 100 as alternative embodiment. Thus, any disclosure of a functionality of the remote system corresponds to structure of the device 240 and/or the prosthesis 100 that is configured to execute that functionality or otherwise have a functionality or otherwise to execute that method action.

It is further noted that any disclosure of a device and/or system detailed herein also corresponds to a disclosure of otherwise providing that device and/or system.

It is also noted that any disclosure herein of any process of manufacturing other providing a device corresponds to a device and/or system that results there from. Is also noted that any disclosure herein of any device and/or system corresponds to a disclosure of a method of producing or otherwise providing or otherwise making such.

Any embodiment or any feature disclosed herein can be combined with any one or more or other embodiments and/or other features disclosed herein, unless explicitly indicated and/or unless the art does not enable such. Any embodiment or any feature disclosed herein can be explicitly excluded from use with any one or more other embodiments and/or other features disclosed herein, unless explicitly indicated that such is combined and/or unless the art does not enable such exclusion.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A method, comprising:
capturing an individual's voice with a machine; and
logging data corresponding to events and/or actions of the individual's real world auditory environment, wherein the individual is speaking while using a hearing assistance device, and the hearing assistance device at least one of corresponds to the machine or is a device used to execute the action of logging data,
the individual is a hearing impaired person, and
the method further comprises analyzing the captured voice and the logged data to identify a weakness in a habilitation or rehabilitation regime of the individual.

2. The method of claim 1, wherein:
wherein the logged data is non-voice based data.

3. The method of claim 1, wherein:
the hearing assistance device is a hearing prosthesis; and
the logged data is non-voice based data relating to use of a hearing prosthesis by the individual.

4. The method of claim 3, wherein:
the logged data is indicative of temporal data associated with use of the hearing assistance device.

5. The method of claim 3, wherein:
the logged data is indicative of how the prosthesis is being used and/or whether the prosthesis is being used.

6. The method of claim 1, wherein:
analyzing the captured voice and the logged data includes analyzing the captured voice to determine a characteristic associated thereof.

7. The method of claim 1, wherein the method further comprises:
obtaining functional listening behavior data about the individual; and
also analyzing the functional data to identify the weakness in the habilitation or rehabilitation regime.

8. The method of claim 1, wherein:
the hearing assistance device is a hearing prosthesis attached to the individual.

9. The method of claim 1, further comprising:
analyzing the captured voice to determine at least one characteristic of a language development environment associated with the voice.

10. The method of claim 1, further comprising at least one of:
(i) analyzing the captured voice and the logged data to identify a real-world scenario identified by using the captured voice and/or the data as latent variables; or
(ii) obtaining functional listening behavior data about the individual; and
analyzing the captured voice, the logged data and the functional data to identify a real-world scenario identified by using the captured voice and/or the logged data and/or the functional listening behavior data as latent variables.

11. The method of claim 1, further comprising:
analyzing the captured voice and the logged data to identify a habilitation and/or rehabilitation action that should be executed or should no longer be executed.

12. A method, comprising:
capturing sound in a natural language environment with a machine;
analyzing the sound captured by the machine to determine at least one higher level characteristic of an auditory skill development of a hearing impaired person; and
at least one of:
identifying a revision to a habilitation and/or rehabilitation regime of the person based on the analysis;
developing a habilitation and/or rehabilitation regime for the person based on the analysis; or
replacing a habilitation and/or rehabilitation regime for the person with a new regime based on the analysis.

13. The method of claim 12, wherein:
the higher level characteristic is an ability of the person to identify the captured environmental sound.

14. The method of claim 12, wherein:
the higher level characteristic is an ability of the person to comprehend the environmental sound.

15. The method of claim 12, wherein:
the higher level characteristic is an ability of the person communicate by responding to voice directed at the person.

16. The method of claim 12, wherein:
the person is a pre-pubescent; and
the revision of the habilitation and/or rehabilitation regime includes changing a way of speaking to the person.

17. The method of claim 12, wherein:
- the action of analyzing the sound captured by the machine includes analyzing voice of the person with voice of a second person speaking to the person to determine a level of comprehension by the person; and
- the action of identifying the revision includes identifying the revision based on the determined level of comprehension by the person.

18. The method of claim 17, wherein:
- the person is a post-pubescent mentally healthy adult with a cochlear implant;
- the action of analyzing the sound captured by the machine includes analyzing voice of the person with voice of a second person speaking to the person to determine a level of comprehension by the person; and
- the action of identifying the revision includes identifying the revision based on the determined level of comprehension by the person.

19. The method of claim 12, wherein:
- the person is a post-pubescent; and
- the revision of the habilitation and/or rehabilitation regime includes increasing a time in a voice environment.

20. The method of claim 12, further comprising:
- analyzing the sound captured by the machine to determine at least one non-higher level characteristic of an auditory skill development of a hearing impaired person; and
- identifying a revision to a habilitation and/or rehabilitation regime of the person based on the determined at least one non-higher level characteristic in addition to the determined at least one higher level characteristic.

21. A method, comprising:
- capturing voice sound with a hearing device, wherein the speaker is a recipient of the hearing device;
- evaluating data, wherein the data is based on the captured voice sound;
- determining a hearing habilitation and/or rehabilitation related feature based on the evaluation; and
- automatically classifying, using a machine, a sound scene, the sound scene being present at the time that the voice sound was captured, wherein
- the data is also based on the classified sound scene.

22. The method of claim 21, further comprising:
- determining that there is a need for intervention in an existing hearing habilitation and/or rehabilitation effort associated with the recipient based on the determined feature.

23. The method of claim 22, further comprising:
- automatically determining an intervention regime after determining that there is the need for intervention.

24. The method of claim 21, wherein:
- the hearing device is configured to identify own-voice occurrence, such that the captured voice is identified as the recipient's voice based on the use of the devices' own voice identification capabilities.

25. The method of claim 21, wherein:
- the hearing device is a hearing prosthesis.

26. The method of claim 21, wherein:
- the action of evaluating the data includes evaluating at least one characteristic of a language development environment associated with the voice sound.

27. The method of claim 21, wherein:
- the action of capturing voice sound is executed during a normal conversation outside of a testing environment.

* * * * *